(12) United States Patent
Miyoshi et al.

(10) Patent No.: US 6,562,753 B2
(45) Date of Patent: May 13, 2003

(54) DEVICE FOR PURIFYING EXHAUST GAS, METHOD FOR PURIFYING EXHAUST GAS, CATALYST FOR PURIFYING EXHAUST GAS, AND METHOD FOR MANUFACTURING EXHAUST GAS PURIFYING CATALYST

(75) Inventors: Seiji Miyoshi, Hiroshima (JP); Akihide Takami, Hiroshima (JP); Makoto Kyougoku, Hiroshima (JP); Hiroshi Yamada, Hiroshima (JP); Kenji Okamoto, Hiroshima (JP); Kenichi Yamamoto, Hiroshima (JP); Yuki Kooda, Hiroshima (JP)

(73) Assignee: Madza Motor Corporation, Hiroshima (JP)

( * ) Notice: Subject to any disclaimer, the term of this patent is extended or adjusted under 35 U.S.C. 154(b) by 0 days.

(21) Appl. No.: 09/982,995

(22) Filed: Oct. 22, 2001

(65) Prior Publication Data
US 2002/0141908 A1 Oct. 3, 2002

Related U.S. Application Data

(63) Continuation of application No. PCT/JP00/07200, filed on Oct. 17, 2000.

(30) Foreign Application Priority Data

Feb. 22, 2000 (JP) ........................................ 2000-043969
Apr. 17, 2000 (JP) ........................................ 2000-115337

(51) Int. Cl.[7] ............................. B01J 21/10; B01J 23/02
(52) U.S. Cl. ....................... 502/325; 502/328; 502/330; 502/340; 502/344; 502/400; 502/514
(58) Field of Search ....................... 423/239.1; 502/325, 502/328, 330, 340, 344, 400, 514

(56) References Cited

U.S. PATENT DOCUMENTS

| | | | | |
|---|---|---|---|---|
| 5,750,082 A | * | 5/1998 | Hepburn et al. | 423/213.5 |
| 5,753,192 A | * | 5/1998 | Dobson et al. | 422/177 |
| 5,756,057 A | * | 5/1998 | Tsuchitani et al. | 423/213.2 |
| 5,874,057 A | * | 2/1999 | Deeba et al. | 423/239.1 |
| 5,911,960 A | | 6/1999 | Miyoshi et al. | 423/213.5 |
| 6,010,673 A | * | 1/2000 | Kanazawa et al. | 423/213.5 |
| 6,391,822 B1 | * | 5/2002 | Dou et al. | 502/325 |
| 2002/0048542 A1 | * | 4/2002 | Deeba et al. | 423/239.1 |

FOREIGN PATENT DOCUMENTS

| | | |
|---|---|---|
| EP | 0 657 204 A1 | 6/1995 |
| EP | 0 613 714 B1 | 7/2001 |
| JP | 6-142458 A | 5/1994 |
| JP | 7-051544 A | 2/1995 |
| JP | 8-099034 A | 4/1996 |
| JP | 10-118494 A | 5/1998 |
| JP | 10-274031 A | 10/1998 |
| JP | 2000-051662 A | 2/2000 |

* cited by examiner

Primary Examiner—Stanley S. Silverman
Assistant Examiner—Timothy C. Vanoy
(74) Attorney, Agent, or Firm—Nixon Peabody LLP; Donald R. Studebaker

(57) ABSTRACT

A catalyst for lowering NOx concentration in an exhaust gas is disposed in an exhaust gas passage of an engine. The catalyst composed of a catalyst layer formed on a substrate. A NOx absorber that absorbs NOx when an oxygen concentration in the exhaust gas is high and releases NOx when the oxygen concentration drops, and a precious metal for reducing NOx are supported on a support material as catalyst components, and the NOx absorber includes Ba, K, Sr, and Mg. By lowering the oxygen concentration in the exhaust gas and raising a temperature of the NOx absorber when sulfur component is absorbed excessively in the NOx absorber, it is possible to regenerate the catalyst from the S poisoning.

12 Claims, 36 Drawing Sheets

Fig. 34
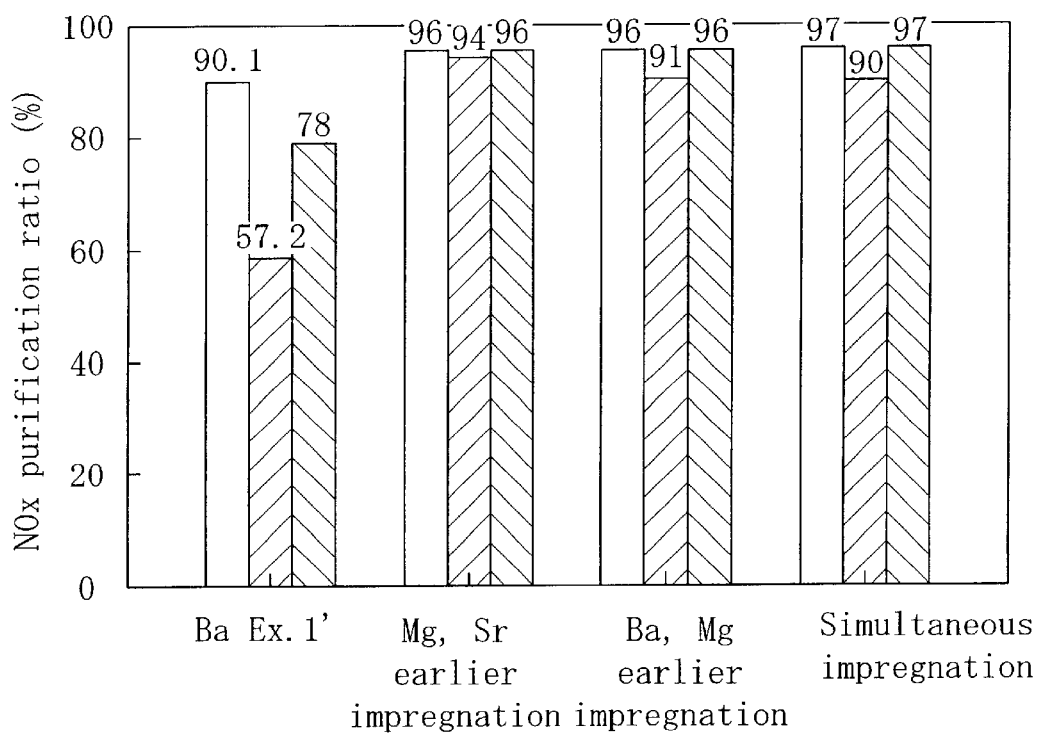
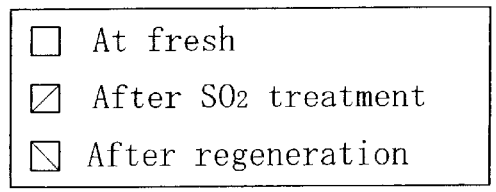

ized such that the NOx absorber is comprised of, as essential components, K for absorbing NOx and an alkaline-earth metal for controlling sulfur component absorption of the K, and the K support amount per 1 L of the substrate is 10 to 40 g in an apparent volume with an alkaline-earth metal amount not less than that of the K, provided that, when Ba is used as the alkaline-earth metal, the Ba support amount per 1 L of the substrate is smaller than 70 g.

DEVICE FOR PURIFYING EXHAUST GAS, METHOD FOR PURIFYING EXHAUST GAS, CATALYST FOR PURIFYING EXHAUST GAS, AND METHOD FOR MANUFACTURING EXHAUST GAS PURIFYING CATALYST

DESCRIPTION

This application is a Continuation of International Application No. PCT/JP00/07200, filed Oct. 17, 2000.

TECHNICAL FIELD

The present invention relates to a device for purifying an exhaust gas, a method for purifying an exhaust gas, a catalyst for purifying an exhaust gas, and a method for manufacturing the catalyst, arranged in such a manner that a NOx (nitrogen oxide) absorber that absorbs NOx in an excess oxygen atmosphere is disposed in an exhaust gas passage of an engine or the like, thereby making it possible to remove NOx from exhaust even in a lean air-fuel ratio condition.

BACKGROUND ART

Generally, there has been a known arrangement to dispose, in an exhaust gas passage of an engine, a NOx absorber that absorbs NOx in an exhaust gas when an air-fuel ratio mixture is lean, and hence, when an oxygen concentration in the exhaust gas is high, and releases NOx when the oxygen concentration drops, thereby purifying released NOx by means of reduction.

However, in a case where fuel or engine oil contains a slight amount of sulfur component (S), when the sulfur component are burned and exhausted, a conventional NOx absorber absorbs SOx (sulfur oxide) more readily than NOx in an exhaust gas, and further, once it has absorbed SOx, it hardly releases SOx even when the oxygen concentration in the exhaust gas drops. As a result, an amount of absorbed SOx increases with a lapse of time while the NOx absorption ability gradually deteriorates.

In regard to a problem of the S poisoning (sulfur poisoning), Japanese Patent Laid-Open Publication No. 6-142458 describes that combining Ba serving as a NOx absorber with at least one of alkali metal, Fe, Ni, Co, and Mg and supporting the combination on a substrate is advantageous in improving resistance to the S poisoning of Ba, and that in the case of a combination of Ba and K, $SO_2$ in the exhaust gas is incorporated in the form of complex sulfate with Ba and K, and when the oxygen concentration drops, the complex sulfate decomposes or is reduced at low temperatures to BaO and $K_2O$ that are active to NOx, which provides an advantage in improving resistance to the S poisoning of Ba. It should be noted, however, that the Ba support amount per 1 L (an apparent volume, and the same applies to the description below) is 13.7 to 27.4 g and the K support amount per 1 L is 0.39 to 7.8 g of the substrate.

However, when the K support amount is too little, the NOx absorption ability is not improved, and when the K support amount is increased to improve the NOx absorption ability, HC is not purified adequately in an atmosphere with reductants (excess oxygen ratio $\lambda \leq 1$), that is, during a theoretical air-fuel ratio combustion operation or a rich combustion operation of the engine. The reason for this is not obvious, but it is assumed that a great deal of K is placed in the periphery of precious metal and prevents HC from approaching in close proximity to the precious metal.

Japanese Patent Laid-Open Publication No. 7-51544 describes that when a combination of at least two kinds of alkaline-earth metal is supported on a substrate as a NOx absorber, the NOx absorber incorporates $SO_2$ in the exhaust gas as complex sulfate and the complex sulfate readily decomposes at low temperatures when the oxygen concentration drops, thereby providing an advantage in improving resistance to the S poisoning of Ba. It should be noted, however, that, in the case of a combination of Ba and Mg, the Ba support amount per 1 L of the substrate is 41 to 69 g and the Mg support amount per 1 L is 2.4 to 4.8 g, and in the case of a combination of Ba and Sr, the Ba support amount per 1 L of the substrate is 41 to 69 g and the Sr support amount per 1 L is 8.7 to 42 g.

Also, Japanese Patent Laid-Open Publication No. 10-118494 describes that, in regard to a NOx purifying catalyst for purifying NOx by means of reduction in an excess oxygen atmosphere, by supporting Pt and Rh as catalytic metal on an alumina substrate and by also supporting Sr or Mg in addition to K having high affinity to NOx, it is possible to achieve high NOx purifying performance even in the presence of SOx. It is preferable to arrange in such a manner that, in the case of a combination of K and Sr, the K support amount per 1 L of the substrate is 20 to 40 g and the Sr support amount per 1 L is 0 to 50 g, and in the case of a combination of K and Mg, the K support amount per 1 L of the substrate is 5 to 20 g and the Mg support amount per 1 L is 0 to 5 g.

Also, Japanese Patent Laid-Open Publication No. 10-274031 describes that SOx absorbed in the NOx absorber is detached by injecting fuel in an expansion stroke of an in-cylinder direct injection engine and thereby raising a temperature of the exhaust gas.

The object of the present invention is to control absorption of sulfur component in an exhaust gas by the NOx absorber.

Another object of the present invention is to improve the heat resistance of the NOx absorber.

A further object of the present invention is to achieve a balance between NOx purifying performance during a lean combustion operation after being exposed to a high temperature atmosphere and HC purifying performance during a theoretical air-fuel ratio combustion operation or a rich combustion operation by adequately setting the K support amount.

Still another object of the present invention is to regenerate deteriorated NOx absorption ability of the NOx absorber resulted from absorption of sulfur component in the exhaust gas by causing the NOx absorber to detach the sulfur component, and more particularly to make an arrangement of the NOx absorber such that it can readily regenerate by detaching the sulfur component when predetermined sulfur detaching means is activated.

DISCLOSURE OF THE INVENTION

The present invention provides a catalyst for purifying an exhaust gas, disposed in an exhaust gas passage of an engine, for lowering NOx concentration in an exhaust gas containing NOx, sulfur, and oxygen, the catalyst including:

a substrate; and a catalyst layer formed on the substrate by supporting, on alumina, a NOx absorber that absorbs NOx when an oxygen concentration in the exhaust gas is high and releases NOx when the oxygen concentration drops, and a precious metal for reducing NOx, which is characterized in that the NOx absorber includes Ba, K, Sr, and Mg.

According to the invention, deterioration of the NOx absorption ability of the NOx absorber caused by the S poisoning can be suppressed, and the heat resistance of NOx absorber can also be improved. The reason for this is not obvious, but it is assumed as follows.

Firstly, it is assumed that the elements (K, Sr, and Mg) other than Ba are more susceptible to the S poisoning than Ba, and for this reason, the S poisoning of Ba is relatively small. In other words, because Ba has the higher NOx absorption ability than the other elements, the presence of the other elements makes the S poisoning of Ba relatively small, the deterioration of the NOx absorption ability is lessened.

According to an analysis, it appears that Ba and Sr (at least a part of each) form one compound (a mixed oxide or double salt) with both the elements being constituent elements. It is assumed that such a Ba—Sr compound (hereinafter, referred to as a double compound as needed) is less susceptible to the S poisoning compared with the case of Ba alone, and for this reason, deterioration of the NOx absorption ability can be suppressed.

Also, according to an analysis, it appears that Ba and Mg (at least a part of each) do not form a crystal, but are in an almost amorphous state by coming in close proximity to each other or bonding to each other. It is assumed that such a Ba—Mg coexisting substance suppresses the S poisoning of Ba (formation of barium sulfate) compared with the case of Ba alone, and for this reason, deterioration of the NOx absorption ability can be suppressed.

Also, it is affirmed from analysis that K neither forms a complex nor undergoes affinity with Ba, Sr, and Mg, and resides dispersedly in the periphery of the Ba—Sr compound or Ba—Mg coexisting substance. K with the foregoing nature is relatively highly reactive with sulfur, and therefore, is assumed to prevent the S poisoning of Ba—Sr compound or the Ba—Mg coexisting substance. In addition, K promotes crystallization of Ba—Sr double carbonate and activates the NOx absorber, thereby contributing to the improvement of the heat resistance of the catalyst.

It is also assumed that interaction of the elements forming a quaternary material of Ba—K—Sr—Mg serving as the NOx absorber weakens the bond to SOx, so that even if SOx is bonded, it is readily detached.

Further, when the NOx absorber 25 is made of a single element of Ba, if an amount of Ba is increased, a particle size becomes larger but a specific surface area hardly increases. However, in a case where Ba and other elements (K, Sr, and Mg) are combined, when the amount of the elements are increased, it is assumed that a particle size hardly increases, but a specific surface area, or an active site, increases, which makes an absorption capacity of NOx and SOx larger. Hence, even when the S poisoning occurs to some degree, the NOx absorption ability is not deteriorate significantly.

Also, combining Ba and the other elements (K, Sr, and Mg) as discussed above is effective in making the NOx absorber into fine particles. In particular, Sr is notably excellent in making Ba and Mg into fine particles. Hence, the NOx absorber is dispersed on the substrate at a high degree, which makes the occurrence of heat sintering difficult. In short, the heat resistance of the catalyst becomes high.

Also, the reason why alumina is used as a support material of the above-discussed NOx absorber and precious metal is because alumina hardly undergoes sintering nor decomposes when it is heated high, and therefore, is advantageous in preventing heat deterioration of the catalyst. In the case of alumina, Ba and the substrate react with each other when the catalyst is heated high, which readily causes deterioration, but Mg suppresses the reaction between the substrate and Ba, and as a result, heat deterioration of the catalyst is prevented.

The support material can be made of both alumina and a ceria material. The ceria material serves as an oxygen storage material, and releases oxygen when oxygen concentration in the exhaust gas drops, thereby promoting a ternary reaction (oxidation-reduction reaction) among HC (hydrocarbon), CO, and NOx in the exhaust gas. In addition, it is advantageous to increase an amount of the ceria material in improving resistance to the S poisoning of the catalyst. In particular, a ceria material containing Zr increases the resistance to the S poisoning.

In the case of a ternary catalyst, an addition alumina added with Ba, Zr, La, etc. is used occasionally as alumina to suppress reduction of a specific surface area when exposed to a high temperature. However, using non-addition alumina that does not contain these additional elements is advantageous to NOx purification at a lean ratio. In other words, the precious metal at a lean ratio serves as a catalyst to oxidize NO in the exhaust gas to $NO_2$, and assists the NOx absorber to absorb NOx. The alumina serves to assist this catalytic reaction of precious metal, but when an additive is present as discussed above, a heat resistance is improved but the function of alumina as a co-catalyst is deteriorated. For this reason, a non-addition alumina is advantageous to NOx purification at a lean ratio.

The ceria material may be composed of $CeO_2$ alone, but it may be a mixed oxide of Ce and Zr discussed above. Further, it may be a ternary mixed oxide of Ce—Zr—Sr. Adopting the ternary complex oxide of Ce—Zr—Sr is advantageous in improving the heat resistance, resistance to the S poisoning, regeneration properties from the S poisoning of the catalyst, which will be discussed below.

It is preferable to combine alumina with the ceria material at a mass ratio of 1:1 or in the vicinity thereof, which provides an advantage in improving both heat resistance and resistance to the S poisoning of the catalyst.

It is preferable to use Pt as the precious metal, because it shows an excellent catalytic function for the oxidation of NO to $NO_2$ at a lean ratio, and the reduction of $NO_2$ to $N_2$ at stoichimetric or rich ratio. Also, it is more preferable to use both Pt and Rh. Rh serves to assist the catalytic reaction by Pt, in other words, it promotes the above-discussed ternary reaction at a stoichiometric or rich ratio while promoting a reduction-decomposition reaction of NOx released from the NOx absorber. When the support amount of Rh per 1 L of the substrate is in a range from 0.1 to 1.0 g, variance of the amount does not make a significant difference in the NOx purification ratio, and therefore, a small amount is sufficient.

A preferable support amount of Pt per 1 L of the substrate is 1 to 15 g. This is because when the amount is less than 1 g, NOx is not sufficiently purified by means of reduction, whereas when the amount exceeds 15 g, no further improvement of the NOx purification ratio is expected and the costs is increased. It is sufficient to set the Rh support amount to approximately $1/10$ to $1/100$ of the Pt support amount.

In the above catalyst for purifying an exhaust gas, the support amount of Sr per 1 L of the substrate is preferably 8 to 20 g, and the support amount of Mg per 1 L of the substrate is preferably 5 to 15 g, and more preferably 8 to 12 g.

The above arrangement makes it possible to achieve an effect in improving resistance to the S poisoning by Mg and Sr while achieving an effect in improving the heat resistance by Mg as discussed above. The support amount of Ba per 1 L of the substrate is preferably 25 to 60 g.

In the above catalyst for purifying an exhaust gas, the mass ratio of Ba, Sr, and Mg in the catalyst layer is preferably Ba:Sr:Mg=30:(8 to 20):(8 to 12).

This provides an advantage in improving the heat resistance of the NOx absorber while suppressing the S poisoning of the NOx absorber.

In the above catalyst for purifying an exhaust gas, the mass ratio of Ba, K, Sr, and Mg in the catalyst layer is preferably Ba:K:Sr:Mg=30:(2 to 12):(8 to 20):(8 to 12).

This provides a further advantage in improving the heat resistance of the NOx absorber while suppressing the S poisoning of the NOx absorber.

In the above catalyst for purifying an exhaust gas, the support amount of K per 1 L of the substrate is preferably 2 to 12 g.

In other words, the above-discussed promotion of crystallization of Ba—Sr double carbonate by K, and the effect of improving the heat resistance of the catalyst resulted therefrom are exerted when the support amount of K is 2 g/L or more. It should be noted, however, that when the support amount of K exceeds 12 g/L, the exertion of the effect becomes weak. In this case, a more preferable support amount of K is 4 to 10 g/L.

Also, in the above catalyst for purifying an exhaust gas, the support amount of K per 1 L of the substrate is preferably 2 to 6 g.

In other words, because the support amount of K per 1 L of the substrate is set to 6 g/L or less, when the oxygen concentration in the exhaust gas drops after being exposed to a high temperature atmosphere (when an atmosphere with reductants ($\lambda \leq 1$) is reached), it is possible to suppress deterioration of HC oxidation-purifying performance due to the precious metal.

Also, because the support amount of K per 1 L of the substrate is set to 2 g/L or more, it is possible to achieve the above-discussed effects in preventing the S poisoning of Ba, Mg and Sr by K. Hence, it is possible to purify NOx released from the NOx absorber when the lean combustion operation is switched to the theoretical air-fuel ratio combustion operation or rich combustion operation by reacting NOx with HC in a satisfactory manner.

In case that the support amount of K per 1 L of the substrate is 2 to 6 g, a mass ratio of Ba and K in the catalyst layer is preferably Ba:K=(5 to 15):1.

In other words, because the mass ratio of the support amount of Ba to the support amount of K is set to 5 or higher, the NOx absorption ability will not be deteriorated because the support amount of Ba is too small. Also, because the mass ratio is set to 15 or less, neither the NOx absorbing site of Ba will be decreased by sintering caused when the catalyst is calcined, nor Ba will be crystallized on the substrate and separated therefrom because the support amount of Ba is too large.

Hence, it is possible to properly perform the function to allow NOx released from Ba to react with HC in a satisfactory manner when the oxygen concentration becomes high (at the theoretical air-fuel ratio combustion operation or rich combustion operation) without deteriorating the NOx absorption ability of Ba when the oxygen concentration in the exhaust gas is high (at lean combustion operation of the engine).

In the above catalyst for purifying an exhaust gas, when the oxygen concentration in the exhaust gas is high means when the oxygen concentration is, for example, 5% or higher.

In the above catalyst for purifying an exhaust gas, the engine may be a lean burn gasoline engine or a diesel engine.

Also, the present invention provides a method of manufacturing a catalyst for purifying an exhaust gas, disposed in an exhaust passage of an engine, for lowering the NOx concentration in an exhaust gas containing NOx, sulfur, and oxygen, characterized by including the steps of:

forming an alumina layer by coating a substrate with alumina; and impregnating the alumina layer with a Ba solution, a K solution, a Sr solution, a Mg solution, and a precious metal solution.

This makes it possible to obtain an exhaust gas purifying catalyst in which the catalyst layer is formed on the substrate by supporting Ba, K, Sr, and Mg as NOx absorber and the precious metal for reducing NOx on alumina. Consequently, it is possible to improve the heat resistance of the NOx absorber while suppressing the S poisoning of the NOx absorber.

In the above method of manufacturing a catalyst for purifying an exhaust gas, each of the Ba solution, the K solution, the Sr solution, and the Mg solution may be a solution of acetic acid.

In the above method of manufacturing a catalyst for purifying an exhaust gas, it is preferable to form the alumina layer into a lamination by coating the substrate with the alumina twice, after which the Ba solution, the K solution, the Sr solution, the Mg solution, and the solution of the precious metal are impregnated into the two alumina layers.

In other words, in a case where a thick catalyst layer is formed on the substrate, if the substrate is coated with alumina at one time, an amount of alumina is so large that the thickness of the alumina layer readily becomes irregular. Also, it takes a time to dry and calcine the alumina layer. On the contrary, coating alumina twice separately as discussed above is advantageous in attaining the alumina layer with an even thickness, and it also shortens a drying and calcining time. Also, by providing a double-layer alumina layer, when the NOx absorber is impregnated, the concentration of the NOx absorber in the outer alumina layer is higher than that in the inner alumina layer, and therefore, SOx is chiefly trapped by the NOx absorber on the outer alumina layer, and the NOx absorber less damaged by the S poisoning can be secured on the inner alumina layer, which provides an advantage in maintaining the NOx purifying performance.

In the above method of manufacturing a catalyst for purifying an exhaust gas, it is preferable that the Ba solution, the K solution, the Sr solution, the Mg solution, and the solution of the precious metal are mixed and impregnated into the alumina layer simultaneously.

In other words, if the solution of the precious metal and the solutions of the NOx absorber are separated from each other, and the solution of the precious metal is impregnated first, then the precious metal is covered with the NOx absorber impregnated later and is readily buried in the alumina layer. On the other hand, if the solution of the precious metal is impregnated later, the NOx absorber impregnated and supporting first, especially Ba, dissolves into the solution of the precious metal, which causes unsatisfactory dispersion.

On the contrary, if the solutions are impregnated simultaneously like in the present invention, it is possible to place the precious metal in close proximity to the NOx absorber without burying the precious metal, and unsatisfactory Ba dispersion does not occur, which is advantageous to reduction-purification of NOx. Also, by the simultaneous impregnation of the solutions of four kinds of the NOx absorber, it is possible to efficiently form the above-described Ba—Sr compound or Ba—Mg coexisting substance and to disperse K in the periphery of these compounds. This is advantageous not only in suppressing the S poisoning of the NOx absorber, but also in making the NOx absorber into fine particles, in particular, in making Ba and Mg into fine particles by Sr, thereby making it possible to increase the heat resistance of the catalyst.

In the above method of manufacturing a catalyst for purifying an exhaust gas, in a case where the Ba solution, the K solution, the Sr solution, and the Mg solution are divided into two groups including a group which is impregnated into the alumina layer first, and a group which is impregnated later, it is preferable to impregnate the K solution later.

In other words, in a case where the Ba solution, the K solution, the Sr solution, and the Mg solution are impregnated into the alumina layer simultaneously, if too large amounts of Ba, K, Sr, and Mg are to be supported, the concentrations of these kinds of metals in their respective impregnation solutions becomes high, and for example, Ba with low solubility may not be dissolved and remain in the impregnation solution. In this case, impregnation of these metal components becomes uneven, which causes deterioration of the catalytic performance.

On the contrary, heating the impregnation solutions can raise the solubility of metal components, so that the entire metal components are dissolved without increasing a total amount of the impregnation solutions, but this requires a heating process. In order to solve this problem, the Ba solution, the K solution, the Sr solution, and the Mg solution are divided into two groups including a group which is impregnated into the alumina layer first, and a group which is impregnated later, and the K solution is impregnated later.

In this case, because K neither forms a complex nor undergoes affinity with the other NOx absorber, it is not essentially necessary to impregnate the K solution simultaneously with the other NOx absorber. On the contrary, impregnating the K solution later is advantageous in placing K in the periphery of the other NOx absorber and hence in improving the heat resistance of the catalyst.

In the above method of manufacturing a catalyst for purifying an exhaust gas, in a case where the Ba solution, the K solution, the Sr solution, and the Mg solution are divided into two groups including a group which is impregnated into the alumina layer first, and a group which is impregnated later, it is preferable to impregnate the Sr solution first.

In other words, because it is assumed that Sr makes Ba and Mg into fine particles as discussed above, making Ba and Mg into fine particles by having Sr be supported first is advantageous in increasing the heat resistance of the catalyst.

Also, the present invention provides a device for purifying an exhaust gas as shown in FIG. 1, comprising:

a NOx absorber 25, disposed in an exhaust passage 22 of an engine 1 or the like, for absorbing NOx and a sulfur component in an exhaust gas in an excess oxygen atmosphere where an oxygen concentration in the exhaust gas is high, and releasing NOx absorbed therein as the oxygen concentration drops;

sulfur excessive absorption determining means a for determining an excessive absorption state of the sulfur component in the NOx absorber 25; and sulfur detaching means b for, when the sulfur excessive absorption determining means a determines the excessive absorption state of the sulfur component, causing the NOx absorber 25 to detach the sulfur component by raising a temperature of the NOx absorber 25 while lowering the oxygen concentration, characterized in that at least one of K, Sr, Mg, and La, and Ba are included as elements forming the NOx absorber 25.

According to the above arrangement, by activating the sulfur detaching means b after the sulfur component (SOx) in the exhaust gas is absorbed excessively into the NOx absorber 25, the NOx absorption ability is readily regenerated to nearly the ability before the sulfur component were absorbed. In other words, the NOx absorber 25 has higher NOx absorption ability after the regeneration (regeneration from the S poisoning, and the same applies to the description below) or causes less deterioration of the NOx absorption ability when exposed to high temperatures, that is, the heat resistance becomes high, compared with a case where the NOx absorber is composed of Ba alone. This improvement of the heat resistance plays advantageously for the regeneration of the NOx absorber 25. The relation between the improvement of the heat resistance and the regeneration of the NOx absorber 25 is as follows.

In other words, the sulfur detaching means b causes the NOx absorber 25 to detach sulfur component not only by lowering the oxygen concentration in the exhaust gas, but also by raising the temperature of the NOx absorber 25. Hence, if the NOx absorber has a poor heat resistance, it becomes difficult to raise the temperature of the NOx absorber 25 for detaching the sulfur component, which makes it impossible to achieve the originally intended object. On the contrary, if the heat resistance of the NOx absorber 25 becomes high like in the present invention, it is possible to regenerate the NOx absorption ability by effectively using the sulfur detaching means b. In short, it is possible to avoid deterioration of the NOx absorber 25 by heat generated at the sulfur detaching treatment.

The reason why the present invention can make the NOx absorption ability after the regeneration higher or why it can improve the heat resistance compared with a case where the NOx absorber is composed of Ba alone is not obvious, but it is assumed as follows.

That is, it is assumed that any of the elements (K, Sr, Mg, or La) other than Ba is more susceptible to the S poisoning than Ba, and for this reason, the S poisoning of Ba is comparatively small, which lessens deterioration of the NOx absorption ability after the S poisoning. In other words, because Ba has higher NOx absorption ability than the other elements, the presence of the other elements makes the S poisoning of Ba relatively small, and thereby the deterioration of the NOx absorption ability is lessened.

It is also assumed that any of the other elements (K, Sr, Mg, or La) regenerates from the S poisoning more readily than Ba, and for this reason, the NOx absorption ability after the regeneration becomes high. In other words, although a sulfate of a produced compound of Ba and SOx is stable, but a sulfate of the other elements is less stable than sulfate of Ba. Hence, it is assumed that when a temperature rises high in a low oxygen concentration atmosphere, SOx is readily detached.

It is also assumed that formation of a complex by Ba with any of the other elements (Sr, Mg or La) except K (formation of a mixed oxide or double salt or turning into an almost amorphous state by coming in close proximity to each other or bonding with each other) makes the occurrence of the S poisoning difficult.

Further, when an amount of Ba is increased as a single element forming the NOx absorber 25, neither the NOx absorption ability before the S poisoning nor the NOx absorption ability after the regeneration is improved significantly. The reason for this is assumed that when an amount of Ba exceeds a certain amount, only a particle size is increased and a specific surface area remains the same. On the contrary, in a case where Ba and the other elements (at least one of K, Sr, Mg and La) are combined, it is assumed that each element resides separately because of a difference in their natures, which not only increases a specific surface area or a reaction site, but also makes the occurrence of heat sintering difficult. Further, it is assumed that the interaction of different elements forming the NOx absorber makes detachment of the sulfur component readily.

Also, combining Ba and the other elements (at least one of K, Sr, Mg and La) as discussed above is effective in making the NOx absorber into fine particles, and Sr is particularly effective in making Ba and Mg into fine particles. Consequently, the NOx absorber disperses on the substrate at a high degree, which makes the occurrence of heat sintering difficult. In short, the heat resistance of the catalyst becomes high.

Also, in case that the substrate is alumina, Ba and the substrate reacts with each other when the catalyst is heated high, which readily causes deterioration. However, because Mg suppresses the reaction between the substrate and Ba, the heat resistance of the catalyst is improved.

In a case where Ba and the foregoing other elements (at least one of K, Sr, Mg and La) are supported on a substrate of a honeycomb shape or the like, the support amount of Ba per 1 L of the substrate is approximately 10 to 50 g, and preferably 20 to 40 g, and the support amounts of the other elements are preferably as large as or less than the support amount of Ba.

The excess oxygen exhaust gas with high oxygen concentration is, for example, an exhaust gas (oxygen concentration is approximately 4 to 20%) when an engine is run on a lean mixture (particularly, A/F=18 to 50) with an air-fuel ratio A/F>16.

As the elements forming the NOx absorber 25, it is preferable to include K in addition to Ba. According to this arrangement, the NOx absorption ability before the S poisoning becomes high. Also, because K does not form a complex with Ba, but is highly reactive with sulfur, K resides in the periphery of Ba and prevents the S poisoning of Ba, thereby suppressing deterioration of the NOx absorption ability caused by the S poisoning of Ba. Also, because it is assumed that K detaches the sulfur component more readily than Ba, the NOx absorption ability after the regeneration becomes high. A preferable mass ratio of Ba and K is, for example, Ba:K=30:(1 to 30).

As the elements forming the NOx absorber 25, it is preferable to include at least one of Sr, Mg, and La in addition to Ba and K. This makes the NOx absorber 25 have a high heat resistance, which is advantageous in avoiding heat deterioration at the sulfur detaching treatment.

Also, according to an analysis, it appears that Ba and Sr (at least a part of each) form one compound (mixed oxide or double salt) with both the elements being constituent elements. It is assumed that such a Ba—Sr compound (hereinafter, referred to as a double compound as needed) is less susceptible to the S poisoning compared with the case of Ba alone, and for this reason, deterioration of the NOx absorption ability is suppressed.

Also, according to an analysis, it appears that Ba and Mg (at least a part of each) do not form a crystal, but are in an almost amorphous state by coming in close proximity to each other or bonding to each other. It is assumed that such a Ba—Mg coexisting substance suppresses the S poisoning of Ba compared with the case of Ba alone, and for this reason, deterioration of the NOx absorption ability is suppressed.

Also, it is affirmed from analysis that K neither forms a complex nor undergoes affinity with Ba, Sr, and Mg, and resides dispersedly in the periphery of the Ba—Sr compound or Ba—Mg coexisting substance. K with the foregoing nature is relatively highly reactive with sulfur, and therefore, is assumed to prevent the S poisoning of Ba—Sr compound or the Ba—Mg coexisting substance.

In a case where Ba, K, and Mg are used as the elements forming the NOx absorber 25 and are supported on a substrate of a honeycomb shape or the like, it is preferable to set the support amount of Ba to 10 to 50 g, the support amount of K to 1 g or more (the upper limit is, for example, 15 g), and the support amount of Mg to 3 to 17 g per 1 L of the substrate. It is more preferable to set the support amount of Mg to 5 to 15 g and further 8 to 12 g. Consequently, the heat resistance can be obtained, and also regeneration properties from the S poisoning becomes satisfactory. A preferable mass ratio of Ba, K, and Mg is, for example, Ba:K:Mg=30:(1 to 30):(1 to 30).

In a case where Ba, K, and Sr are used as the elements forming the NOx absorber 25 and are supported on a substrate of a honeycomb shape or the like, the support amount of Ba and the support amount of K per 1 L of the substrate may preferably be equal to those in the above Ba—K—Mg-based absorber, and the support amount of Sr may be 10 to 20 g. The support amount of Sr may preferably be 13 to 17 g. Consequently, the heat resistance can be obtained, and also regeneration properties from the S poisoning becomes satisfactory. A preferable mass ratio of Ba, K, and Sr is, for example, Ba:K:Sr=30:(1 to 30):(1 to 30).

As the elements forming the NOx absorber 25, it is preferable to include Sr in addition to Ba. Thus, the NOx absorber 25 has a high heat resistance, which provides an advantage in avoiding heat deterioration during the sulfur detaching treatment.

As the elements forming the NOx absorber 25, it is preferable to include at least one of Mg and La in addition to Ba and Sr. Thus, the NOx absorber 25 has a high heat resistance, which provides a further advantage in avoiding heat deterioration during the sulfur detaching treatment.

As the elements forming the NOx absorber 25, it is preferable to include Mg in addition to Ba. Thus, the NOx absorber 25 has a high heat resistance, which provides an advantage in avoiding heat deterioration during the sulfur detaching treatment.

As the elements forming the NOx absorber 25, it is preferable to include La in addition to Ba and Mg. Thereby, the NOx absorber 25 has a high heat resistance, which provides a further advantage in avoiding heat deterioration during the sulfur detaching treatment.

Raising the temperature of the NOx absorber 25 by the sulfur detaching means b can be achieved by raising a temperature of an exhaust gas, and for example, increasing a temperature of the exhaust gas to 500 to 1100° C. (preferably 600 to 1100° C.) is advantageous to detachment of sulfur from the NOx absorber 25. Alternatively, a heater may be provided to the NOx absorber 25 so that the heater is heated. Also, lowering of oxygen concentration in the exhaust gas by the sulfur detaching means b can be achieved by controlling an air-fuel ratio in the engine, and for example, by setting λ (oxygen-excessive ratio) to around 1 or to 1 or less, oxygen concentration in the exhaust gas becomes 0.5% or less, and further, an amount of reduction components, such as HC, CO, and $H_2$, in the exhaust gas is increased, which is advantageous to detachment of the sulfur component from the NOx absorber 25.

In case that a spark ignition direct injection engine is used as the engine, the sulfur detaching means b is preferably fuel injection control means that operates a fuel injection valve to divide injection, so that fuel is injected into a combustion chamber in the cylinder at least twice from a start of an air-intake stroke and an end of a compression stroke. Consequently, it is possible to raise the temperature of the NOx absorber 25 by increasing the temperature of the exhaust gas while lowering the oxygen concentration in the exhaust gas. In particular, the divided injection as discussed above can raise CO concentration in the exhaust gas, which is further advantageous to detachment of the sulfur component from the NOx absorber 25.

More specifically, in a case where the NOx absorber 25 is Ba, it is assumed that SOx is adsorbed on the surface of barium particles in the form of sulfate, and barium sulfate undergoes the following reaction with a supply of CO, so that barium carbonate and sulfur dioxide are generated.

$$BaSO_4 + CO \rightarrow BaCO_3 + SO_2 \uparrow \text{ (coefficients omitted)}$$

Meanwhile, a so-called water gas shift reaction between CO and water in the exhaust gas proceeds with increasing CO concentration, and as a result, hydrogen is generated at the reaction site on the catalyst.

$$CO + H_2O \rightarrow H_2 + CO_2$$

Then, hydrogen causes the sulfur component adsorbed in the NOx absorber 25 to be detached, which is advantageous to detachment of the sulfur component. Moreover, because the water gas shift reaction can proceed at a relatively low temperature, the temperature of the NOx absorber 25 does not have to be raised significantly.

Also, as the sulfur excessive absorption determining means a for determining a sulfur component excessive absorption condition of the NOx absorber 25, it is possible to, for example, adopt means arranged so that an amount of absorbed SOx in the NOx absorber 25 is estimated based on a travel distance of an automobile and a total amount of fuel consumed on that distant with a consideration given to the temperature conditions of the NOx absorber 25 during a corresponding period, and the sulfur component excessive absorption condition is determined when the estimated amount exceeds a predetermined value.

Also, the present invention provides an exhaust gas purifying method of purifying an exhaust gas containing NOx and sulfur component, characterized in that:

when the exhaust gas is in an excess oxygen absorption condition where an oxygen concentration is high, the exhaust gas is brought into contact with an NOx absorber 25 including at least one of K, Sr, Mg, and La, and Ba, so that NOx and the sulfur component are absorbed into the NOx absorber 25; and when a sulfur component absorption condition of the NOx absorber 25 becomes a predetermined excessive absorption condition, the sulfur component are detached from the NOx absorber 25 by raising a temperature of the NOx absorber 25 and lowering the oxygen concentration in the exhaust gas.

In other words, according to the above method, as can be obvious from the foregoing description, when the NOx absorption ability of the NOx absorber 25 is deteriorated by the S poisoning, the NOx absorption ability can be readily regenerated to a high level by causing the NOx absorber 25 to detach the sulfur component, which is advantageous to NOx purification.

Also, the present invention provides an exhaust gas purifying catalyst for decreasing NOx in an exhaust gas from an engine that is run in such a manner that an exhaust gas therefrom contains sulfur and oxygen and oxygen concentration therein drops intermittently, comprising:

a substrate; and a catalyst layer formed on the substrate by supporting, on alumina, a NOx absorber that absorbs NOx when an oxygen concentration in the exhaust gas is high and releases NOx when the oxygen concentration drops, and a precious metal for reducing NOx, characterized in that the NOx absorber includes Ba, K, Sr, and Mg.

Hence, when an engine is run to increase the oxygen concentration in the exhaust gas, the NOx absorber absorbs NOx in the exhaust gas, and when the engine is run to lower the oxygen concentration in the exhaust gas, NOx is released from the NOx absorber, so that NOx is purified by means of reduction with the precious metal. The exhaust gas purifying catalyst as discussed above can obtain a heat resistance, and also is advantageous in improving the regeneration properties from the S poisoning.

BRIEF DESCRIPTION OF THE ACCOMPANYING DRAWINGS

FIG. 34 is a graph showing influences of an impregnation order of the NOx absorber to resistance to the S poisoning and regeneration properties from the S poisoning of the catalyst;

BEST MODE FOR CARRYING OUT THE INVENTION

The following description will describe in detail the present invention with reference to the accompanying drawings.

Firstly, an entire arrangement of an engine will be explained.

Figure 1:
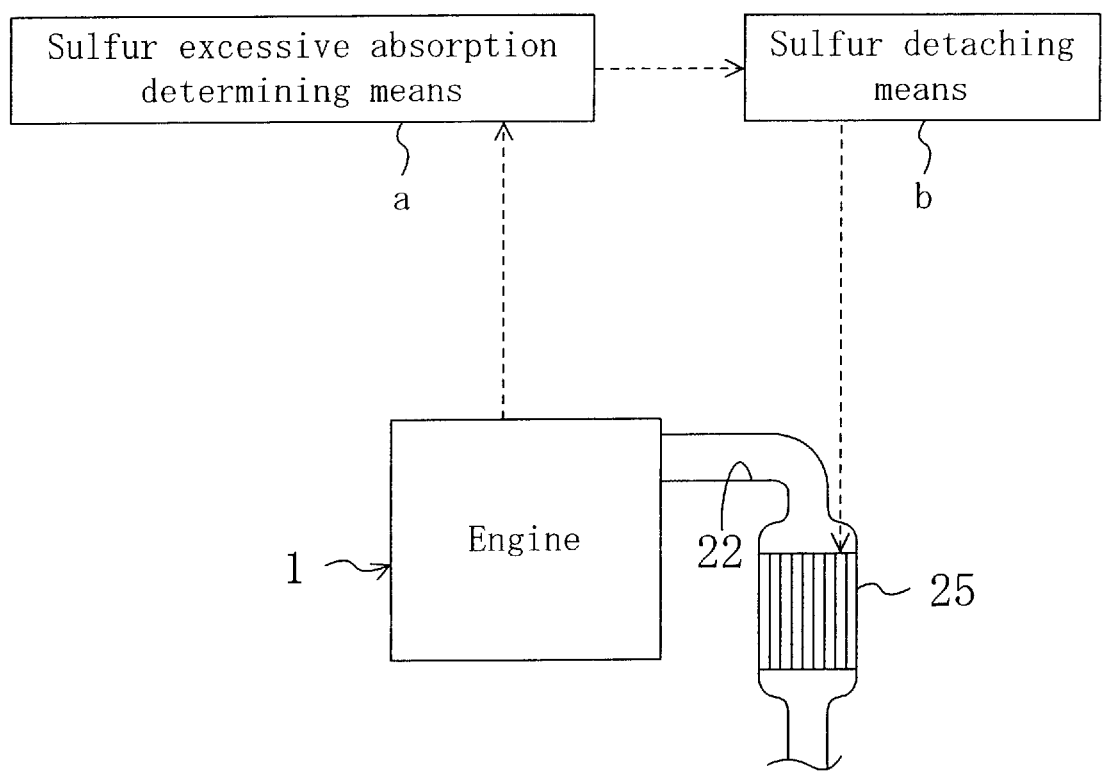
FIG. 1 is an explanatory view showing an arrangement of an exhaust gas purifying device according to the present invention.
Figure 2:
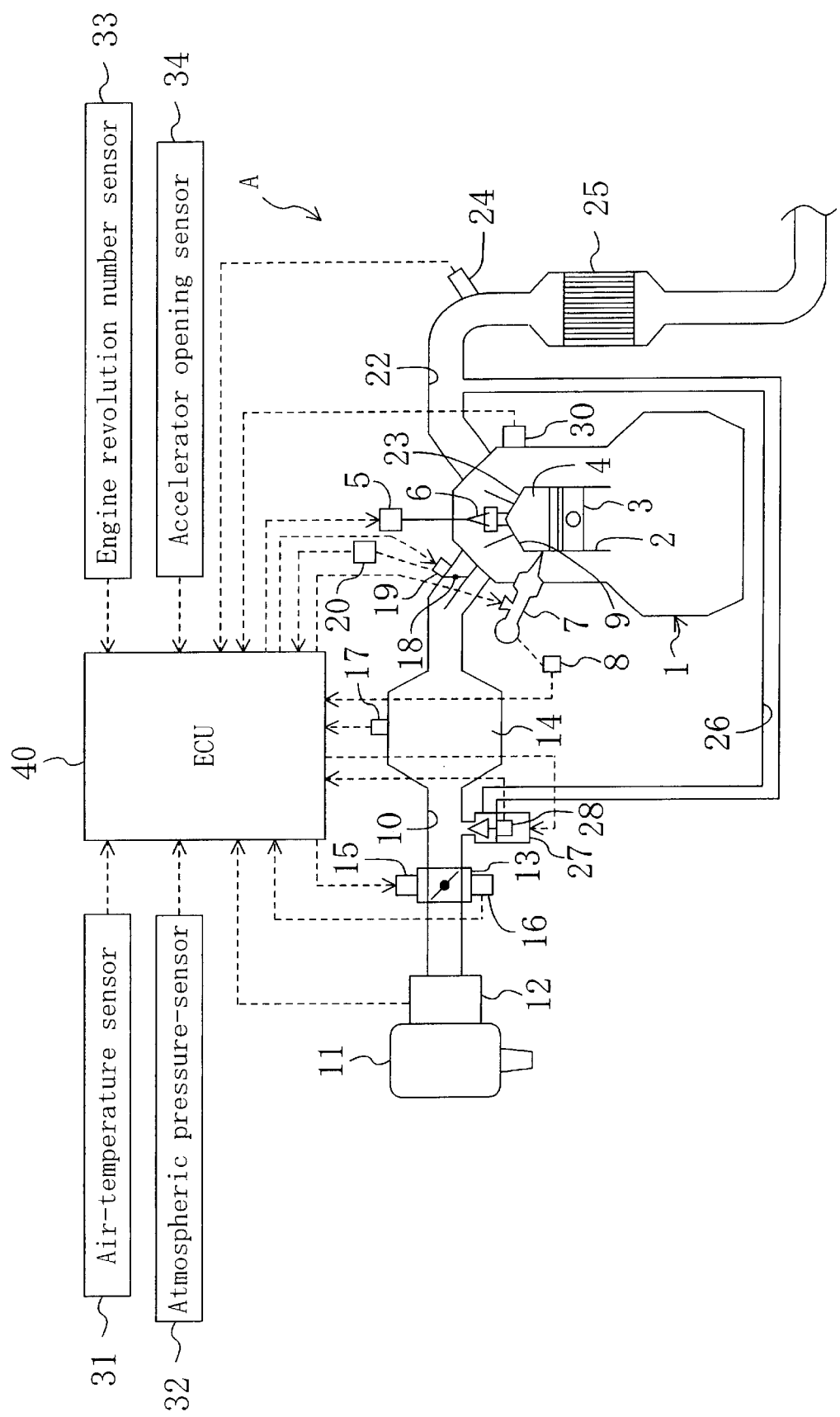
FIG. 2 is a schematic view of an exhaust gas purifying device according to one embodiment of the present invention.

FIG. 2 is a view showing an entire arrangement of an engine equipped with a device A for purifying an exhaust gas according to one embodiment of the present invention. In the drawing, numeral 1 denotes a multi-cylinder engine mounted on an automobile, and a combustion chamber 4 is defined in a cylinder 2 by a piston 3 fitted into each cylinder 2. An ignition plug 6 connected to an ignition circuit 5 is attached to the upper wall of the combustion chamber 4 on the cylinder axis to face the combustion chamber 4. Also, an injector (fuel injection valve) 7 for directly injecting fuel into the combustion chamber 4 is attached at the periphery portion of the combustion chamber 4.

Although it is not shown in the drawing, a fuel supply circuit having a high-pressure fuel pump, a pressure regulator, etc. is connected to the injector 7. The fuel supply circuit supplies the injector 7 with fuel from a fuel tank while adequately adjusting a pressure of the fuel, and is provided with a fuel pressure sensor 8 for detecting a fuel pressure. When the injector 7 injects the fuel at the latter half of a compression stroke of the cylinder 2, the fuel spray is trapped in the concave cavity (not shown) at the top face of the piston 3, whereby a layer of a relatively rich mixture is formed in the vicinity of the ignition plug 6. On the other hand, when the injector 7 injects the fuel in an air-intake stroke of the cylinder 2, the fuel spray is dispersed in the combustion chamber 4 and mixed with a drawn air (air), whereby a homogeneous mixture is produced in the combustion chamber 4.

The combustion chamber 4 communicates with an air-intake passage 10 through an air-intake port (not shown) that is opened and closed by an air-intake valve 9. The air-intake passage 10 supplies the combustion chamber 4 of the engine 1 with a drawn air filtered by an air cleaner 11, and a hot wire type air flow sensor 12 for detecting an amount of drawn air, an electric throttle valve 13 for throttling the air-intake passage 10, and a surge tank 14 are sequentially provided therein from upstream to downstream. The electric throttle valve 13 is not mechanically linked to an accelerator pedal outside of the drawing, and is driven to open and close by a motor 15. Further, the throttle valve 13 is provided with a throttle opening degree sensor 16 for detecting an opening degree thereof, and the surge tank 14 is provided with an air-intake pressure sensor 17 for detecting an air-intake pressure inside the surge tank 14.

The downstream of the air-intake passage 10 from the surge tank 14 branches for each cylinder 2 and each forms an independent passage. Each independent passage branches into two at the downstream end and each communicates with the air-intake port. One of the two branched passage is provided with a swirl control valve 18. The swirl control valve 18 is driven to open and close by an actuator 19. When the swirl control valve 18 is closed, the air-intake is supplied to the combustion chamber 4 through the other branched passage alone, so that a strong intake swirl is generated in the combustion chamber 4, whereas the swirl of drawn air is weakened as the swirl control valve 18 opens. Also, a swirl control valve opening degree sensor 20 for detecting an opening degree of the swirl control valve 18 is provided.

Figure 3:
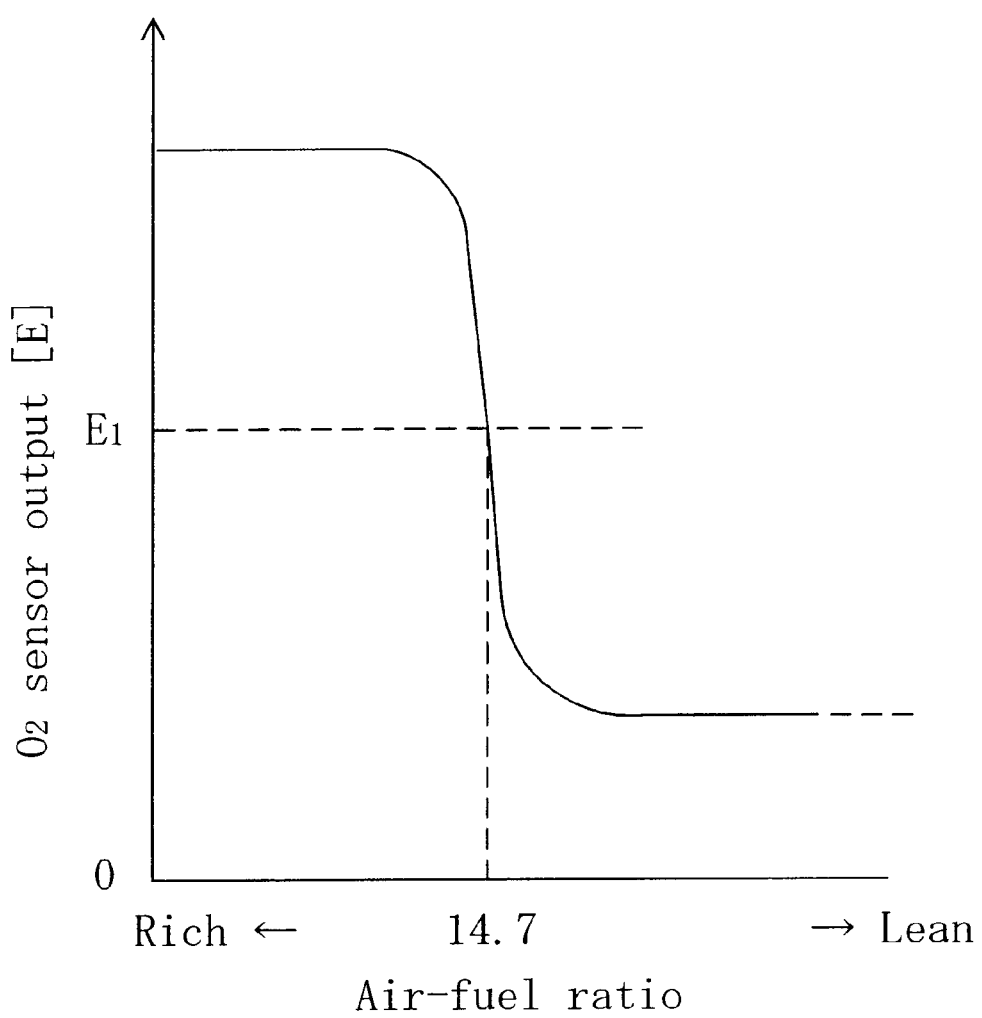
FIG. 3 is a view showing output characteristics of an $O_2$ sensor in response to a change in an air-fuel ratio.

In FIG. 2, numeral 22 denotes an exhaust gas passage for discharging a combustion gas from the combustion chamber 4, and the upstream end of the exhaust gas passage 22 branches for each cylinder 2, and communicates with the combustion chamber 4 through an exhaust gas valve 23 by an unillustrated exhaust gas port. The exhaust gas passage 22 is provided with an $O_2$ sensor 24 for detecting an oxygen concentration in the exhaust gas and a catalyst 25 for purifying the exhaust gas, which are arranged sequentially from upstream to downstream. As shown in FIG. 3, an output (electromotive force) of the $O_2$ sensor 24 reaches a reference value E1 when the oxygen concentration in the exhaust gas is the concentration (approximately 0.5%) substantially corresponding to a theoretical air-fuel ratio, but the output increases abruptly when the concentration is higher than that (rich side) and decreases abruptly when the concentration is lower than that (lean side). That is, the $O_2$ sensor 24 is composed of a so-called lambda $O_2$ sensor whose output is inverted stepwise at the point of the theoretical air-fuel ratio.

Figure 4:
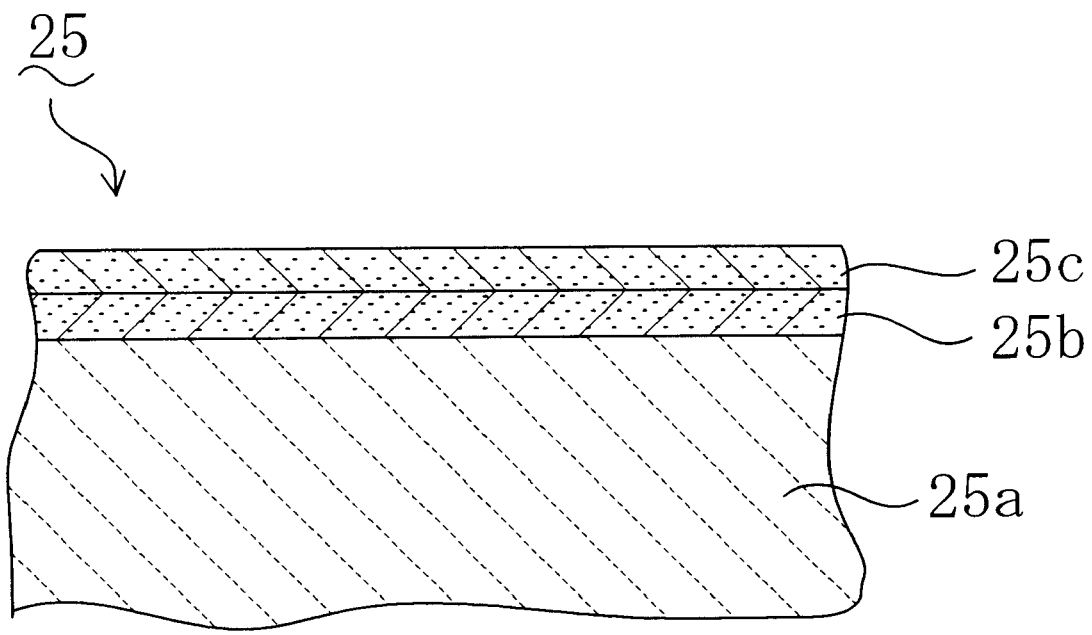
FIG. 4 is a cross section showing a schematic arrangement of an exhaust gas purifying catalyst according to the present invention.

Also, the catalyst 25 is of a NOx absorbing and reducing type that absorbs NOx in an excess oxygen atmosphere where the oxygen concentration in the exhaust gas is high, while releasing absorbed NOx as the oxygen concentration drops for reduction-purification. The lean NOx catalyst 25 has a substrate of a honeycomb structure made of cordierite, and as shown in FIG. 4, an inner catalyst layer 25b and an outer catalyst layer 25c arranged over the inner catalyst layer 25b are formed on the wall surface of each through hole of the substrate. Alpha-numeral 25a denotes the substrate.

Further, the exhaust gas passage 22 in the upstream from the $O_2$ sensor 24 is connected to the upstream end of an EGR passage 26, and the downstream end of the EGR passage 26 is connected to the air-intake passage 10 somewhere between the throttle valve 13 and surge tank 14, so that a part of the exhaust gas is recirculated to the air-intake system. An electric EGR valve 27 for regulating the opening degree of the passage is provided near the downstream end of the EGR passage 26, so that an amount of recirculated exhaust gas (hereinafter, referred to as EGR amount) through the EGR passage 26 is regulated. The EGR passage 26 and EGR valve 27 together form exhaust gas recirculation means. Also, a lift sensor 28 for detecting an amount of lift of the EGR valve 27 is provided.

The operations of the ignition circuit 5 of the ignition plug 6, injector 7, driving motor 15 of the electric throttle valve 13, actuator 19 of the swirl control valve 18, electric EGR valve 27, etc. are controlled by a control unit 40 (hereinafter, referred to as ECU). On the other hand, the ECU 40 receives output signals from the air flow sensor 12, throttle opening degree sensor 16, air-intake pressure sensor 17, swirl control valve opening degree sensor 20, $O_2$ sensor 24, and lift sensor 28 of the EGR valve 27. In addition, the ECU 40 receives output signals from a water temperature sensor 30 for detecting a temperature of cooling water of the engine 1 (engine water temperature) a drawn-air temperature sensor 31 for detecting a temperature of a drawn air, an atmospheric pressure sensor 32 for detecting an atmospheric pressure, an engine revolution number sensor 33 for detecting the number of revolution of the engine, and an accelerator opening degree sensor 34 for detecting an opening degree of the accelerator pedal (an amount of accelerator manipulation).

Next, the following description will describe a summary of the engine control.

Figure 5:
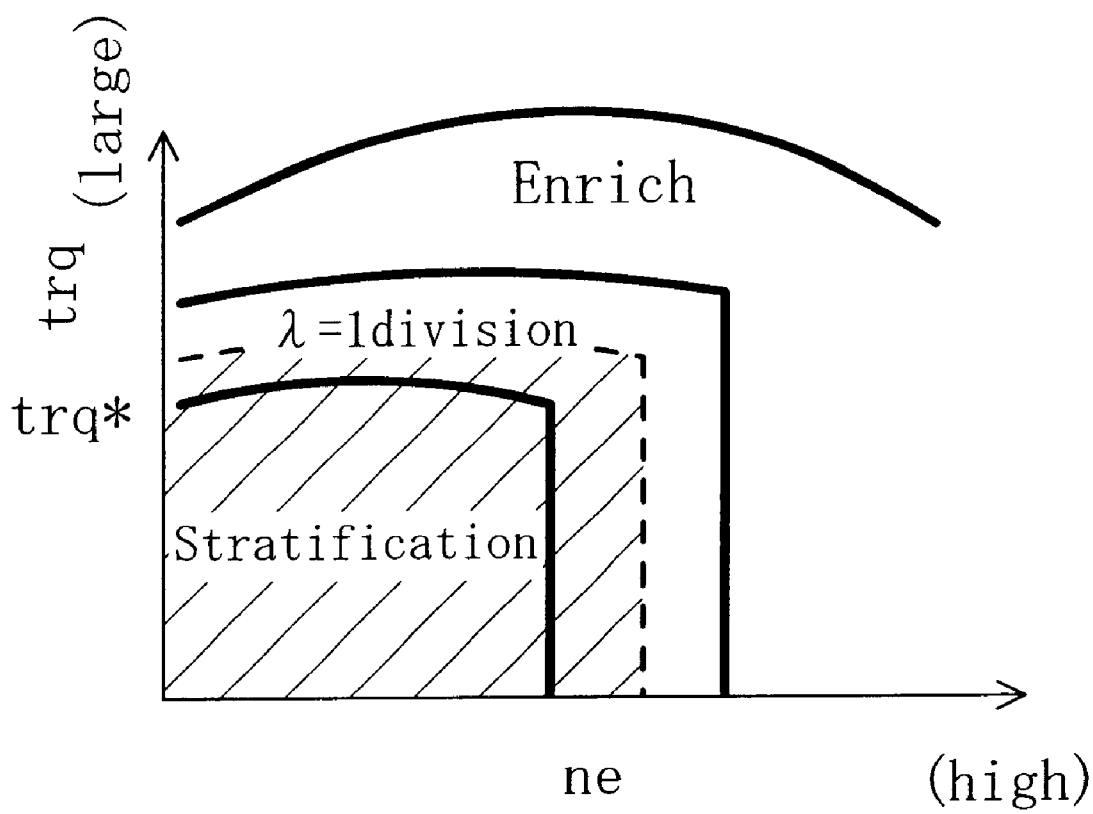
FIG. 5 is a view showing an example map, wherein operation regions of an engine for a stratified combustion mode, a $\lambda=1$ division mode, and an enriched mode are set.
Figure 6:
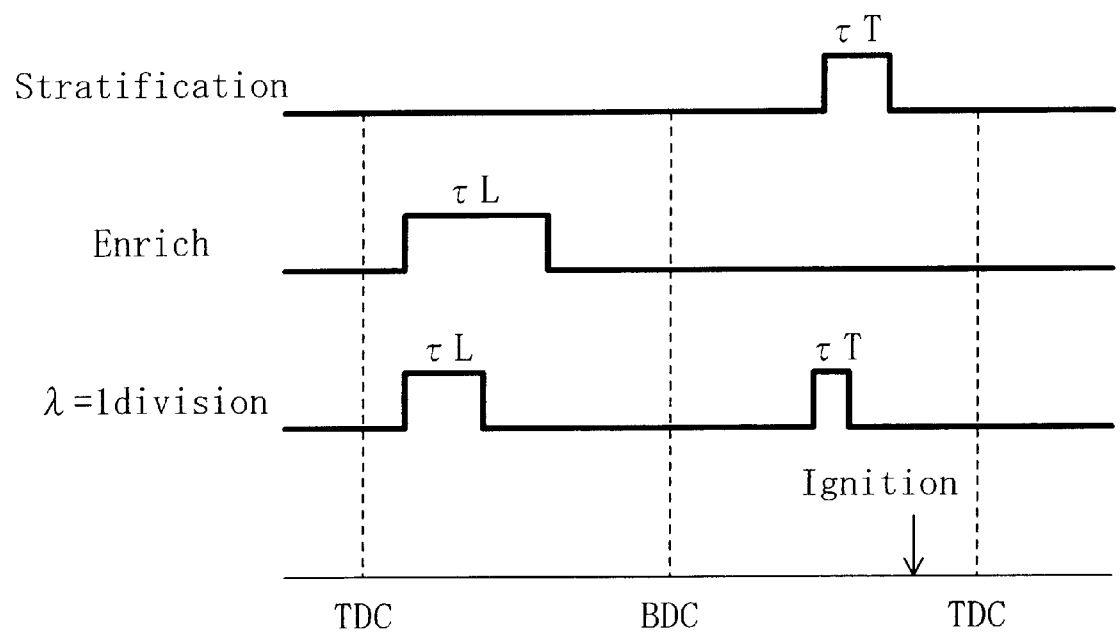
FIG. 6 is a time chart showing fuel injection timing in each operation region of the engine.

The engine 1 of the present embodiment is allowed to switch patterns (fuel injection timing, an air-fuel ratio, etc.) of fuel injection by the injector 7 depending on the operation condition, so that it can be run in different combustion conditions. More specifically, while the engine 1 is warmed, as shown in FIG. 5, a predetermined region at a side of a low load and a low number of revolutions is designed to be a stratified combustion region, and as shown in FIG. 6, the fuel is injected collectively by the injector 7 at the latter half of the compression stroke, whereby it is switched to a combustion mode where the fuel is burned in the stratified condition under which a mixture resides unevenly in the vicinity of the ignition plug 6. In the stratified combustion mode, a large opening degree is given to the throttle valve 13 to reduce a pump loss of the engine 1, which makes an average air-fuel ratio in the combustion chamber 4 to an extremely lean condition (for example, A/F=30 approximately).

On the other hand, the remaining operation region is designed to be a homogeneous combustion region, and in a $\lambda$=1 dividing region at the low load side, the injector 7 is controlled to divide injection, so that it injects fuel twice in total by injecting fuel once in the air-intake stroke and once in the compression stroke, while an amount of fuel injection and the opening degree of the throttle, etc. are controlled so that an air-fuel ratio of the mixture in the combustion chamber 4 is substantially equal to the theoretical air-fuel ratio (A/F=14.7) (hereinafter, referred to as $\lambda$=1 division mode). Also, in an enrich region within the homogeneous combustion region at the side of the high load or the high number of revolutions, the injector 7 is controlled to inject the fuel collectively at the former half of the air-intake stroke, while an air-fuel ratio is controlled to stay in a rich condition (for example, A/F=13 to 14) compared with the theoretical air-fuel ratio (hereinafter, referred to as enriched mode).

Also, in a diagonally shaded region in the control map of FIG. 5, the EGR valve 27 is opened so that a part of the exhaust gas is recirculated into the air-intake passage 10 through the EGR passage 26. Although it is not shown in the drawing, in order to achieve more stable combustion, the entire operation region of the engine 1 is designed to be the homogeneous combustion region while the engine 1 is cooled.

More specifically, depending on the operation condition of the engine 1, the ECU 40 determines various control parameters related to the engine output, including, for example, an amount of fuel injection and the injection timing of the injector 7, an amount of drawn air regulated by the throttle valve 13, the strength of air-intake swirl regulated by the swirl control valve 18, the EGR amount regulated by the EGR valve 27, etc.

Figure 7A:
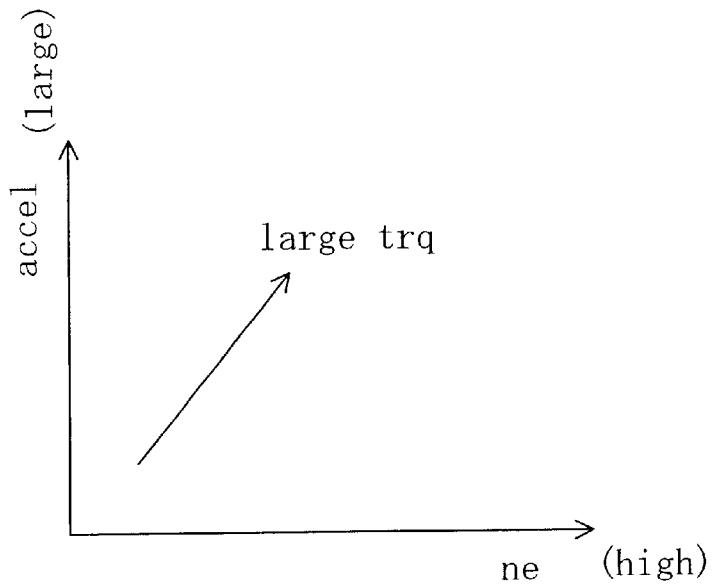
FIG. 7 is an explanatory view showing a map (a), wherein a desired torque of the engine corresponding to the number of revolutions of an engine and an opening degree of an accelerator is set, and a map (b), wherein an opening degree of a throttle valve corresponding to the number of revolutions of the engine and a desired torque is set.
Figure 7B:
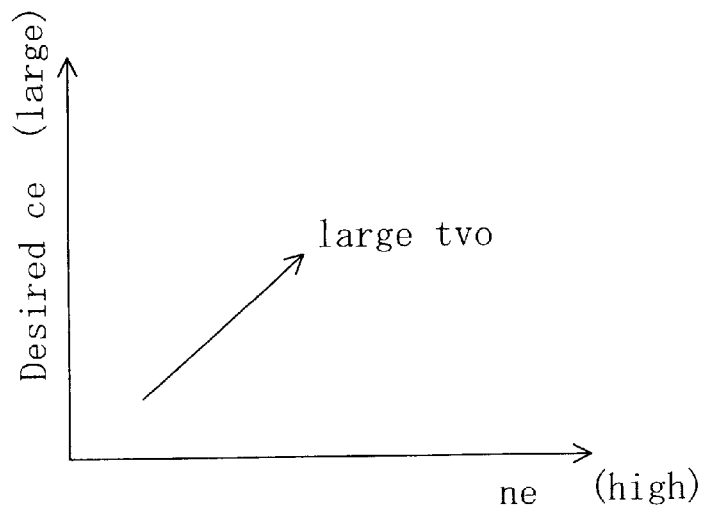

In other words, firstly, a desired torque trq of the engine 1 is computed based on the accelerator opening degree accel and the number of engine revolutions ne. A correlation of the desired torque trq with the accelerator opening degree accel and the number of engine revolutions ne is found in advance by a bench test or the like to obtain a required output performance. The correlation thus found is stored in the memory of the ECU 40 in the form of a map and a value corresponding to the actual accelerator opening degree accel and the number of engine revolutions ne is read out from this map. The correlation of the desired torque trq with the accelerator opening degree accel and the number of engine revolutions ne is, for example, the one shown in FIG. 7(*a*), wherein the desired torque trq rises as the accelerator opening degree accel increases and as the number of engine revolutions ne increases.

Subsequently, an operation mode is set based on the desired torque trq found in the above manner and the number of engine revolutions ne. That is, during the engine warming time, for example, when the desired torque trq is lower than a predetermined low load side threshold trq* and the number of engine revolutions ne is low, as shown in FIG. 5, the stratified combustion mode is set, while the homogeneous combustion mode is set in the other operation conditions. Further, in the case of the homogeneous combustion mode, either the λ=1 division mode or the enriched mode is selected according to the desired torque trq and the number of engine revolutions ne.

Subsequently, a desired air-fuel ratio afw is set for each operation mode. That is, in the stratified combustion mode or enriched mode, the desired air-fuel ratio afw is found from a map prepared in advance according to the desired torque trq and the number of engine revolutions ne, and in the λ=1 division mode, the desired air-fuel ratio afw is set to the theoretical air-fuel ratio. Then, a desired filling efficiency ce is computed based on the desired air-fuel ratio afw, the number of engine revolutions ne, and the desired torque trq, and further, a throttle opening degree tvo is found from a map (see FIG. 7(*b*)) prepared in advance according to the desired filling efficiency ce and the number of engine revolutions ne. It should be appreciated that the correlation between the number of engine revolutions and the throttle opening degree varies with the presence or absence of EGR, and the throttle opening degree tvo is set to be larger in a case where EGR is present than in a case where EGR is absent.

Also, an actual filling efficiency ce of the engine 1 is computed based on an output signal from the air flow sensor 12, and a basic fuel injection amount qbase is computed based on the actual injection efficiency ce and the desired air-fuel ratio afw:

$$qbase = KGKF \times ce/afw;$$

where KGKF is a conversion coefficient.

Meanwhile, a dividing ratio for dividing the fuel into the fuel to be injected in the air-intake stroke and the fuel to be injected in the compression stroke is set for each operation mode. In the stratified combustion mode, the injection ratio in the air-intake stroke is 0%, whereas the injection ratio in the air-intake stroke is 100% in the enriched mode. Further, in the λ=1 division mode, a dividing ratio is set according to the desired air-fuel ratio afw and the number of engine revolutions ne.

Further, the fuel injection timing is set for each of the above operation modes. Although it is not illustrated in the drawing, in the stratified combustion mode, the injection timing Inj_TT for the compression stroke injection is found from a map prepared in advance according to the desired torque trq and the number of engine revolutions ne. On the other hand, in the homogeneous combustion mode, the injection timing Inj_TL for the air-intake stroke injection is found from a table set in advance according to the number of engine revolutions ne. In addition, in the case of the divided injection, data in the stratified combustion mode is also used as the injection timing Inj_TT for the compression stroke injection, while the injection timing Inj_TL for the air-intake stroke injection is found from a map prepared in advance according to the desired air-fuel ratio afw and the number of engine revolutions ne.

Besides the foregoing, the ignition timing of the engine 1 is set for each operation mode. In the stratified combustion mode, the basic ignition timing is found based on chiefly the desired torque trq and the number of engine revolutions ne. On the other hand, in the λ=1 division mode or the enriched mode, the basic ignition timing is found based on the filling efficiency ce and the number of engine revolutions ne. The basic ignition timing thus found is corrected based on the engine water temperature, etc. Further, the swirl control valve 18 is controlled differently in each operation mode. In the stratified combustion mode, the opening degree of the swirl control valve 18 is set larger as the desired torque trq is larger and as the number of engine revolutions ne is higher. On the other hand, in the λ=1 division mode or the enriched mode, the opening degree of the swirl control valve 18 is set smaller as the desired torque trq is larger and as the number of engine revolutions ne is higher. Although it will be discussed in detail below, the EGR amount is controlled differently for each operation mode depending on the operation condition of the engine 1.

Next, the following description will describe the arrangement and the regeneration of the catalyst.

In the present embodiment, as has been discussed above, the lean NOx catalyst 25 of a so-called absorbing and reducing type is used, so that the fuel efficiency can be improved drastically by bringing the engine 1 in the stratified combustion condition in the low load region, while making it possible to decrease NOx in the exhaust gas under an extremely lean air-fuel ratio condition like in the stratified combustion condition. In order to allow the catalyst 25 to exert the purifying performance in a stable manner, the catalyst 25 is designed so that, when an amount of absorbed NOx reaches or exceeds a certain level, it releases NOx for reduction-purification. Also, it is designed in such a manner that, as a slight amount of SOx contained in the exhaust gas is gradually absorbed into the NOx absorber, an amount of absorbed SOx in the catalyst 25 gradually increases with a lapse of time to reach the extent to which it interferes with the NOx purifying performance, whereupon SOx is enforcedly detached from the catalyst 25.

The inner catalyst layer 25b of the lean NOx catalyst 25 is composed of a catalytic metal and a NOx absorber supported on a porous support material. Herein, Pt is used as the catalytic metal, and at least one of K, Sr, Mg, and La, and Ba are used as the NOx absorber while alumina and ceria-zirconia complex oxide (mixed oxide) are used as the support material.

Likewise, the outer catalyst layer 25c is composed of a catalytic metal and the NOx absorber supported on the porous support material. However, the catalytic metal includes Pt and Rh and the NOx absorber includes at least one of K, Sr, Mg, and La, and Ba while zeolite is used as the support material.

It should be appreciated that zeolite may be used as the support material of the inner catalyst layer 25b, and in this case, alumina or ceria may be used as the support material of the outer catalyst layer 25c. Further, although it is not illustrated in the drawing, the catalyst 25 may be of a single-layer coat type, in which a supporting layer of alumina or ceria is formed on the wall surface of the substrate, and the catalytic metal and NOx absorber are supported on the support material.

The regeneration of the catalyst 25 by detachment of NOx and SOx is performed when the NOx absorber is determined as in a sulfur component excessive absorption condition. More specifically, the regeneration is performed by controlling the air-fuel ratio in the combustion chamber 4 to be in the vicinity of the theoretical air-fuel ratio, and by dividing fuel injection by the injector 7 into two, so that the temperature of the NOx absorber is raised by raising the temperature of the exhaust gas while increasing the CO concentration in the exhaust gas drastically. Meanwhile, the CO concentration and HC concentration in the exhaust gas are varied periodically by changing the air-fuel ratio by alternately switching between the rich side and the lean side.

Next, the following description will describe, with reference to the flowcharts of FIGS. 8 through 11, the concrete procedure of the fuel injection control including the control procedure to regenerate the catalyst 25.

Figure 8:
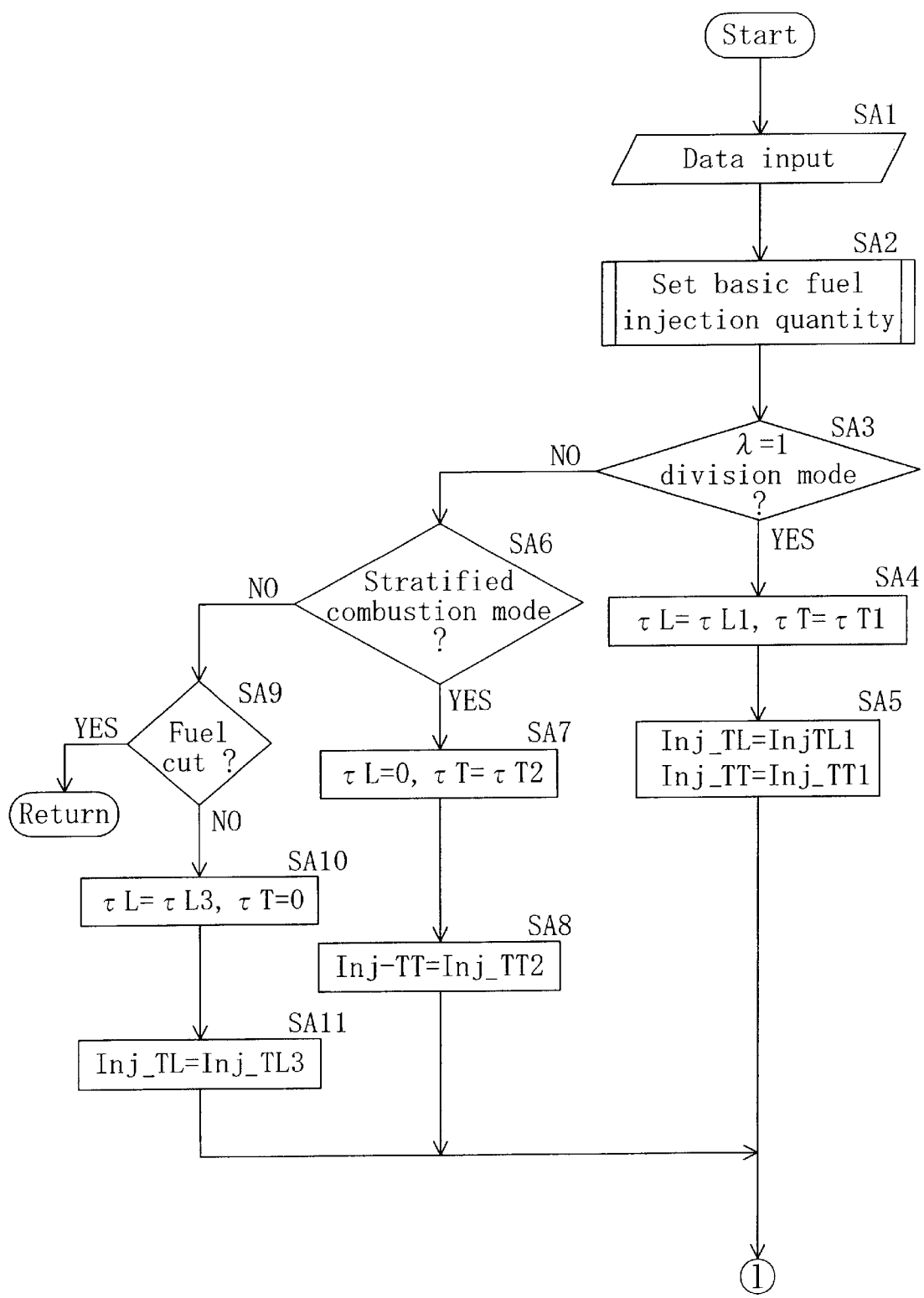
FIG. 8 is a flowchart detailing a procedure to set a basic fuel injection amount and fuel injection timing.

Firstly, as shown in FIG. 8, in step SA1 after the start of the flowchart, various sensor signals from the air flow sensor 12, $O_2$ sensor 24, water temperature sensor 30, the engine revolution number sensor 33, accelerator opening sensor 34, etc. are accepted, and various kinds of data are inputted from the memory of the ECU 40. Subsequently, in step SA2, the basic fuel injection amount qbase computed based on the filling efficiency ce, desired air-fuel ratio afw, etc. as discussed above is set.

Subsequently, in each of steps SA3 through SA9, the injection pulse widths $\tau L$ and $\tau T$, and the injection timings Inj_TL and Inj_TT, respectively for the air-intake stroke injection and the compression stroke injection are obtained for each operation mode. More specifically, in step SA3, whether the mode is the $\lambda=1$ division mode or not is determined, and in the case of YES, the flow proceeds to step SA4, where the basic fuel injection amount qbase is divided into the injection amount for the air-intake stroke injection and the injection amount for the compression stroke injection according to the dividing ratio, and the injection pulse width $\tau$ corresponding to each injection amount is set based on the characteristics of the injector 7 as follows: the air-intake stroke injection pulse width $\tau L=\tau L1$, and the compression stroke injection pulse width $\tau T=\tau T2$. Subsequently, in step SA5, the injection timing is set for each of the air-intake stroke injection and compression stroke injection (Inj_TL=Inj_TL1, Inj_TT=Inj_TT1).

Also, in the case of NO in step SA3 indicating that the mode is not the $\lambda=1$ division mode, the flow proceeds to step SA6, where whether the mode is the stratified combustion mode or not is judged. In the case of YES, the flow proceeds to step SA7, where it is set as the air-intake stroke injection pulse width $\tau T=0$, while the compression stroke injection pulse width $\tau L$ is set to a value $\tau T1$ corresponding to the basic fuel injection amount qbase. Subsequently, in step SA8, the injection timing for the compression stroke injection is set (Inj_TT=Inj_TT2). On the other hand, in the case of NO in step SA6 indicating that the mode is not the stratified combustion mode, the flow proceeds to step SA9, where whether the fuel cut control should be performed or not is determined. In the case of YES, the flow makes a return, and in the case of NO, the flow proceeds to step SA10, where the air-intake stroke injection pulse width $\tau L$ is set to a value $\tau L1$ corresponding to the basic fuel injection amount qbase, while it is set as the compression stroke injection pulse width $\tau T=0$. Then, in subsequent step SA11, the injection timing for the air-intake stroke injection is set (Inj_TL=Inj_TL3).

Figure 9:
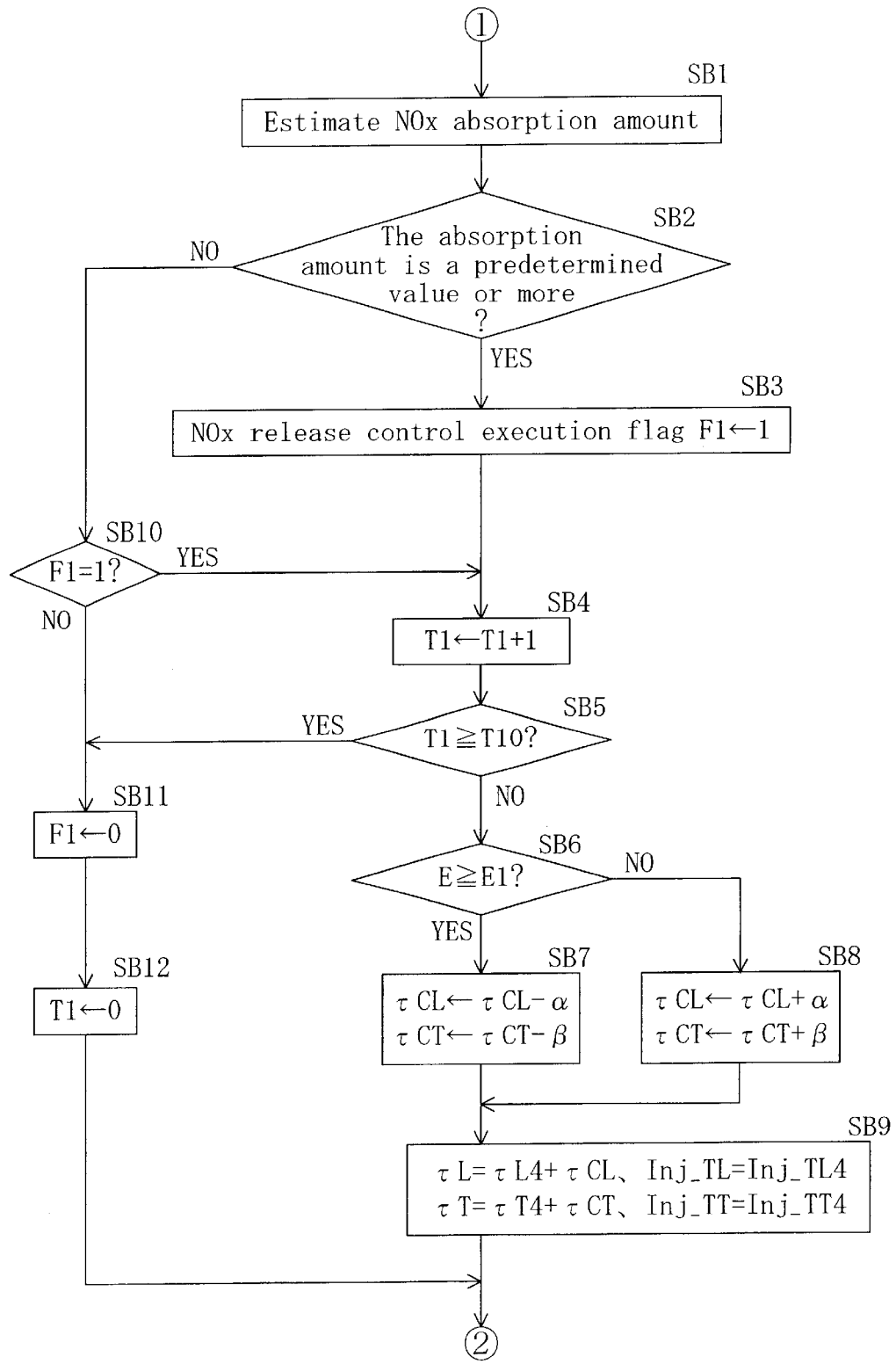
FIG. 9 is a flowchart detailing a procedure of NOx release control.

Following steps SA5, SA8, and SA11 of FIG. 8, in step SB1 of FIG. 9, the NOx absorption amount in the catalyst 25 is estimated. The estimation is made based on, for example, a travel distance and a total amount of fuel consumed on that distance since the control (NOx release control) to request the release of NOx was performed last. In subsequent step SB2, whether the NOx absorption amount reaches or exceeds a certain pre-set value, that is, whether it is the NOX excessive absorption condition or not, is determined based on the estimation result. In case that the determined result is YES, the flow proceeds to step SB3, where a flag F1 indicating a period to perform the NOx release control is turned ON (F1=1). It should be appreciated, however, that, in step SB2, the determined result may be YES while the engine 1 is in the accelerating operation regardless of the NOx absorption amount, so that the NOx release control described below will be performed.

Subsequently, in step SB4, a first timer value T1 having an initial value of 0 is incremented, and in subsequent step SB5, whether the first timer value T1 reaches or exceeds a pre-set threshold value T10 (approximately 2 to 10 seconds) is determined. In case that the determined result is YES, it is judged that the period to perform the NOx release control has ended, and the flow proceeds to steps SB11 and SB12, where the flag F1 is cleared (F1=0), and the first timer is reset (T1=1), respectively. On the other hand, in case that the determined result is NO in step SB5, the flow proceeds to step SB6, and thereafter, a feedback control computation based on a signal from the $O_2$ sensor 24 is performed in each of steps SB6 through SB9.

More specifically, in step SB6, an output E from the $O_2$ sensor 24 is compared with a reference value. E1 corresponding to the theoretical air-fuel ratio. In the case of YES indicating that the output E is larger than the reference value E1, the flow proceeds to step SB7, where a computation is performed so that feedback correction values $\tau CL$ and $\tau CT$ are updated by subtracting constants $\alpha$ and $\beta$ from their latest values, respectively. On the other hand, in the case of NO indicating that the output E is equal to or less than the reference value E1, the flow proceeds to step SB8, where the feedback correction values $\tau CL$ and $\tau CT$ are updated by adding the constants $\alpha$ and $\beta$ to their latest values, respectively.

Subsequently, in step SB9, the injection pulse widths $\tau L$ and $\tau T$ respectively for the air-intake stroke and compression stroke during the NOx release control are computed based on the injection pulse widths $\tau L4$ and $\tau T4$ found according to the actual filling efficiency ce so that the air-fuel ratio in the combustion chamber 4 is equal to the theoretical air-fuel ratio, and on the feedback correction values τCL and τCT found in step SB7 or SB8, whereby the injection timing for each is set again:

τL=τL4+τCL Inj_TL=Inj_TL4

τT=τT4+τCT Inj_TT=Inj_TT4.

In other words, while the output E from the $O_2$ sensor 24 is larger than the reference value E1, the air-fuel ratio is richer than the theoretical air-fuel ratio, and for this reason, the fuel injection amounts for the air-intake and compression strokes are reduced gradually by constant amounts α and β for every control cycle, whereby the air-fuel ratio is changed to the lean side. On the other hand, when the output E becomes smaller than the reference output value E1, it means the air-fuel ratio has become lean, so that the fuel injection amount is increased gradually to change the air-fuel ratio to the rich side. In steps SB7 through SB9, the injection amounts for both the air-intake stroke and compression stroke are corrected by feedback. It should be appreciated, however, that the injection amount for the intake stroke alone may be corrected by feedback. This is because the adverse affects to the combustion condition and the exhaust gas are negligible when the fuel injection amount in the air-intake stroke is changed.

Also, in case that the determined result is NO in step SB2, the flow proceeds to step SB10, where the condition of the flag F1 is determined when the flag is turned ON (F1=1), it is judged as the period to perform the NOx release control, and the flow proceeds to step SB4. On the other hand, when the flag is turned OFF (F1=0), it is no t determined as the period to perform the NOx release control, and the flow proceeds to steps SB11 and SB12.

Figure 10:
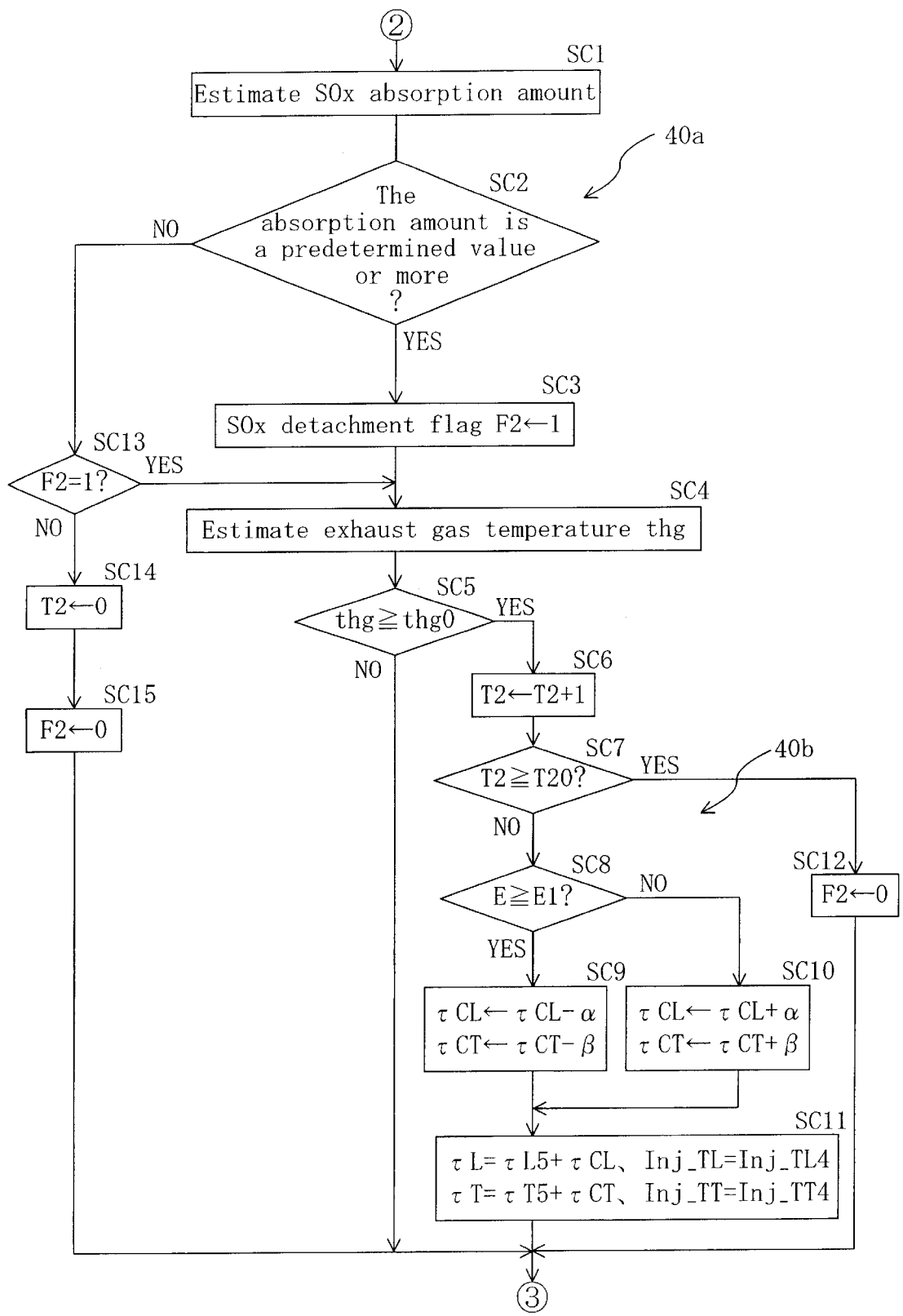
FIG. 10 is a flowchart detailing a procedure of SOx detaching control.

Following steps SB9 and SB12 of FIG. 9, in step SC1 of FIG. 10, a degree of the S poisoning of the catalyst 25, that is, the SOx absorption amount, is estimated. Like the estimation of the NOx absorption amount in step SB1, this estimation is performed based on a travel distance and a total amount of fuel consumed on that distance since a control to request the detachment of SOx (SOx detachment control) was performed last with a consideration given to the temperature condition of the catalyst during a corresponding period. In subsequent step SC2, whether the SOx absorption amount reaches or exceeds a pre-set certain value or not, that is, whether it is a SOx excessive absorption condition, is determined based on the estimation result. Herein, because an amount of sulfur component in the exhaust gas is so little that the travel distance to become the SOx excessive absorption condition is generally far longer than the travel distance to become the NOx excessive absorption condition.

In case that the determined result is YES in step SC2, the flow proceeds to step SC3, where a flag F2 indicating a period to perform the SOx detachment control is turned ON (F2=1). Then, in step SC4, an exhaust gas temperature the, that is, the temperature condition of the catalyst 25, is estimated. This estimation is made based on chiefly the actual filling efficiency ce and the number of engine revolutions ne at the time of estimation with a consideration given to the operation time in the stratified combustion mode and the time for performing the divided injection during a certain period before the estimation. It should be noted, however, that the exhaust gas temperature thg tends to rise as the filling efficiency and the number of engine revolutions increase and by the divided injection. On the other hand, because the exhaust gas temperature thg is considerably low in the stratified combustion mode, the temperature condition of the catalyst 25 becomes lower as the operation time in the stratified combustion mode extends.

Subsequently, in step SC5, whether the exhaust gas temperature thg is equal to or higher than a set temperature thg0 (for example, 450° C.) is determined, and when the determined result is NO, the flow proceeds to step SD1 of FIG. 11. On the other hand, when the determined result is YES, the flow proceeds to step SC6, where the SOx detachment control is performed. The reason why the SOx detachment control is performed only when the exhaust gas temperature is higher than a certain level in this manner is because SOx is not detached satisfactorily unless the temperature condition of the catalyst 25 becomes higher than a certain level.

In step SC6, a second timer value T2 having an initial value of 0 is incremented, and in step SC7, whether the second timer value T2 reaches or exceeds a pre-set threshold value T20 (approximately one to ten minutes) is determined. While the determined result shows NO, the flow proceeds to steps SC8 through SC11, and the feedback control computation based on a signal from the $O_2$ sensor 24 is performed. The concrete procedure of this feedback control computation is identical with the procedure in steps SB6 through SB9 of FIG. 9, and the description is not repeated for ease of explanation. When a time corresponding to the threshold value T20 has elapsed and SOx is detached sufficiently from the catalyst 25, the determined result in step SC7 becomes YES, whereupon the flow proceeds to step SC12, where the flag F2 is cleared (F2=0), after which the flow proceeds to step SD1 of FIG. 11.

On the other hand, when the determined result is NO in step SC2, the flow proceeds to step SC13, where the condition of the flag F2 is determined. When the flag is turned ON (F2=1), it is judged as the period to perform the SOx detachment control and the flow proceeds to step SC4. On the other hand, when the flag is turned OFF (F2=0), it is not judged as the period to perform the SOx detachment control and the flow proceeds to steps SC14 and SC15, where the flag F2 is cleared (F2=0), and the second timer is reset (T2=0), respectively, after which the flow proceeds to step SD1 of FIG. 11.

Figure 11:
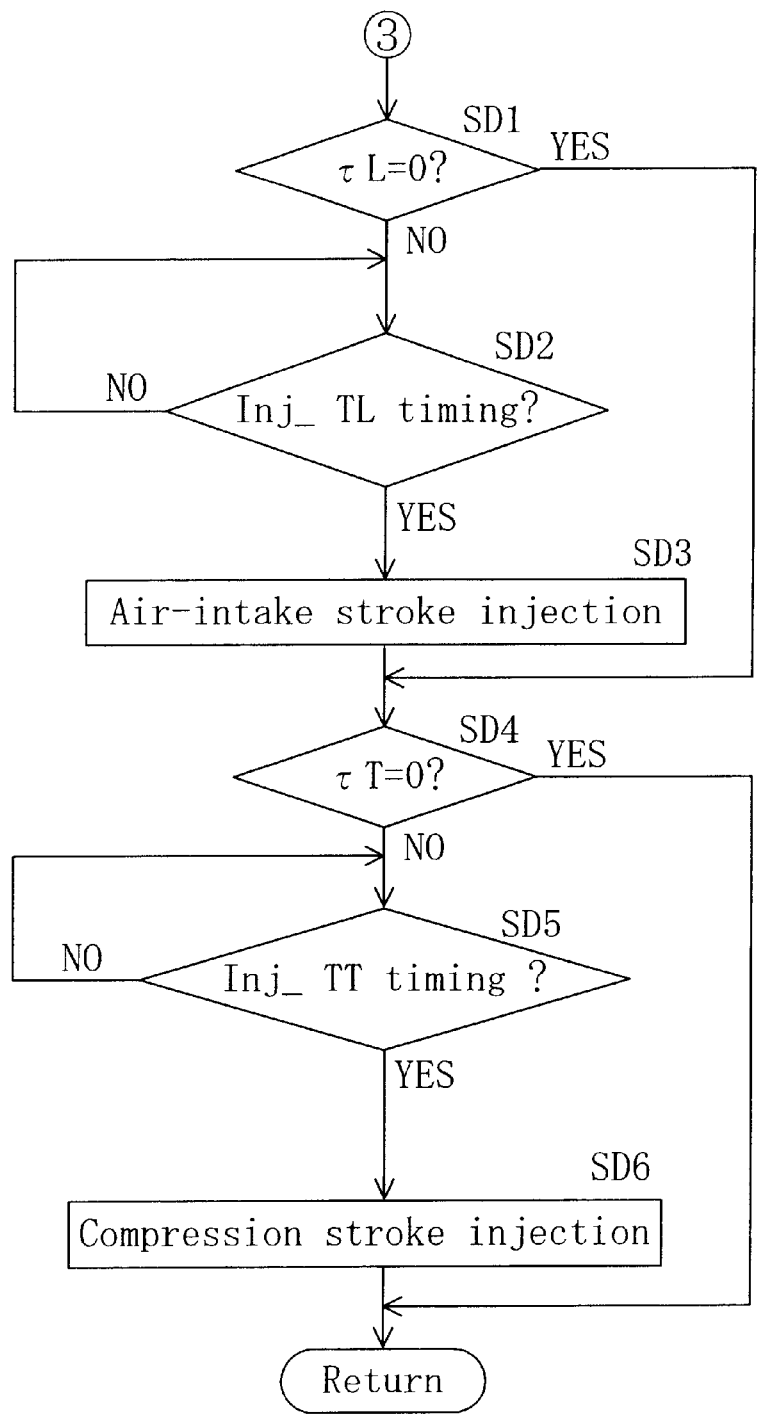
FIG. 11 is a flowchart detailing a procedure to perform air-intake stroke injection and compression stroke injection.

Following steps SC5, SC12, and SC15, in step SD1 of FIG. 11, whether the air-intake stroke injection pulse width τL is zero or not is determined, and in the case of YES (τL=0), the flow proceeds to step SD4. On the other hand, in the case of NO (τL≠0), the flow proceeds to step SD2, where whether the air-intake stroke injection timing Inj_TL has come or not is determined. Then, the flow waits until the injection timing comes, and when the injection timing comes (YES in step SD2), the flow proceeds to step SD3, where the injector 7 performs the air-intake stroke injection. Subsequently, in each of steps SD4 through SD6, the compression stroke injection is performed in the same manner as above, after which the flow makes a return.

Hence, step SC1 and SC2 in the flowchart of FIG. 10 form sulfur excessive absorption determining means 40a for determining whether the catalyst 25 is in the SOx excessive absorption condition where an amount of absorbed SOx is equal to or exceeds a predetermined amount. Also, steps SC8 through SC11 form sulfur detaching means 40b for causing the NOx absorber in the catalyst 25 to detach SOx when the sulfur excessive absorption determining means 40a determines the SOx excessive absorption condition.

In other words, the sulfur detaching means 40b controls the air-fuel ratio to be in the vicinity of the theoretical air-fuel ratio to lower the oxygen concentration in the exhaust gas when the exhaust gas temperature thg is equal to or higher than the set temperature thg0, and changes the air-fuel ratio periodically by alternately switching between the rich side and the lean side with reference to the theoretical air-fuel ratio. On the other hand, the sulfur detaching means 40b maintains the catalyst 25 in a high temperature condition and drastically increases the CO concentration in the exhaust gas by dividing fuel injection by the injector 7 into two, so that fuel is injected once in the air-intake stroke and once in the compression stroke of the cylinder, and it also raises the CO concentration by correcting the fuel injection amount to give an increasing amount.

Figure 12:
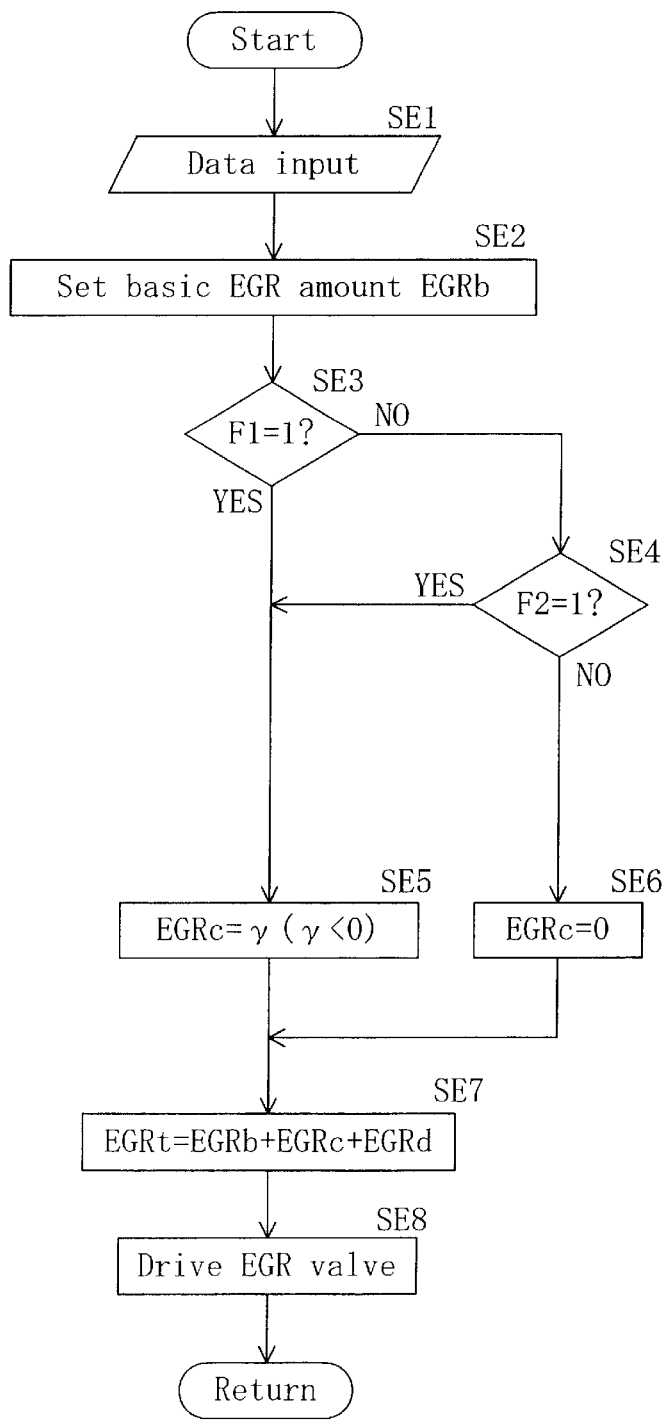
FIG. 12 is a flowchart detailing a procedure of EGR control.

Next, the following description will describe concretely the procedure of the EGR control with reference to the flowchart of FIG. 12. In step SE1 after the start, various sensor signals from the air flow sensor 12, the engine revolution number sensor 33, etc. are accepted, and various kinds of data is inputted from the memory of the ECU 40. In subsequent step SE2, a desired EGR ratio is computed based on the actual filling efficiency ce and the number of engine revolutions ne, and the EGR amount that attains the desired EGR ratio is set as a basic EGR amount EGRb. As to the desired EGR ratio, the correlation with respect to the filling efficiency ce and the number of engine revolutions ne is found in advance by a bench test or the like, and the correlation thus found is stored in the memory of the ECU 40 in the form of a map.

Subsequently, in step SE3, whether it is the period to perform the NOx release control or not is determined based on the value of the first flag F1, and when the determined result is YES, the flow proceeds to step SE5. On the other hand, when the determined result is NO, the flow proceeds to step SE4, where whether it is the period to perform the SOx detachment control or not is determined based on the value of the second flag F2 this time. If the determined result is YES, the flow proceeds to step SE5, where a predetermined value γ (γ<0) is set as a correction value EGRc to correct the EGR amount to give an increasing or decreasing amount. On the other hand, when the determined result is NO, the flow proceeds to step SE6, where the correction value EGRc is set to zero (EGRc=0). Then, in step SE7 following step SE5 or step SE6, a final EGR amount EGRt is computed by adding the basic EGR amount EGRb and the correction value EGRc, and in subsequent step SE8, a control signal is outputted to the EGR valve 27, so that it is driven to achieve the opening degree corresponding to the final EGR amount EGRt, after which the flow makes a return.

In other words, as has been discussed, by applying the feedback control to the fuel injection amount by the injector 7 by performing at least one of the NOx release control and SOx detachment control, the opening degree of the EGR valve 27 is corrected to lessen the EGR amount to some extent while the air-fuel ratio in the combustion chamber 4 is maintained in the vicinity of the theoretical air-fuel ratio.

Next, the following description will describe the functions and effects of the above embodiment.

Figure 13:
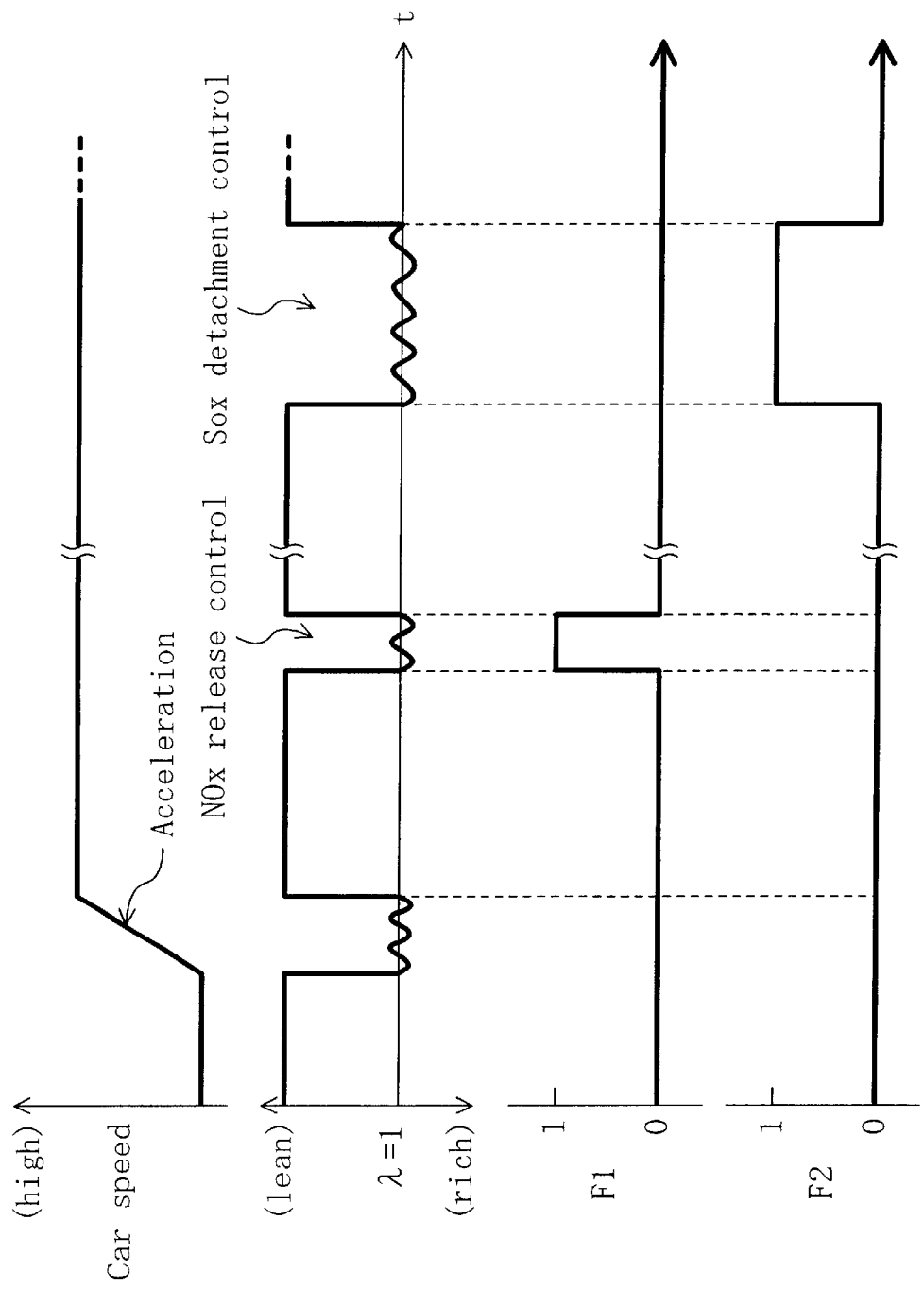
FIG. 13 is a time chart showing a change in an air-fuel ratio when the NOx release control or SOx detaching control is performed during operation of the engine.

With the engine 1, as shown in FIG. 13, for example, a fuel injection amount is increased in the accelerating operation condition, and the engine 1 is run either in the λ=1 division mode or in the enriched mode, during which NOx absorbed in the catalyst 25 is released for reduction-purification. When a steady operation condition continues, the catalyst 25 is determined as being in the NOx excessive absorption condition (flag F1=1) based on a travel distance and an amount of fuel consumed on that distance from the last releasing of NOx, and the NOx release control is performed as detailed in the flowchart of FIG. 9.

On the other hand, by the time the travel distance of an automobile reaches a few thousands kilometers, for example, SOx is gradually accumulated in the catalyst 25 during operation of the engine 1, which possibly deteriorates the NOx absorption ability. In this case, as detailed in the flowchart of FIG. 10, the SOx excessive absorption condition is determined by the sulfur excessive absorption determining means during operation of the engine 1, whereupon the flag F2 is turned ON (see FIG. 13). Then, if the catalyst 25 is in the high temperature condition (for example, 450° C. or higher), the SOx release control is performed.

Each of the NOx release and the SOx release is performed by fuel injection divided into two and the feedback control of the air-fuel ratio in the vicinity of the theoretical air-fuel ratio, whereby not only the oxygen concentration in the exhaust gas drops, but also the CO concentration and HC concentration in the exhaust gas increase drastically and change periodically. Further, the detachment of NOx and SOx from the catalyst 25 is promoted as the exhaust gas temperature rises.

In other words, by dividing the fuel injection by the injector 7 into two, a part of the fuel injected in the air-intake stroke of each cylinder 2 disperses homogeneously in the combustion chamber 4 and forms a lean mixture, while the rest of the fuel injected in the compression stroke forms excessively rich mixture in the vicinity of the ignition plug 6. At the excessively rich mixture portion, an initial combustion rate immediately after the ignition is high, but because oxygen is scarce, CO is readily generated by local incomplete combustion. On the other hand, combustion at the surrounding lean mixture portion is slow, and a part of the fuel is exhausted before it is completely burned, so that after burning causes the exhaust gas temperature to rise, while allowing CO to be generated more readily. Further, when the number of valve opening of the injector 7 increases by the divided fuel injection, so does a ratio of fuel droplet with coarse particles injected at the beginning of the valve opening, which also allows CO to be generated readily.

Also, as a fuel injection amount by the injector 7 is increased so that the air-fuel ratio in the combustion chamber 4 is substantially equal to the theoretical air-fuel ratio, concentrations of reductant components in the exhaust gas, such as CO and HC, rise, while concentrations of CO, HC, etc. in the exhaust gas change periodically because the air-fuel ratio is changed periodically to switch alternately between the rich side and lean side in response to the feedback correction of the fuel injection amount based on a signal from the $O_2$ sensor 24. As a result, CO, HC, etc. give more influences to NOx and SOx adsorbed in the catalyst 25, thereby promoting the release of NOx and SOx from the catalyst 25.

Consequently, a time required to detach sufficient SOx from the catalyst 25, that is, a time needed to control the air-fuel ratio to be substantially equal to the theoretical air-fuel ratio to this end, is shortened. Hence, it is possible to secure the NOx removing power in a stable manner by regenerating the catalyst 25 in a satisfactory manner while minimizing a drop of the fuel efficiency.

Absorption of NOx

A precious metal supported on zeolite on the outer catalyst layer 25c is activated by NOx and HC in the exhaust gas, and NO is converted to $NO_2$ while HC undergoes partial oxidation, causes cracking, etc., which makes them energetically reactive. Hence, $NO_2$ converted from NO by the outer catalyst layer 25c is readily absorbed into Ba and other elements of the NOx absorber, and as a result, high NOx absorption ratio is achieved.

Release of NOx

In the catalyst 25, NOx is adsorbed on the surface of the NOx absorber (Ba particles, etc.) in the form of nitrate, and it is assumed that the nitric acid radical of the nitrate is substituted by the supply of CO, so that carbonate and nitrogen dioxide are generated. For example, the following is a case of Ba particles.

$$Ba(NO_3)_2 + CO \rightarrow BaCO_3 + NO_2\uparrow \text{ (coefficients omitted)}$$

Then, reduction-purification takes place as nitrogen dioxide reacts with HC, CO, etc. on the catalytic metal.

$$NO_2 + HC + CO \rightarrow N_2 + N_2O + CO_2 \text{ (coefficients omitted)}$$

That is, because reduction-purification takes place as NOx is released from the catalyst 25, the catalyst 25 becomes the condition to sufficiently absorb NOx in the exhaust gas again (regeneration of the catalyst).

Herein, because the catalyst 25 adsorbs and holds CO and HC in the exhaust gas by zeolite on the outer catalyst layer 25c, not only can released NOx be purified by means of reduction in a reliable manner as discussed above, but also CO and HC are not released to atmosphere even when an amount of released NOx from the catalyst 25 decreases. Hence, it is possible to allow the catalyst 25 to release most of NOx absorbed therein, in other words, the catalyst 25 can be regenerated sufficiently.

Also, because Pt and Rh are supported on the outer catalyst layer 25c, $NO_2$ can be effectively decomposed by means of reduction under a relatively low temperature condition (for example, 200 to 250° C.). This is particularly advantageous when the engine 1 is run in the stratified combustion condition like in the present embodiment. Because, in the case of the stratified combustion, the air-fuel ratio becomes extremely lean and the exhaust gas temperature is considerably low.

Release of SOx

Next, regeneration of the catalyst 25 from the S poisoning, that is, regeneration thereof, will be explained. In the catalyst 25, as is with NOx, SOx is adsorbed on the surface of the NOx absorber (Ba particles, etc.) in the form of sulfate, and it is assumed that the sulfuric acid radical of the sulfate is substituted by the supply of CO, so that carbonate and sulfur dioxide are generated. For example, the following is the case of Ba particles.

$$BaSO_4 + CO \rightarrow BaCO_3 + SO_2\uparrow \text{ (coefficients omitted)}$$

Meanwhile, a so-called water gas shift reaction between CO and water $H_2O$ in the exhaust gas proceeds with increasing the CO concentration, and as a result, hydrogen is generated at the reaction site on the catalyst.

$$CO + H_2O \rightarrow H_2 + CO_2$$

Then, hydrogen causes SOx to be detached in the form of hydrogen sulfide, which also promotes detachment of sulfur component from the catalyst 25. Because the water gas shift reaction can proceed at a relatively low temperature, it is possible to promote detachment of SOx without making the temperature condition of the catalyst 25 quite high.

Further, because zeolite is supported on the outer catalyst layer 25c of the catalyst 25, HC in the exhaust gas undergoes partial oxidation with zeolite and is converted to HCO and CO, which further raises the concentration of CO affecting SOx adsorbed on the surface of the NOx absorber on the inner catalyst layer 25b.

Also, if any of the elements (K, Sr, Mg or La) other than Ba is more susceptible to the S poisoning than Ba, the S poisoning of Ba is comparatively small and deterioration of the NOx absorption ability after the S poisoning is lessened.

If any of the foregoing other elements (K, Sr, Mg, or La) regenerates from the S poisoning more readily than Ba, the NOx absorption ability after the regeneration becomes high. Further, if the presence of any of the foregoing other elements (K, Sr, Mg, or La) results in expansion of a specific surface area or a reaction site of the NOx absorber, the NOx absorption ability of the NOx absorber becomes high. In addition, if any of the other elements serves to prevent heat sintering of Ba, heat deterioration of the NOx absorber caused by the sulfur detaching treatment can be avoided.

Also, as to alumina and ceria-zirconia complex oxide forming the support material, the former alumina is useful in securing the heat resistance of the catalyst, and when the engine is run in the vicinity of $\lambda=1$, the latter complex oxide promotes a ternary purification reaction of HC, CO, and NOx, while functioning advantageously in improving resistance to the S poisoning of the catalyst.

Next, the following description will describe concrete examples of the catalyst.

EXAMPLE 1

Production of Pt—Rh/MFI Catalyst Powder

An aqueous solution of dinitrodiamine platinum and an aqueous solution of rhodium nitrate were weighted and mixed, so that the support amount of Pt (the support amount of element is defined as a dry weight of the element when supported on a honeycomb substrate per 1 L of the substrate, and the same applies to the description below) was 0.5 g/L and the support amount of Rh was 0.006 g/L. Then, the mixture was blended with MFI type zeolite ($SiO_2/Al_2O_3=$ 80) and subjected to spray to dryness by the spray dry method followed by drying and calcining, whereby catalyst powder was produced. A total amount of Pt and Rh in the catalyst powder was approximately 2.5 wt %. Herein, the drying was performed at a temperature of 150° C. for one hour, and the calcining was performed at a temperature of 540° C. for two hours. These drying condition and calcining condition also apply to the drying and the calcining in the description below.

Preparation of Mixed Solution (for Impregnation)

An aqueous solution of dinitrodiamine platinum nitrate and an aqueous solution of barium acetate were weighted and mixed, so that the support amount of Pt was 6.0 g/L and the support amount of Ba was 30 g/L, whereby a mixed solution was prepared.

Formation of The Inner Coat Layer

Herein, γ-alumina, $CeO_2$—$ZrO_2$ complex oxide, and an alumina binder were weighted and mixed, so that the support amount of γ-alumina was 150 g/L, the support amount of complex oxide was 150 g/L, and the support amount of binder was 30 g/L. Then, ion exchange water was added thereto, whereby slurry was prepared. The slurry was wash-coated on a honeycomb substrate (capacity: 25 mL, weight per 1 L of the substrate: 420 g/L) made of cordierite by a method to dip the substrate in the slurry and take out the substrate to blow off extra slurry. Subsequently, drying and calcining were applied, whereby an inner coat layer was formed.

Formation of the Outer Coat Layer

The Pt—Rh/MFI catalyst powder and the alumina binder were weighted and mixed, so that the support amount of catalyst powder was 20 g/L and the support amount of binder was 4 g/L. Then, ion exchange water was added thereto, whereby slurry was prepared. The slurry was wash-coated on the substrate on which the inner coat layer was formed. Subsequently, drying and calcining were applied, whereby an outer coat layer was formed.

Impregnation Process

The above mixed solution was impregnated into the inner and outer coat layers on the substrate, and drying and calcining were applied.

Hence, in the case of the catalyst of the present example, 0.5 g/L of Pt was supported by the Pt—Rh/MFI catalyst powder on the outer coat layer, and 6.0 g/L of Pt was supported by the above mixed solution, which totaled 6.5 g/L as the total support amount of Pt.

An amount of impurities in the resulting catalyst was less than 1%, and the same applies to catalysts of the other examples discussed below.

EXAMPLE 2

A catalyst was prepared under the same conditions and by the same method as Example 1 except that a mixed solution was prepared by weighting and mixing an aqueous solution of dinitrodiamine platinum nitrate and an aqueous solution of barium acetate, so that the support amount of Pt was 6.0 g/L and the support amount of Ba was 50 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as the total support amount of Pt.

EXAMPLE 3

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of strontium acetate, and an aqueous solution of lanthanum acetate, so that the support amount of Pt was 6.0 g/L, the support amount of Ba was 30 g/L, the support amount of Sr was 10 g/L, and the support amount of La was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as the total support amount of Pt.

EXAMPLE 4

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of magnesium acetate, and an aqueous solution of lanthanum acetate, so that the support amount of Pt was 6.0 g/L, the support amount of Ba was 30 g/L, the support amount of Mg was 10 g/L, and the support amount of La was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 5

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of potassium acetate, and an aqueous solution of strontium acetate, so that the support amount of Pt was 6.0 g/L, the support amount of Ba was 30 g/L, the support amount of K was 10 g/L, and the support amount of Sr was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 6

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of strontium acetate, and an aqueous solution of magnesium acetate, so that the support amount of Pt was 6.0 g/L, the support amount of Ba was 30 g/L, the support amount of Sr was 10 g/L, and the support amount of Mg was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 7

A catalyst was prepared under the same conditions and by the same method as Example 1 except that a mixed solution was prepared by weighting and mixing an aqueous solution of dinitrodiamine platinum nitrate, an aqueous solution of barium acetate, and an aqueous solution of potassium acetate, so that the support amount of Pt was 6.0 g/L, the support amount of Ba was 30 g/L, and the support amount of K was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 8

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of potassium acetate, and an aqueous solution of magnesium acetate, so that the support amount of Pt was 6.0 g/L, the support amount of Ba was 30 g/L, the support amount of K was 10 g/L, and the support amount of Mg was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 9

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of potassium acetate, and an aqueous solution of lanthanum acetate, so that the support amount of Pt was 6.0 g/L, the support amount of Ba was 30 g/L, the support amount of K was 10 g/L, and the support amount of La was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total support amount of Pt.

EXAMPLE 10

A catalyst was prepared under the same conditions and by the same method as Example 1 except that a mixed solution was prepared by weighting and mixing an aqueous solution of dinitrodiamine platinum nitrate, an aqueous solution of barium acetate, an aqueous solution of potassium acetate, an aqueous solution of strontium acetate, an aqueous solution of magnesium acetate, and an aqueous solution of lanthanum acetate, so that the support amount Pt was 6.0 g/L, the support amount Ba was 30 g/L, the support amount K was 10 g/L, the support amount Sr was 10 g/L, the support amount Mg was 10 g/L, and the support amount La was 10 g/L. In the case of the present example, 0.5 g/L of Pt was supported by the Pt—Rh/MFI catalyst powder on the outer coat layer, and 6.0 g/L of Pt was supported by the mixed solution, which also totaled 6.5 g/L as a total supoprt amount of Pt.

EXAMPLE 11

A catalyst was prepared under the same conditions and by the same method as Example 1 except that a mixed solution was prepared by weighting and mixing an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium acetate, so that the support amount Pt was 6.5 g/L, the support amount Rh was 0.1 g/L, the support amount Ba was 30 g/L, the support amount K was 6 g/L, the support amount Sr was 10 g/L, and the support amount Mg was 10 g/L.

In the case of the present example, 0.5 g/L of Pt was supported by the Pt—Rh/MFI catalyst powder on the outer coat layer, and 6.5 g/L of Pt was supported by the mixed solution, which totaled 7.0 g/L as a total supoprt amount of Pt. Also, 0.006 g/L of Rh was supported by the Pt—Rh/MFI catalyst powder, and 0.1 g/L of Rh was supported by the mixed solution, which totaled 0.106 g/L as a total supoprt amount of Rh.

Evaluation Test on Each Catalyst
Measuring Method of NOx Purification Ratio

A measuring method of NOx purification ratio is defined as follows. That is, each catalyst is attached to a fixed bed flow-through reaction evaluator, and a simulated exhaust gas with a lean air-fuel ratio indicated as gas composition A in Table 1 below is flown into the catalyst until the NOx purification ratio becomes stable. Then, the simulated exhaust gas is switched to the one with a rich air-fuel ratio indicated as gas composition B in Table 1 below, which is flown for three minutes, so that NOx absorbed in the NOx absorber is detached. Then, the simulated exhaust gas is switched to the one indicated as the gas composition A, and the NOx purification ratio (lean NOx purification ratio) for 130 seconds from this switching point is measured.

Herein, the measuring temperature (gas temperature at the catalyst inlet) of the NOx purification ratio was 350° C. or 450° C. The space velocity SV at either temperature for each of the above examples except for Example 11 was 55000 $h^{-1}$. The space velocity for Example 11 was 25000 $h^{-1}$. Also, the NOx purification ratios were measured from fresh catalysts to which no deterioration treatment was applied, catalysts subjected to $SO_2$ treatment (the S poisoning deterioration treatment), catalysts subjected to regeneration treatment after the $SO_2$ treatment, and catalysts subjected to heat deterioration treatment. The conditions of the $SO_2$ treatment, regeneration treatment, and heat deterioration treatment are as follows.

$SO_2$ Treatment

The $SO_2$ treatment is defined as a treatment where a simulated exhaust gas indicated as gas composition C in Table 1 below is flown into the catalyst attached to the fixed bed flow-through reaction evaluator for 60 minutes. The gas temperature at the catalyst inlet was 350° C. and the space velocity was 55000 $h^{-1}$.

Regeneration Treatment

The regeneration treatment is defined as a treatment where three kinds of simulated exhaust gases shown in Table 2 are switched as needed and flown for 10 minutes into the catalyst attached to the fixed bed flow-through reaction evaluator. Herein, the gas compositions were changed in the following order: (1) A/F=14.7→(2) A/F=13.8→(3) A/F=14.7(4) A/F=15.6(→(1) A/F=14.7) with a cycle period of one second. Also, the gas temperature at the catalyst inlet was 600° C. and the space velocity was 120000 $h^{-1}$.

Heat Deterioration Treatment

The heat deterioration treatment is defined as a treatment where the catalyst is kept heated at 900° C. for 24 hours in an ambient atmosphere.

TABLE 1

|  | Gas composition A Lean | Gas composition B Rich | Gas composition C $SO_2$ treatment |
|---|---|---|---|
| $HC(C_3H_6)$ | 4000 ppm | 4000 ppm | — |
| NO | 250 ppm | 250 ppm | — |
| CO | 0.15% | 0.15% | — |
| $CO_2$ | 10% | 10% | — |
| $H_2$ | 650 ppm | 650 ppm | — |
| $O_2$ | 7% | 0.5% | 20% |
| $H_2O$ | 10% | 10% | — |
| $SO_2$ | — | — | 50 ppm |
| $N_2$ | The remaining | The remaining | The remaining |

TABLE 2

|  | Regeneration treatment | | |
|---|---|---|---|
| Components | A/F = 14.7 | A/F = 13.8 | A/F = 15.6 |
| $HC(C_3H_6)$ | 560 ppm | 560 ppm | 560 ppm |
| NO | 1000 ppm | 1000 ppm | 1000 ppm |
| CO | 0.60% | 2.60% | 0.60% |
| $CO_2$ | 13.90% | 13.90% | 13.90% |
| $H_2$ | 0.20% | 0.90% | 0.20% |
| $O_2$ | 0.600% | 0.600% | 1.9% |
| $H_2O$ | 10% | 10% | 10% |
| $SO_2$ | — | — | — |
| $N_2$ | The remaining | The remaining | The remaining |

Figure 14:
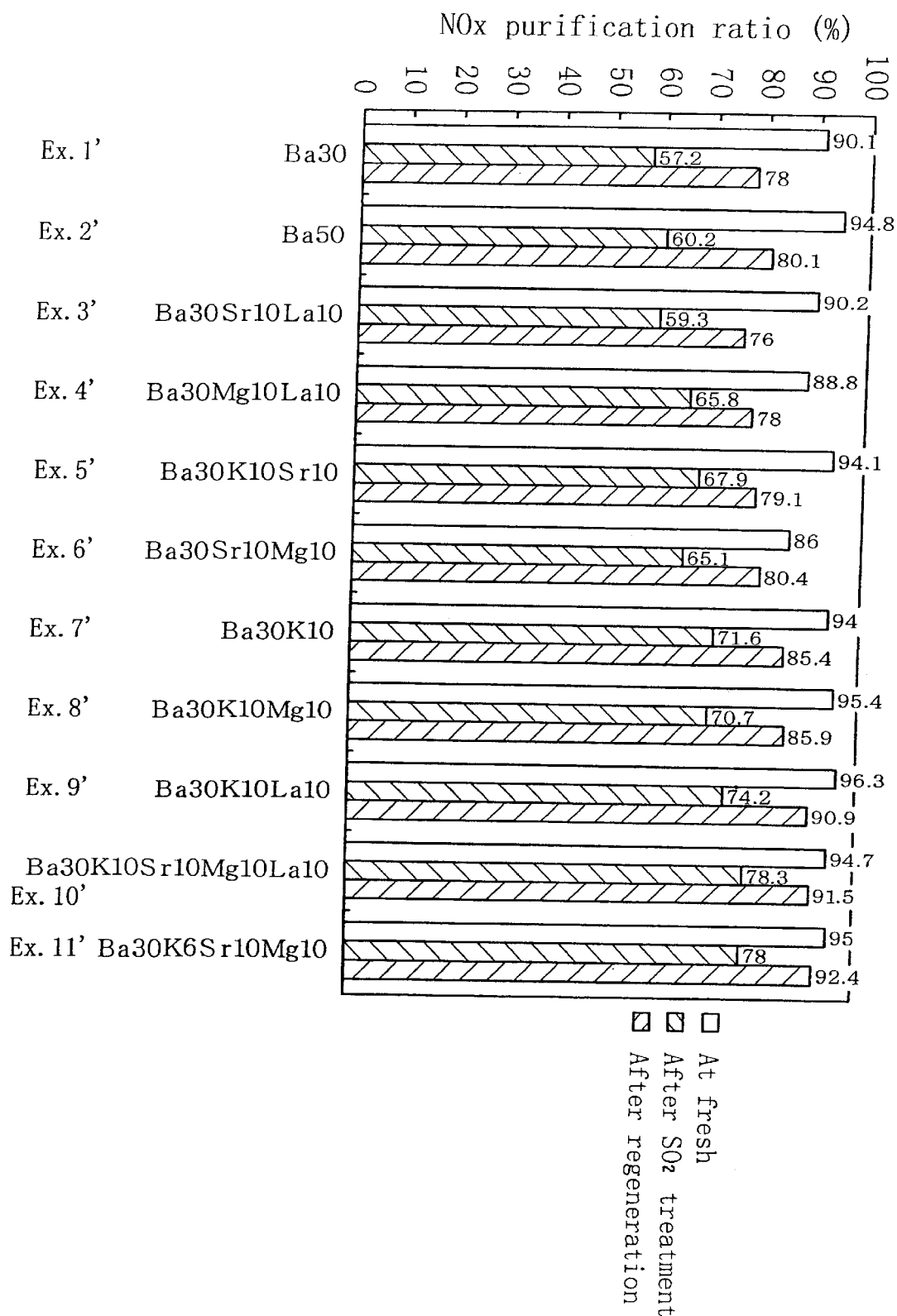
FIG. 14 is a graph showing NOx purification ratios at fresh, after S poisoning treatment, and after regeneration treatment of each of catalysts of concrete examples.

The measured results of the NOx purification ratio at fresh, the NOx purification ratio after the $SO_2$ treatment, and the NOx purification ratio after the regeneration treatment following the $SO_2$ treatment are shown in FIG. 14 (the gas temperature at the catalyst inlet was 350° C. in each). According to the drawing, there is little difference among the catalysts as to the NOx purification ratios at fresh. However, the NOx purification ratios after the $SO_2$ treatment have a tendency that they are higher in Examples 3 through 11 where the NOx absorber includes other elements (at least one of K, Sr, Mg, and La) in addition to Ba than in Examples 1 and 2 where the NOx absorber includes Ba alone, and this tendency is noticeable when K is included. On the other hand, the NOx purification ratios after the regeneration treatment show a tendency that they are higher when K is included except for Example 5, and this tendency is noticeable when Mg or La is also included in addition to K.

Figure 15:
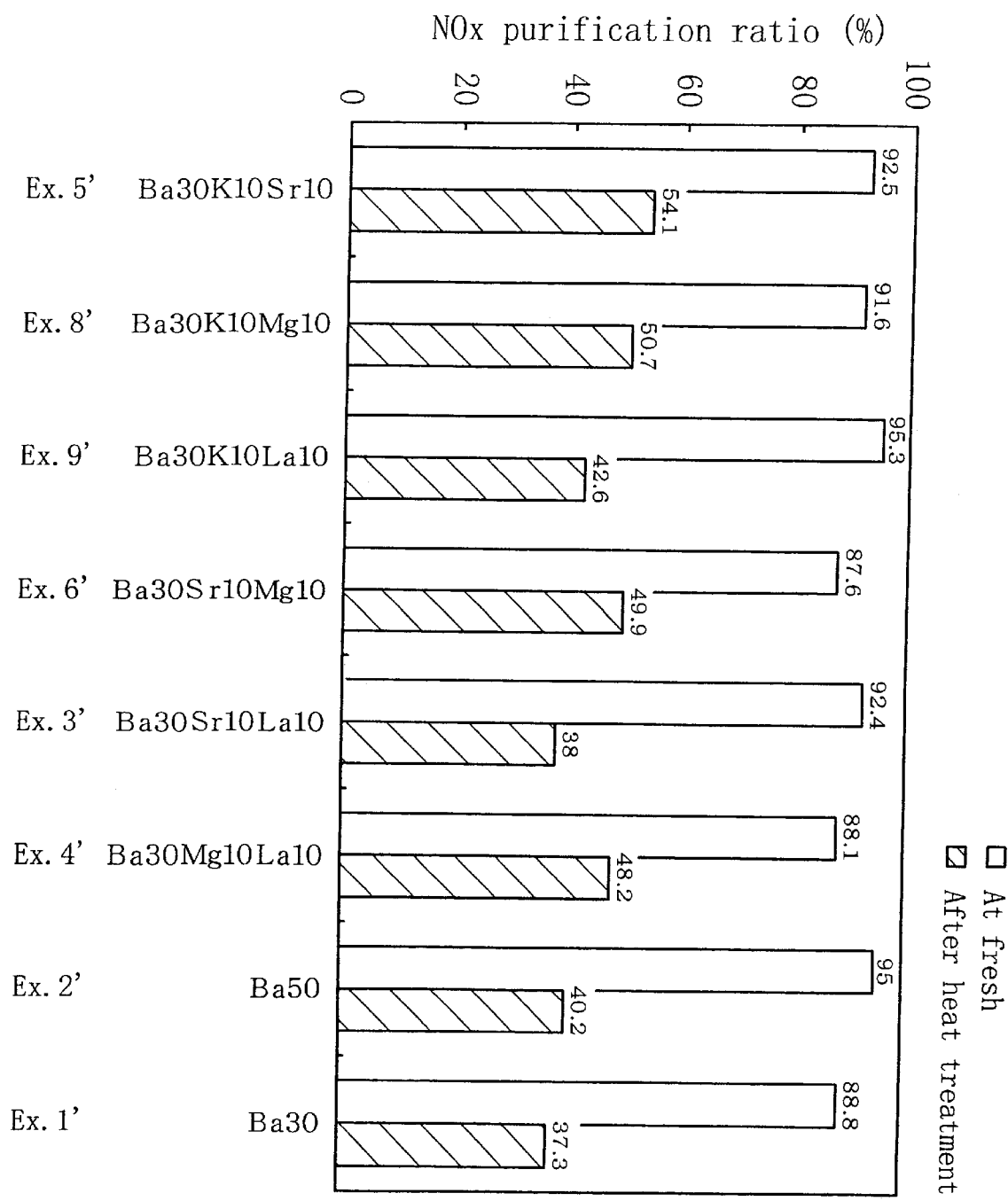
FIG. 15 is a graph showing NOx purification ratios at fresh and after heat deterioration treatment of each of the catalysts of concrete examples when a gas temperature at the catalyst inlet is 350° C.
Figure 16:
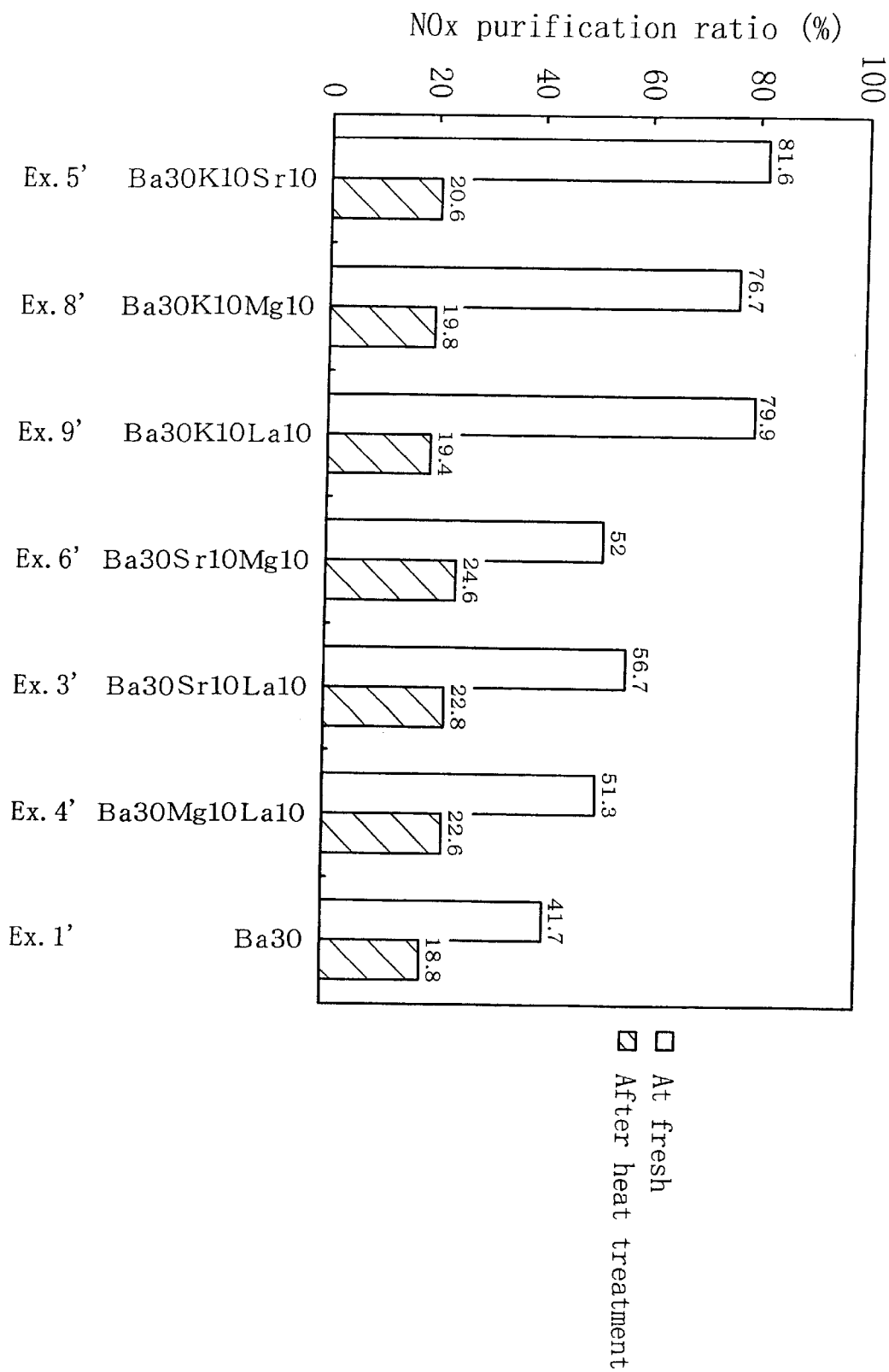
FIG. 16 is a graph showing NOx purification ratios at fresh and after heat deterioration treatment of each of the catalysts of concrete examples when a gas temperature at the catalyst inlet is 450° C.

FIG. 15 shows the NOx purification ratios at fresh and after the heat treatment (heat deterioration treatment) when the gas temperature at the catalyst inlet is 350° C. According to the drawing, they show a tendency that the NOx purification ratios after the heat treatment become high in the catalysts of Examples 3 through 6 (resistance to the S poisoning (the above NOx purifying characteristics after the regeneration treatment) is hardly recognized with the catalysts of these Examples), and this tendency is particularly noticeable in Example 5. This tendency is also observed with the NOx purification at fresh and after the heat treatment (heat deterioration treatment) when the gas temperature at the catalyst inlet is 450° C., which is shown in FIG. 16. As has been discussed, as to Examples 3 through 6, noticeable effects for the resistance to the S poisoning cannot be confirmed but excellent effects are achieved for the heat resistance. Given the fact that the regeneration treatment is performed at a relatively high temperature, it can be said these catalysts are advantageous in maintaining the NOx absorption ability by the regeneration treatment.

Also, according to FIG. 16, the catalyst in each of Examples 5, 8, and 9 includes K in addition to Ba, and further includes at least one of Sr, Mg and La, and each shows a considerably high NOx purification ratio at 450° C. when they are fresh. This indicates that driving is allowed with a lean air-fuel ratio without increasing NOx emission considerably even when the exhaust gas temperature is high like at the time of a high-speed driving.

(Ba—K—Sr-based NOx absorber)

Catalysts were prepared under the same conditions and by the same method as Example 1 except that mixed solutions were prepared by weighting and mixing an aqueous solution of dinitrodiamine platinum nitrate, an aqueous solution of rhodium acetate, an aqueous solution of barium acetate, an aqueous solution of potassium acetate, and an aqueous solution of strontium acetate, so that the support amount of Pt was 3.0 g/L, the support amount of Rh was 0.1 g/L, the support amount of Ba was 30 g/L, the support amount of K was 6 g/L, and the support amount of Sr was 0 g/L, 5 g/L, 10 g/L, 15 g/L, 20 g/L, or 30 g/L in each mixed solution.

In this case, 0.5 g/L of Pt was supported by the Pt—Rh/MFI catalyst powder on the outer coat layer, and 3.0 g/L of Pt was supported by the mixed solution, which totaled 3.5 g/L as a total supoprt amount of Pt. Also, 0.006 g/L of Rh was supported by the Pt—Rh/MFI catalyst powder, and 0.1 g/L of Rh was supported by the mixed solution, which totaled 0.106 g/L as a total supoprt amount of Rh.

For comparison, a comparative catalyst was prepared under the same conditions and by the same method as Example 1 except that a mixed solution was prepared by weighting and mixing an aqueous solution of dinitrodiamine platinum nitrate, an aqueous solution of rhodium acetate, and an aqueous solution of barium acetate, so that the support amount of Pt was 3.0 g/L, the support amount of Rh was 0.1 g/L, and the support amount of Ba was 30 g/L (the support amount of K was zero and the support amount of Sr was zero). In the case of this comparative catalyst, a total amount of supported Pt was 3.5 g/L and a total amount of supported Rh was 0.106 g/L.

Figure 17:
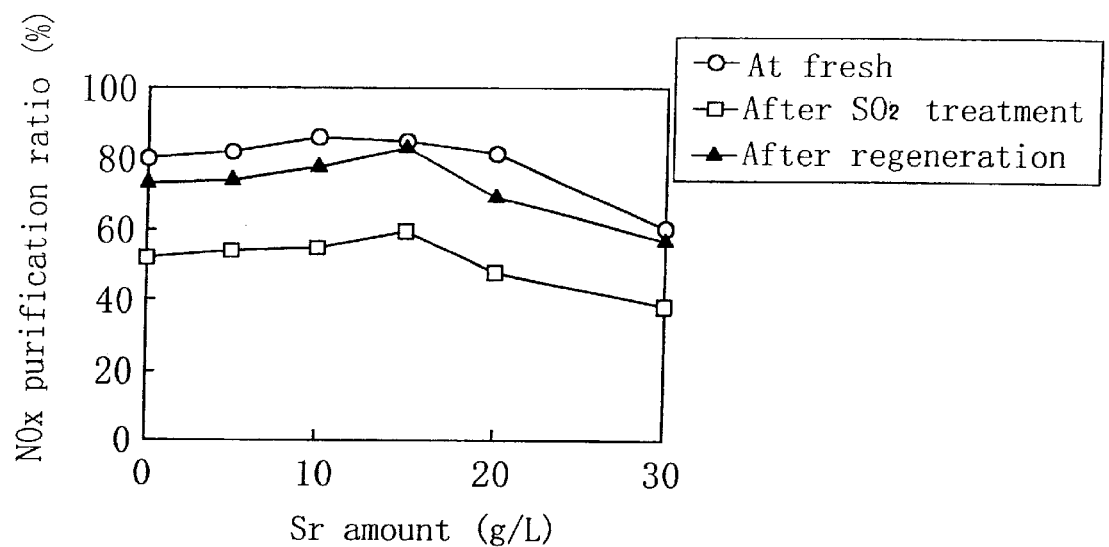
FIG. 17 is a graph showing influences of the support amount of Sr in a catalyst having a Ba—K—Sr-based NOx absorber to the NOx purification ratios thereof at fresh, after S poisoning treatment, and after regeneration treatment.

With each catalyst having thereon supported a different amount of Sr and the comparative catalyst, the NOx purification ratios at fresh, after the $SO_2$ treatment, and after the regeneration treatment were measured by the evaluation test explained above. FIG. 17 shows the results of each catalyst having thereon supported a different amount of Sr. According to the drawing, when Sr is supported, the NOx purification ratio after the regeneration treatment is higher than in the case where the support amount of Sr is zero. However, when the support amount of Sr reaches or exceeds 20 g/L, the NOx conversion ratio after the regeneration treatment is deteriorated on the contrary. Hence, it is understood that the support amount of Sr is preferably 5 g/L or more and less than 20 g/L, or 10 g/L or more and than 20 g/L, and most preferably 15 g/L, and therefore, a range from 13 g/L to 17 g/L is advantageous in maintaining the NOx purification ratio after the regeneration treatment at a high value.

Also, with the comparative catalyst, the NOx purification ratio at fresh is 72%, the NOx purification ratio after the $SO_2$ treatment is 41%, and the NOx purification ratio after the regeneration treatment is 63%. Hence, it is understood that, in the case of supporting K and Sr in addition to Ba, until the support amount of Sr reaches 20 g/L, the NOx purification ratios at fresh, after the $SO_2$ treatment, and after the regeneration treatment are all higher than those of the comparative catalyst including Ba alone.

Figure 18:
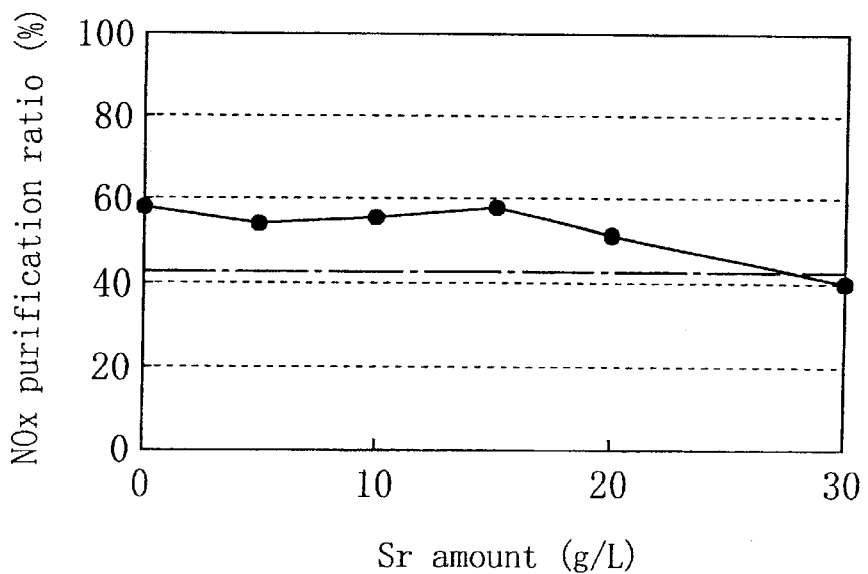
FIG. 18 is a graph showing influences of the support amount of Sr in a catalyst having a Ba—K—Sr-based NOx absorber to the heat resistance thereof.

FIG. 18 shows the measured results of the NOx purification ratios after the above-discussed heat deterioration treatment was applied to each catalyst having thereon supported a different amount of Sr and to the comparative catalyst. In the drawing, an alternate long and short dashed line represents the NOx purification ratio of the comparative catalyst. Herein, the space velocity was 25000 $h^{-1}$. According to the drawing, when the support amount of Sr reaches or exceeds 30 g/L, the heat resistance of the catalyst is poorer than that of the comparative catalyst, but if the support amount of Sr is less than that, the heat resistance of the catalyst is improved, which is advantageous to the above-discussed regeneration.

(Ba—K—Mg-based NOx Absorber)

Catalysts were prepared under the same conditions and by the same method as Example 1 except that mixed solutions were prepared by weighting and mixing an aqueous solution of dinitrodiamine platinum nitrate, an aqueous solution of rhodium acetate, an aqueous solution of barium acetate, an aqueous solution of potassium acetate, and an aqueous solution of magnesium acetate, so that the support amount of Pt was 3.0 g/L, the support amount of Rh was 0.1 g/L, the support amount of Ba was 30 g/L, the support amount of K was 6 g/L, and the support amount of Mg was, 0 g/L, 5 g/L, 10 g/L, 15 g/L, or 20 g/L in each mixed solution. In this case, a total amount of supported Pt was also 3.5 g/L, and a total amount of supported Rh was also 0.106 g/L.

Figure 19:
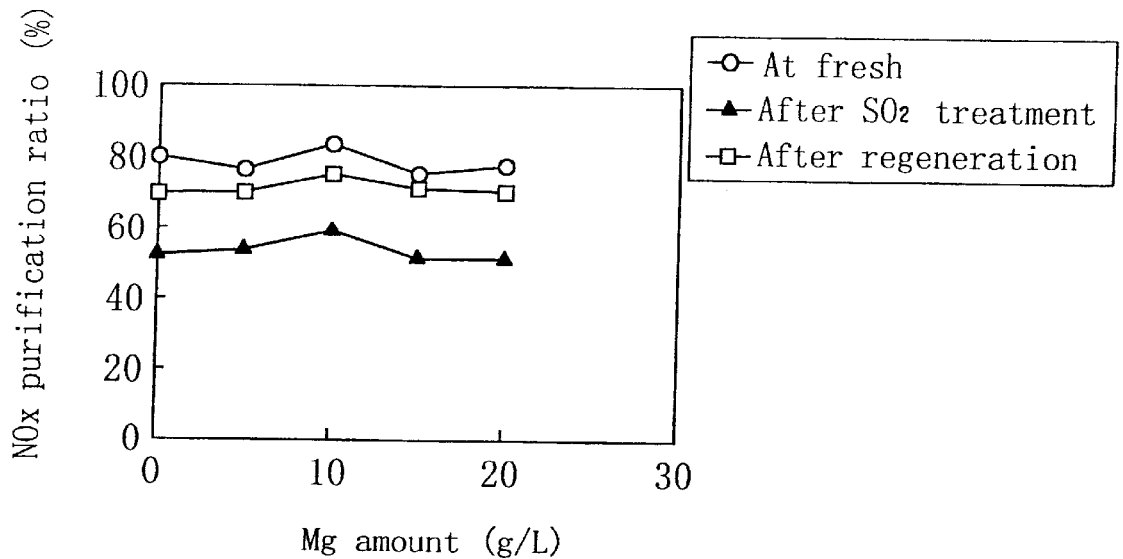
FIG. 19 is a graph showing influences of the support amount of Mg in a catalyst having a Ba—K—Mg-based NOx absorber to the NOx purification ratios thereof at fresh, after S poisoning treatment, and after regeneration treatment.

With each catalyst having thereon supported a different amount of Mg, the NOx purification ratios at fresh, after the $SO_2$ treatment, and after the regeneration treatment were measured by the evaluation test explained above. The results are shown in FIG. 19. According to the drawing, when Mg is supported, the NOx purification ratio after the regeneration treatment is higher than in the case where the support amount Mg is zero, and the NOx purification ratio after the regeneration treatment reaches the maximum when the support amount of Mg is 10 g/L, and therefore, when the support amount of Mg is 3 g/L to 17 g/L, or 5 g/L to 15 g/L, there is provided an advantage in maintaining the NOX purification ratio after the regeneration treatment at a high value.

Also, with the comparative catalyst (the comparative catalyst explained in the column of the Ba—K—Sr-based NOx absorber), the NOx purification ratio at fresh is 72%, the NOx purification ratio after the $SO_2$ treatment is 41%, and the NOx purification ratio after the regeneration treatment is 63%. Hence, it is understood that in the case of supporting K and Mg in addition to Ba, the NOx purification ratios at fresh, after the $SO_2$ treatment, and after the regeneration treatment are all higher than those of the comparative catalyst including Ba alone.

Figure 20:
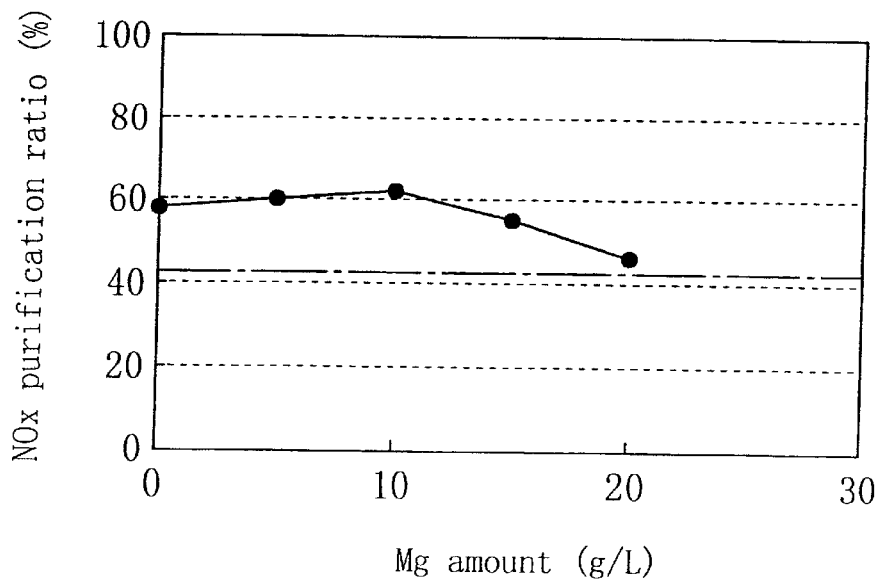
FIG. 20 is a graph showing influences of the support amount of Mg in a catalyst having a Ba—K—Mg-based NOx absorber to the heat resistance thereof.

FIG. 20 shows the measured results of the NOx purification ratios after the above-discussed heat deterioration treatment was applied to each catalyst having thereon supported a different amount of Mg and to the comparative catalyst. In the drawing, an alternate long and short dashed line represents the NOx purification ratio of the comparative catalyst. Herein, the space velocity was 25000 h$^{-1}$. According to the drawing, until the support amount of Mg reaches 20 g/L, the heat resistance of the catalyst is improved, which is advantageous to the above-discussed regeneration.

(Ba—K—Sr—Mg-based NOx Absorber)

Catalysts were prepared under the same conditions and by the same method as Example 1 except that mixed solutions were prepared from an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium acetate, so that the support amount of Pt was 3.0 g/L, the support amount of Rh was 0.1 g/L, the support amount of Ba was 30 g/L, the support amount of K was 6 g/L, the support amount of Mg was 5 g/L, and the support amount Sr was changed in each mixed solution. Also, catalysts were prepared by changing the support amount of Mg to 10 g/L and by changing the support amount of Sr in each mixed solution. Further, catalysts were prepared by changing the support amount of Mg to 15 g/L and by changing the support amount of Sr in each mixed solution. In each of these catalysts, a total amount of supported Pt was also 3.5 g/L, and a total amount of supported Rh was also 0.106 g/L.

Further, catalysts were prepared under the same conditions and by the same method as Example 1 except that mixed solutions were prepared from an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium acetate, so that the support amount of Pt was 3.0 g/L, the support amount of Rh was 0.1 g/L, the support amount of Ba was 30 g/L, the support amount of K was 6 g/L, the support amount of Sr was 10 g/L, and the support amount of Mg was changed in each mixed solution.

Figure 21:
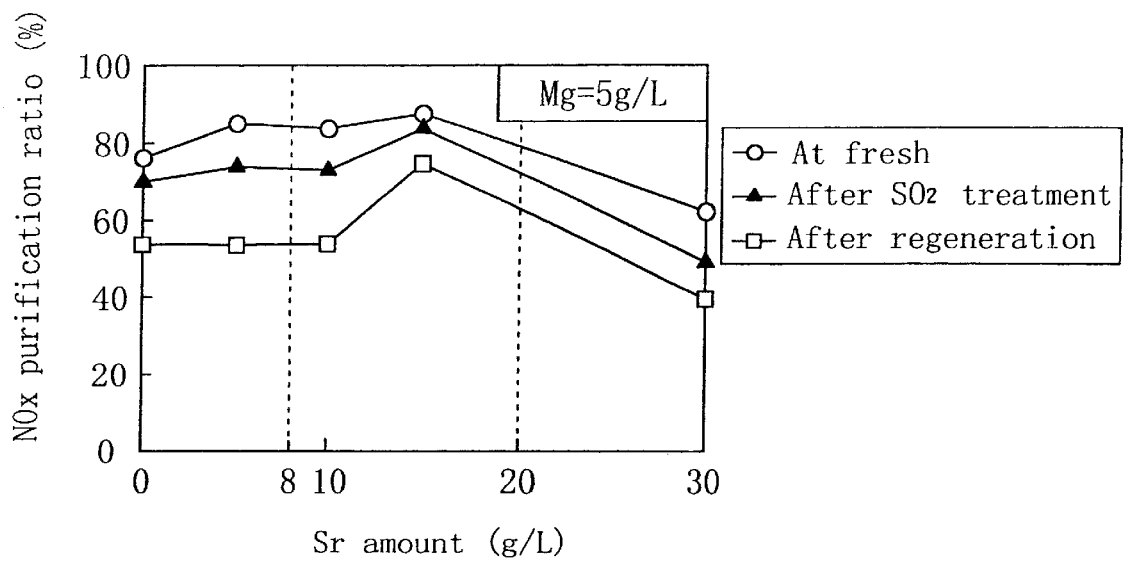
FIG. 21 is a graph showing influences of the support amount of Sr in a catalyst having a Ba—K—Sr—Mg-based NOx absorber to the NOx purification ratios thereof at fresh, after S poisoning treatment, and after regeneration treatment when the support amount of Mg is 5 g/L.
Figure 22:
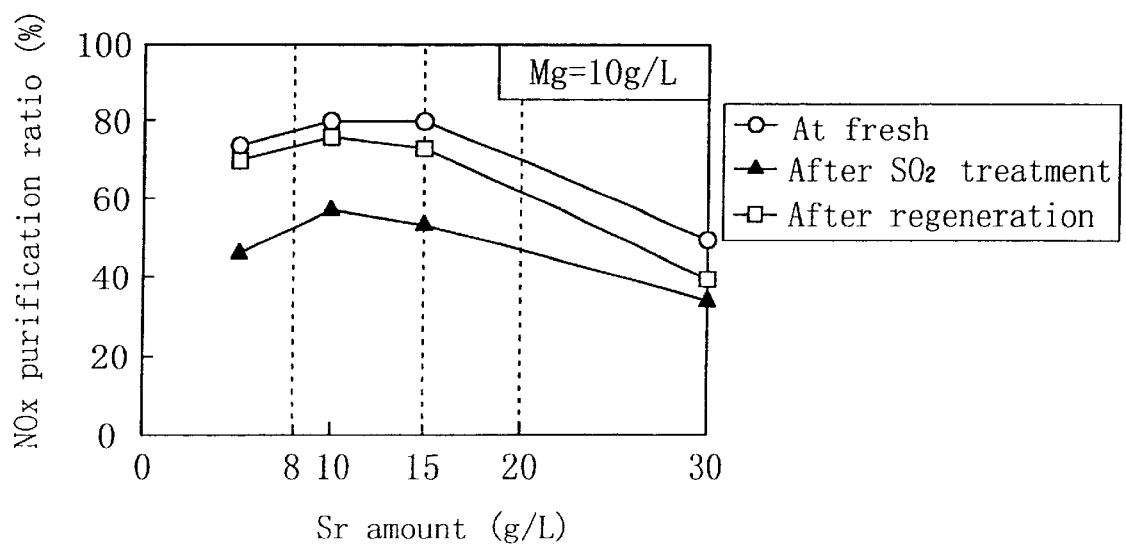
FIG. 22 is a graph showing influences of the support amount of Sr in a catalyst having a Ba—K—Sr—Mg-based NOx absorber to the NOx purification ratios thereof at fresh, after S poisoning treatment, and after regeneration treatment when the support amount of Mg is 10 g/L.
Figure 23A:
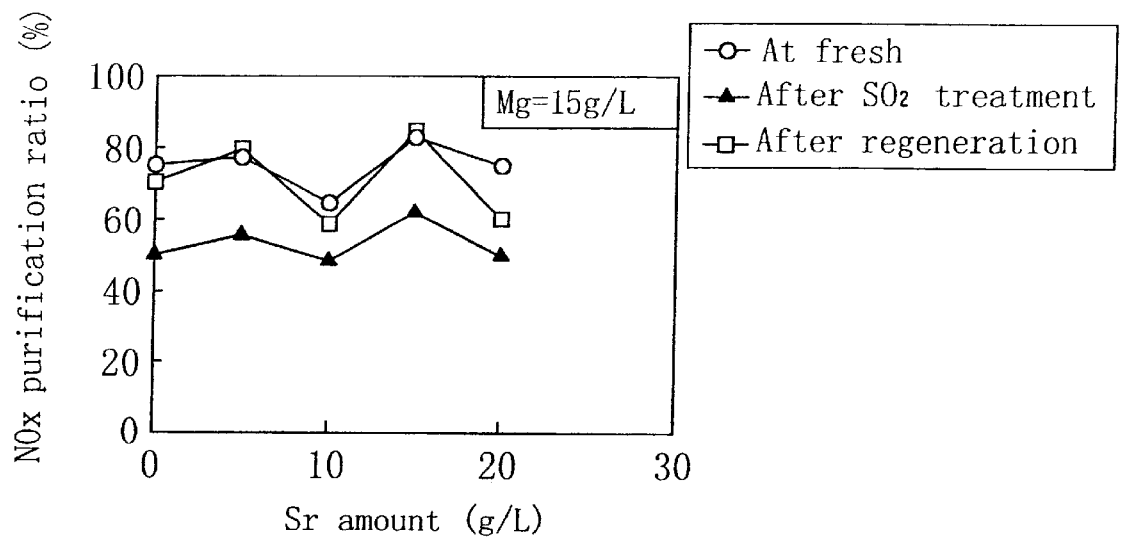
FIG. 23A is a graph showing influences of the support amount of Sr in a catalyst having a Ba—K—Sr—Mg-based NOx absorber to the NOx purification ratios thereof at fresh, after S poisoning treatment, and after regeneration treatment when the support amount of Mg is 15 g/L.
Figure 23B:
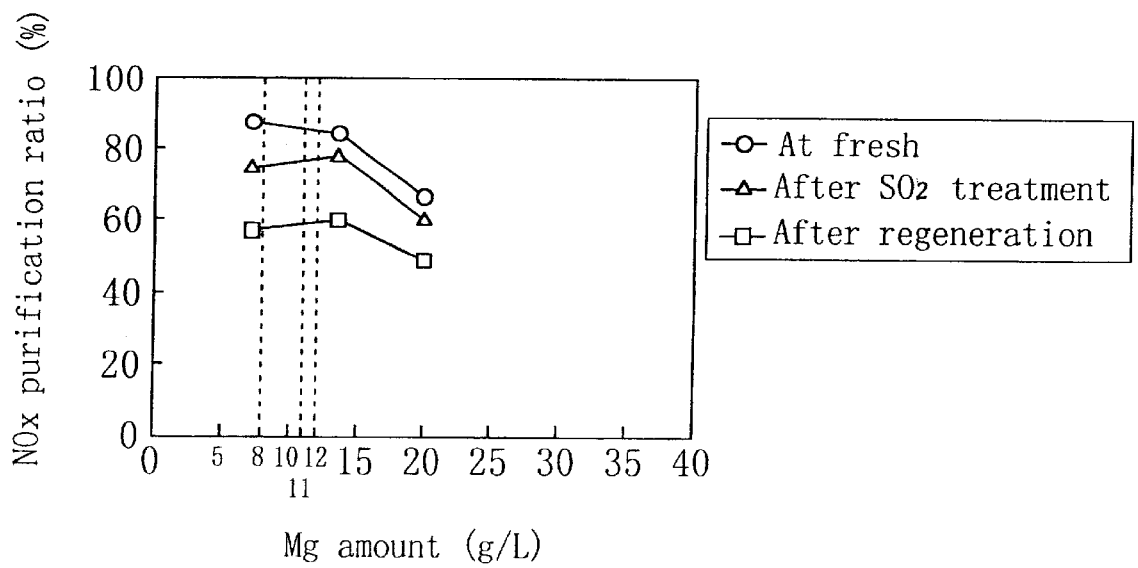
FIG. 23B is a graph showing influences of the support amount of Mg in a catalyst having a Ba—K—Sr—Mg-based NOx absorber to the NOx purification ratios thereof at fresh, after S poisoning treatment, and after regeneration treatment when the support amount of Sr is 10 g/L.

With each catalyst having thereon supported a different amount of Mg and a different amount of Sr, the NOx purification ratios at fresh, after the SO$_2$ treatment, and after the regeneration treatment were measured by the evaluation test explained above. FIG. 21 shows the results when the support amount of Mg is 5 g/L. FIG. 22 shows the results when the support amount of Mg is 10 g/L. FIG. 23A shows the results when the support amount of Mg is 15 g/L. FIG. 23B shows the results when the support amount of Sr is 10 g/L and the support amount of Mg is changed.

According to FIG. 21, in case where the support amount of Mg is 5 g/L, the NOx purification ratio after the regeneration reaches the maximum when the support amount of Sr is 15 g/L, and the regeneration ratio of the NOx purification ratio from the SO$_2$ poisoning is high. According to FIG. 22, in case where the support amount of Mg is 10 g/L, the NOx purification ratio after the regeneration reaches the maximum when the support amount of Sr is 10 g/L, and the regeneration ratio of the NOx purification ratio from the SO$_2$ poisoning is high. Also, when the support amount of Sr is 5 g/L, the regeneration ratio of the NOx purification ratio from the SO$_2$ poisoning is high. According to FIG. 23A, in case where the support amount of Mg is 15 g/L, the regeneration ratio of the NOx purification ratio from the SO$_2$ poisoning is high when the support amount of Sr is in a range from 5 g/L to 15 g/L. According to FIG. 23B, in case where the support amount of Sr is 10 g/L, the NOx purification ratios after the SO$_2$ treatment and after the regeneration treatment are high when the support amount of Mg is about 10 g/L.

In view of the foregoing, it is understood that by using Sr and Mg in addition to Ba and K, the regeneration ratio of the NOx purification ratio from the SO$_2$ poisoning can be high even when the support amount of Sr is small.

Also, with the comparative catalyst (the comparative catalyst explained in the column of the Ba—K—Sr-based NOx absorber), the NOx purification ratio at fresh is 72%, the NOx purification ratio after the SO$_2$ treatment is 41%, and the NOx purification ratio after the regeneration treatment is 63%. Hence, it is understood that, in the case of supporting K, Sr, and Mg in addition to Ba, the NOx purification ratios at fresh, after the SO$_2$ treatment, and after the regeneration treatment are all higher than those of the comparative catalyst including Ba alone.

Figure 24:
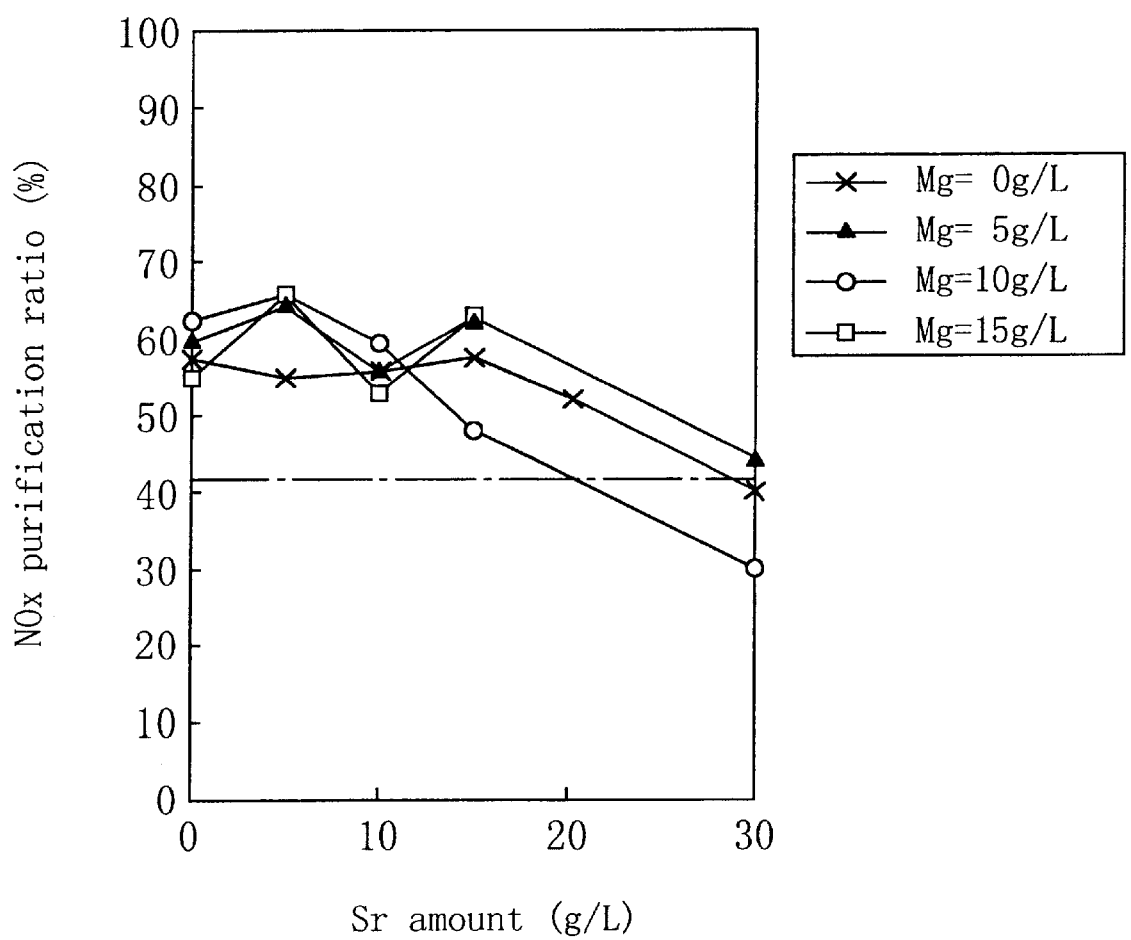
FIG. 24 is a graph showing influences of the support amount of Mg and the support amount Sr to the heat resistance of a catalyst having a Ba—K—Sr—Mg-based NOx absorber.

FIG. 24 shows the measured results of the NOx purification ratios after the above-discussed heat deterioration treatment was applied to each catalyst having thereon supported a different amount of Mg and a different amount of Sr and to the comparative catalyst. In the drawing, an alternate long and short dashed line represents the NOx purification ratio of the comparative catalyst. Herein, the space velocity was 25000 h$^{-1}$. According to the drawing, the heat resistance of the catalyst is improved when Sr and Mg are used in addition to Ba and K, and it is understood that the foregoing arrangement is advantageous to the above-discussed regeneration. It should be noted, however, that an excess amount of supported Sr or an excess amount of supported Mg is disadvantageous in improving the heat resistance.

It is understood from the foregoing that the resistance to the S poisoning, heat resistance, and regeneration properties from the S poisoning are satisfactory when the support amount of Sr is 8 to 20 g/L (preferably 8 to 15 g/L), and the support amount of Mg is 8 to 12 g (preferably 8 to 11 g/L).

Figure 25:
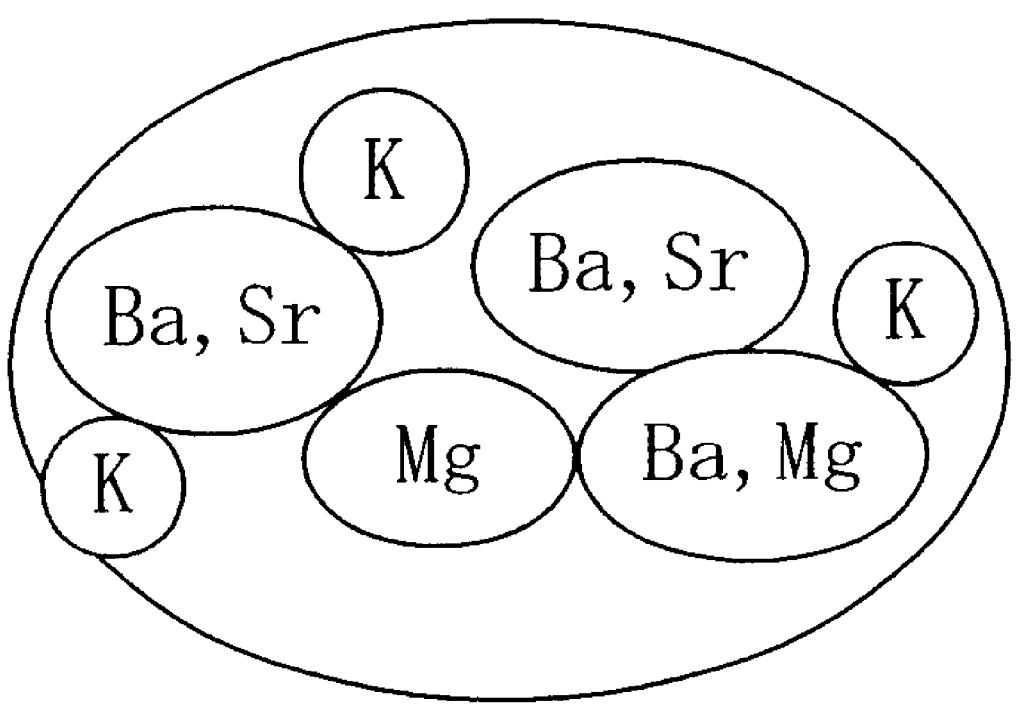
FIG. 25 is a model view schematically showing a presence condition of the Ba—K—Sr—Mg-based NOx absorber in a catalyst layer.

FIG. 25 is a view schematically showing the presence condition of the Ba—K—Sr—Mg-based NOx absorber on the catalyst layers. It is assumed that a part of Ba and a part of Sr supported on the inner and outer coat layers form one compound (mixed oxide or double salt) with both the elements being constituent elements, and a part of Ba and a part of Mg come in close proximity to each other or bond to each other, and therefore, are in an almost amorphous state, wherein K neither forms a complex not undergoes affinity with Ba, Sr, and Mg, and resides dispersedly in the periphery of the Ba—Sr compound or Ba—Mg coexisting substance.

It is assumed that the Ba—Sr compound (hereinafter, referred to as a double compound when needed) is less susceptible to the S poisoning compared to the case of Ba alone, and for this reason, deterioration of the NOx absorption ability is suppressed. It is assumed that the Ba—Mg coexisting substance suppresses the S poisoning of Ba (formation of barium sulfate) compared with the case of Ba alone, and for this reason, deterioration of the NOx absorption ability is suppressed. Because K is relatively highly reactive with sulfur, it is assumed that K resides in the periphery of the Ba—Sr compound or Ba—Mg coexisting substance and prevents the S poisoning of these compound and substance.

(The support amount of K)

Influences of the support amount of K to the resistance to the S poisoning, the regeneration properties from the S poisoning, and the heat resistance of the catalyst were examined.

More specifically, solutions were prepared as impregnation mixed solutions by weighting and mixing an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium acetate, so that the support amount of Pt was 6.5 g/L, the support amount of Rh was 0.1 g/L, the support amount of Ba was 30 g/L, the support amount of Sr was 10 g/L, the support amount of Mg was 10 g/L, and the support amount of K was 2 g/L, 6 g/L, 15 g/L, or 30 g/L in each solution.

Then, γ-alumina, ternary complex oxide of Ce—Zr—Sr ($CeO_2$—$ZrO_2$—SrO compound with an atomic mass ratio among three elements: Ce:Zr:Sr=75:25:1), and an alumina binder were weighted, so that the support amount of γ-alumina was 160 g/L, the support amount of Ce—Zr—Sr complex oxide was 160 g/L, and the support amount of binder was 30 g/L. Then, ion exchange water was added thereto, whereby slurry was prepared.

A half of the slurry was wash-coated on a honeycomb substrate, and subjected to drying and calcining, whereby an inner coat layer was formed. Then, the rest of the slurry was wash-coated on the inner coat layer, and subject to drying and calcining, whereby an outer coat layer was formed. Subsequently, each solution was impregnated into both the inner and outer coat layers, and subjected to drying and calcining, whereby catalysts each having thereon supported a different amount of K were obtained.

Figure 26:
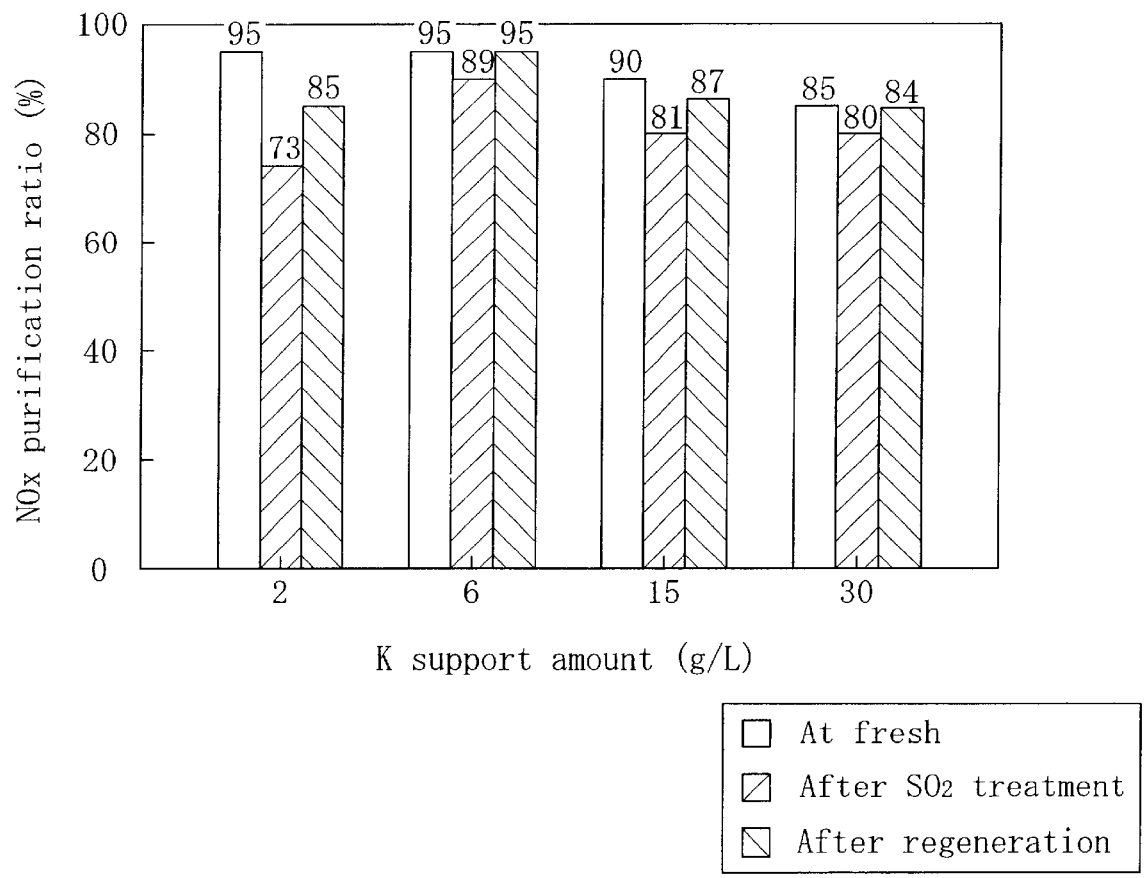
FIG. 26 is a graph showing influences of the support amount of K to resistance to the S poisoning and regeneration properties from the S poisoning of the catalyst.
Figure 27:
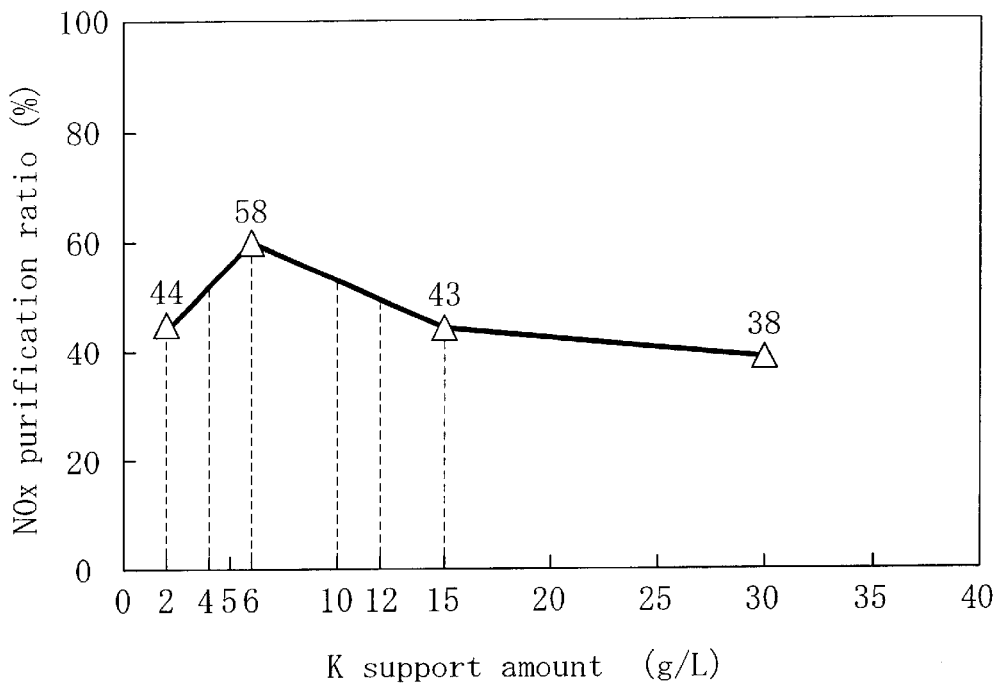
FIG. 27 is a graph showing influences of the support amount of K to the heat resistance of the catalyst (NOx purification ratios at a measuring temperature of 350° C.)
Figure 28:
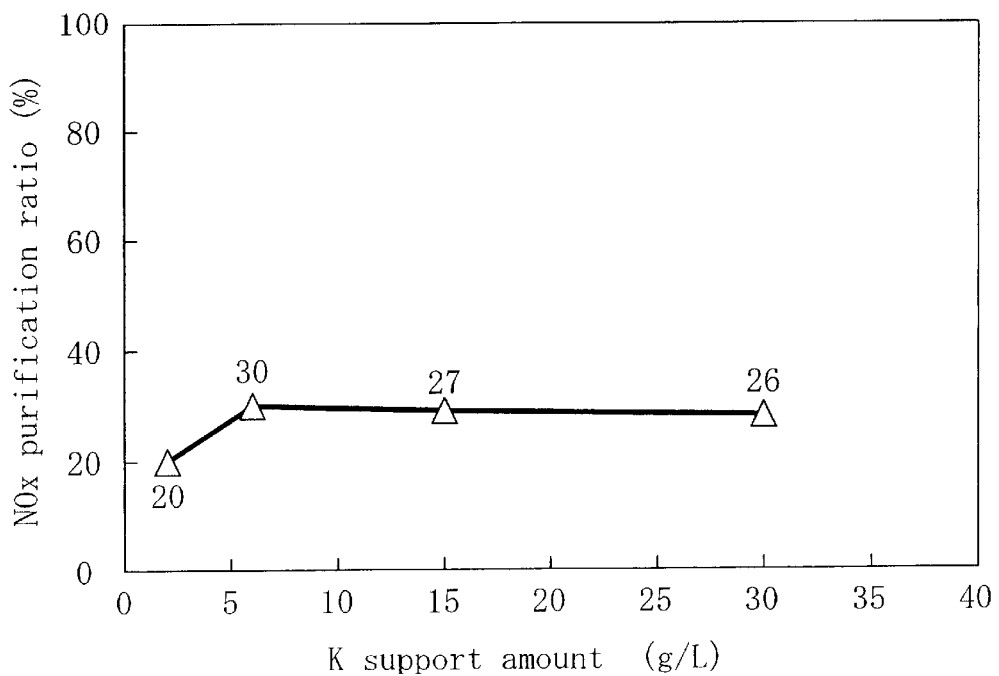
FIG. 28 is a graph showing influences of the support amount of K to the heat resistance of the catalyst (NOx purification ratios at a measuring temperature of 450° C.)

As to each of the foregoing catalysts, the NOx purification ratios at fresh, after the $SO_2$ treatment, and after the regeneration treatment were measured by the same method as the measuring method of the NOx purification ratios explained above. Herein, the measuring temperature of the NOx purification ratio (the gas temperature at the catalyst inlet) was 350° C. The results are shown in FIG. 26. Also, the NOx purification ratios after the heat deterioration treatment were measured by the same method as the measuring method of the NOx purification ratios explained above. Herein, the results at the measuring temperature of the NOx purification ratio (the gas temperature at the catalyst inlet) of 350° C. are shown in FIG. 27, and the results at the measuring temperature of 450° C. are shown in FIG. 28.

According to FIG. 26, the NOx purification ratio at fresh shows a high value when the support amount of K is 2 g/L or 6 g/L, but the purification ratio drops when the support amount of K increases to 15 g/L or 30 g/L. Hence, it is understood that it is not preferable to set the support amount of K to 15 g/L or more.

The NOx purification ratio after the $SO_2$ treatment shows a peak value when the support amount of K is 6 g/L, and the purification ratio starts to drop when the support amount of K is increased further. This deterioration corresponds to the deterioration of the NOx purification ratio at fresh, and deterioration of the NOx purification ratio caused by the S poisoning per se is small. Hence, it is understood that K is effective to improve the resistance to the S poisoning.

On the other hand, when the support amount of K is 2 g/L, the NOx purification ratio after the $SO_2$ treatment is low, but the NOx purification ratio after the regeneration treatment is high. That is to say, the regeneration ratio from the S poisoning is high. Hence, it is preferable to set the support amount of K to 2 g/L or more.

Next, FIG. 27 (the NOx purification ratio after the heat deterioration treatment at a measuring temperature of 350° C.) shows that the purification ratio shows a peak value when the support amount of K is 6 g/L. Hence, it is understood that K is effective to improve the heat resistance of the catalyst. When the support amount of K is increased to 15 g/L or 30 g/L, the NOx purification ratio after the heat deterioration treatment is lowered, and this deterioration is assumed to correspond to deterioration of the NOx purification ratio at fresh (see FIG. 26). Although it is not noticeable, such influences of K to the heat resistance are also observed in the case of FIG. 28 (the NOx purification ratio after the heat deterioration treatment at a measuring temperature of 450° C.).

In view of the foregoing, it can be said that a preferable amount of supported K is 2 to 15 g/L, and a more preferable amount of supported K is 2 to 12 g/L or 4 to 10 g/L.

Influences of the ternary complex oxide of Ce—Zr—Sr as the support material to the performance of the catalyst will be discussed later.

Next, the following description will describe another example of influences of the K support amount to the performance of the catalyst.

Mixed solutions were prepared by weighting and mixing an aqueous solution of dinitrodiamine platinum nitrate, an aqueous solution of barium acetate, and an aqueous solution of potassium acetate, so that the support amount of Pt was 6.0 g/L, the support amount of Ba was 30 g/L, and the support amount of K was 0 g/L, 2 g/L, 4 g/L, 6 g/L, 8 g/L, 10 g/L, or 30 g/L in each mixed solution. Catalysts each having thereon supported a different amount of K were prepared under the same conditions and by the same method as Example 1 except that the above mixed solutions were used for impregnation.

Each catalyst was subjected to heat treatment at 900° C. for 24 hours in an ambient atmosphere. Then, each catalyst was attached to a fixed bed flow-through reaction evaluator. At the beginning, a simulated exhaust gas (gas composition A in Table 1 above) with a lean air-fuel ratio was flown into the catalyst until the NOx purification ratio became stable. Then, the gas composition was switched, so that a simulated exhaust gas (gas composition B in Table 1 above) with a rich air-fuel ratio was flown. Then, three minutes later, the gas composition was switched again to the one with a lean air-fuel ratio (gas composition A), and the NOx purification ratio (lean NOx purification ratio) for 130 seconds from this switching point was measured. Herein, the catalyst temperature and the simulated exhaust gas temperature were both 350° C., and the space velocity SV was 25000 $h^{-1}$.

Also, each catalyst was subjected to heat treatment at 900° C. for 24 hours in an ambient atmosphere in the same manner as the case of measuring the NOx purification ratios, after which the catalyst was attached to the fixed bed flow-through reaction evaluator. At the beginning, a simulated exhaust gas (gas composition A) with a lean air-fuel ratio was flown into the catalyst until the NOx purification ratio became stable. Then, the gas composition was switched, so that a simulated exhaust gas (gas composition B) with a rich air-fuel ratio was flown. Then, three minutes later, the gas composition was switched again to the one with a lean air-fuel ratio (gas composition A), and three minutes later, the gas composition was switched again to the one with a rich air-fuel ratio (gas composition B). The HC purification ratio was measured for 130 seconds from this switching point. Herein, the catalyst temperature and the simulated exhaust gas temperature were both 350° C., and the space velocity SV was 25000 $h^{-1}$.

Figure 29:
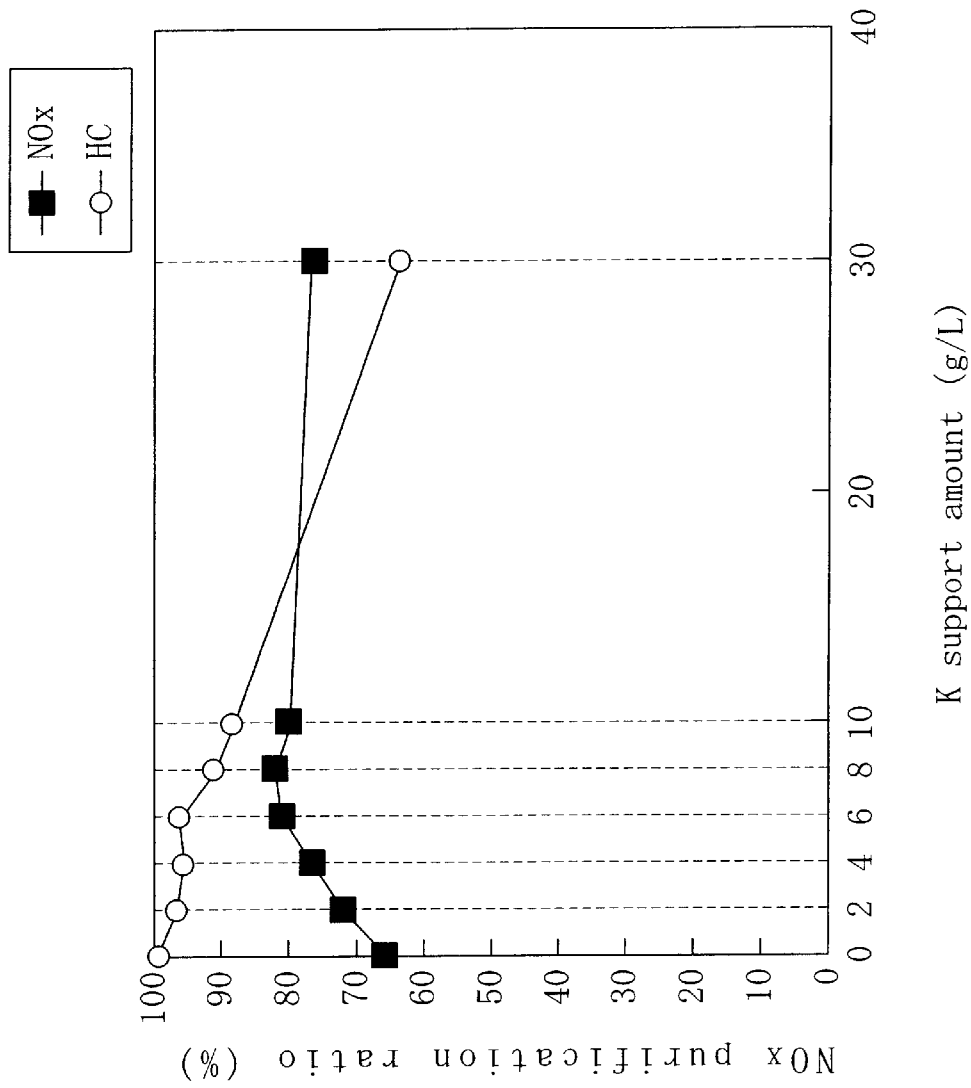
FIG. 29 is a graph showing a relation between the support amount of K and purification ratios of NOx and HC.

The measured results are shown in FIG. 29. According to the drawing, when the support amount of K is 2 g/L or more, the NOx purification ratio exceeds 70%, and until the amount reaches 10 g/L, the NOx purification ratio keeps rising gradually. However, when the support amount of K exceeds 10 g/L, no further improvement of the NOx purification ratio is achieved.

Also, the HC purification ratio tends to drop with an increasing amount of supported K. In particular, although the HC purification ratio is maintained at 95% or higher until the support amount of K reaches 6 g/L, the HC purification ratio drops abruptly to the order of 80% when the amount exceeds 6 g/L. The reason for this is assumed that when the support amount of K exceeds 6 g/L, a great deal of K resides in the periphery of the precious metal, thereby preventing HC from coming in close proximity to the precious metal.

Hence, in order to achieve a balance between the NOx purification in the lean condition and the HC purification in the stoichimetric or rich condition, it is preferable to set the support amount K to 2 to 6 g/L. The measured results herein are the results when neither Sr nor Mg is included in the NOx absorber. However, it is assumed that the same can be said as to the support amount K when Sr and Mg are included. (The support amount of Ba)

The following description will describe the examination results of influences of the support amount Ba to the performance of the catalyst.

Mixed solutions were prepared by weighting and mixing an aqueous solution of dinitrodiamine platinum nitrate, an aqueous solution of barium acetate, and an aqueous solution of potassium acetate, so that the support amount of Pt was 6.0 g/L, the support amount of K was 6 g/L, and the support amount of Ba was 5 g/L, 10 g/L, 15 g/L, 20 g/L, 30 g/L, 40 g/L, or 50 g/L in each mixed solution. Catalysts each having thereon supported a different amount of Ba were prepared under the same conditions and by the same method as Example 1 except that the above mixed solutions were used for impregnation.

The NOx purification ratio of each catalyst was measured under the same conditions and by the same method as above. More specifically, each catalyst was subjected to heat treatment at 900° C. for 24 hours in an ambient atmosphere. Then, each catalyst was attached to a fixed bed flow-through reaction evaluator. Then, the gas composition was switched in the order of: the lean air-fuel ratio (gas composition A)→the rich air-fuel ratio (gas composition B)→the lean air-fuel ratio (gas composition A), and the NOx purification ratio (lean NOx purification ratio) for 130 seconds from the switching point was measured. Herein, the catalyst temperature and the simulated exhaust gas temperature were both 350° C., and the space velocity SV was 25000 h$^{-1}$.

Figure 30:
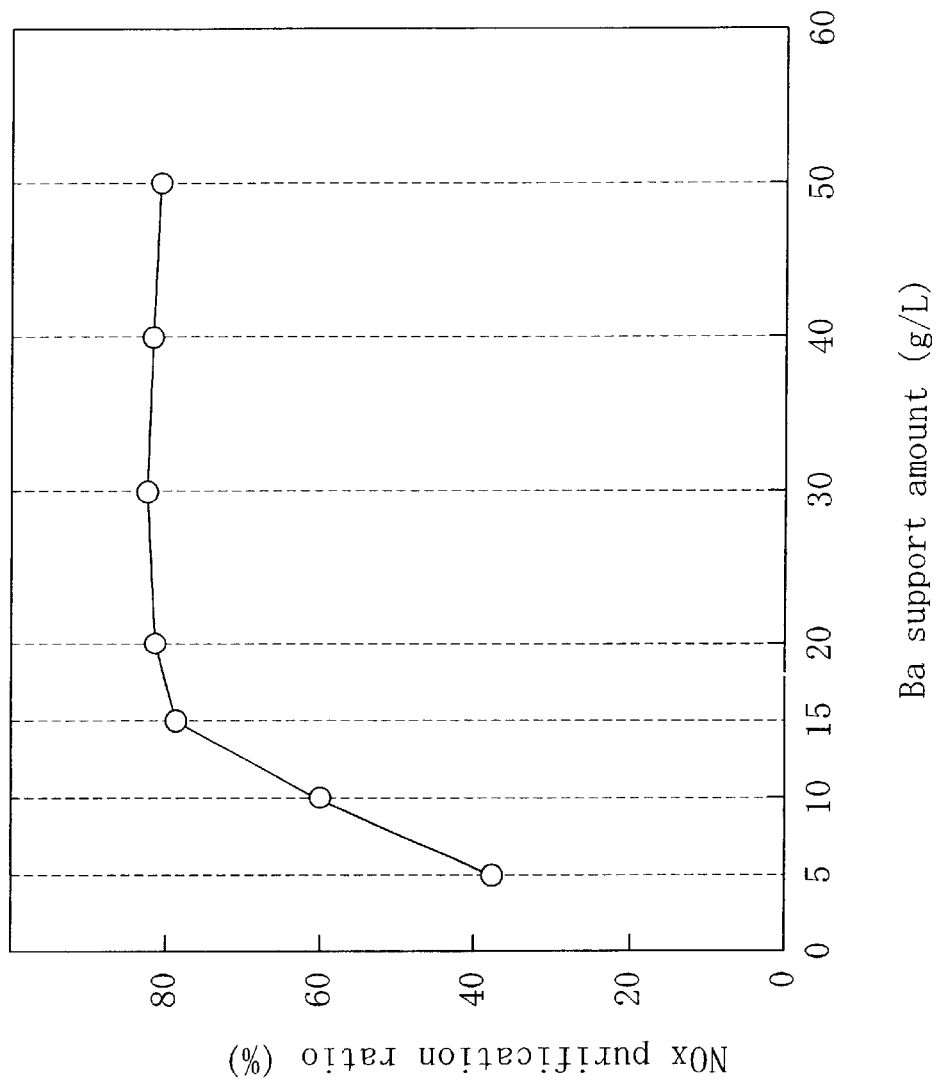
FIG. 30 is a graph showing a relation between the support amount of Ba and NOx purification ratios.

The measured results are shown in FIG. 30. According to the drawing, when the support amount of Ba is 5 g/L to 15 g/L, the NOx purification ratio is drastically improved with an increasing amount of supported Ba. Also, it shows that when the support amount of Ba is 15 g/L to 30 g/L, a degree of improvement of the NOx purification ratio is lessened, and the NOx purification ratio reaches the upper limit when the amount reaches 30 g/L, and more or less the same NOx purification ratio is maintained when the support amount of Ba exceeds 30 g/L. Thus, even when the support amount of Ba is increased to exceed 30 g/L, the improvement of the NOx purification ratio cannot be expected. A sufficient mass ratio of the support amount of Ba to the support amount of K is assumed to be approximately 5 to 15.

(Influences of the Support Amount of Pt)

An impregnation mixed solution was prepared by weighting and mixing an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium acetate, so that the support amount of Pt was 6.5 g/L, the support amount of Rh was 0.1 g/L, the support amount of Ba was 30 g/L, the support amount of K was 6 g/L, the support amount of Sr was 10 g/L, and the support amount of Mg was 10 g/L.

Then, γ-alumina, ternary complex oxide of Ce—Zr—Sr ($CeO_2$—$ZrO_2$—SrO compound with an atomic mass ratio among three elements: Ce:Zr:Sr=75:25:1), and an alumina binder were weighted, so that the support amount of γ-alumina was 160 g/L, the support amount of Ce—Zr—Sr complex oxide was 160 g/L, and the support amount of binder was 30 g/L. Then, ion exchange water was added thereto, whereby slurry was prepared.

A half of the slurry was wash-coated on a honeycomb substrate, and subjected to drying and calcining, whereby an inner coat layer was formed. Then, the rest of the slurry was wash-coated on the inner coat layer, and subjected to drying and calcining, whereby an outer coat layer was formed. Subsequently, each mixed solution was impregnated into both the inner and outer coat layers, and subjected to drying and calcining, whereby a catalyst having thereon supported 6.5 g/L of Pt was obtained.

Also, another catalyst was prepared under the same conditions and by the same method as above except that the support amount of Pt was changed to 3.5 g/L from 6.5 g/L.

Figure 31:
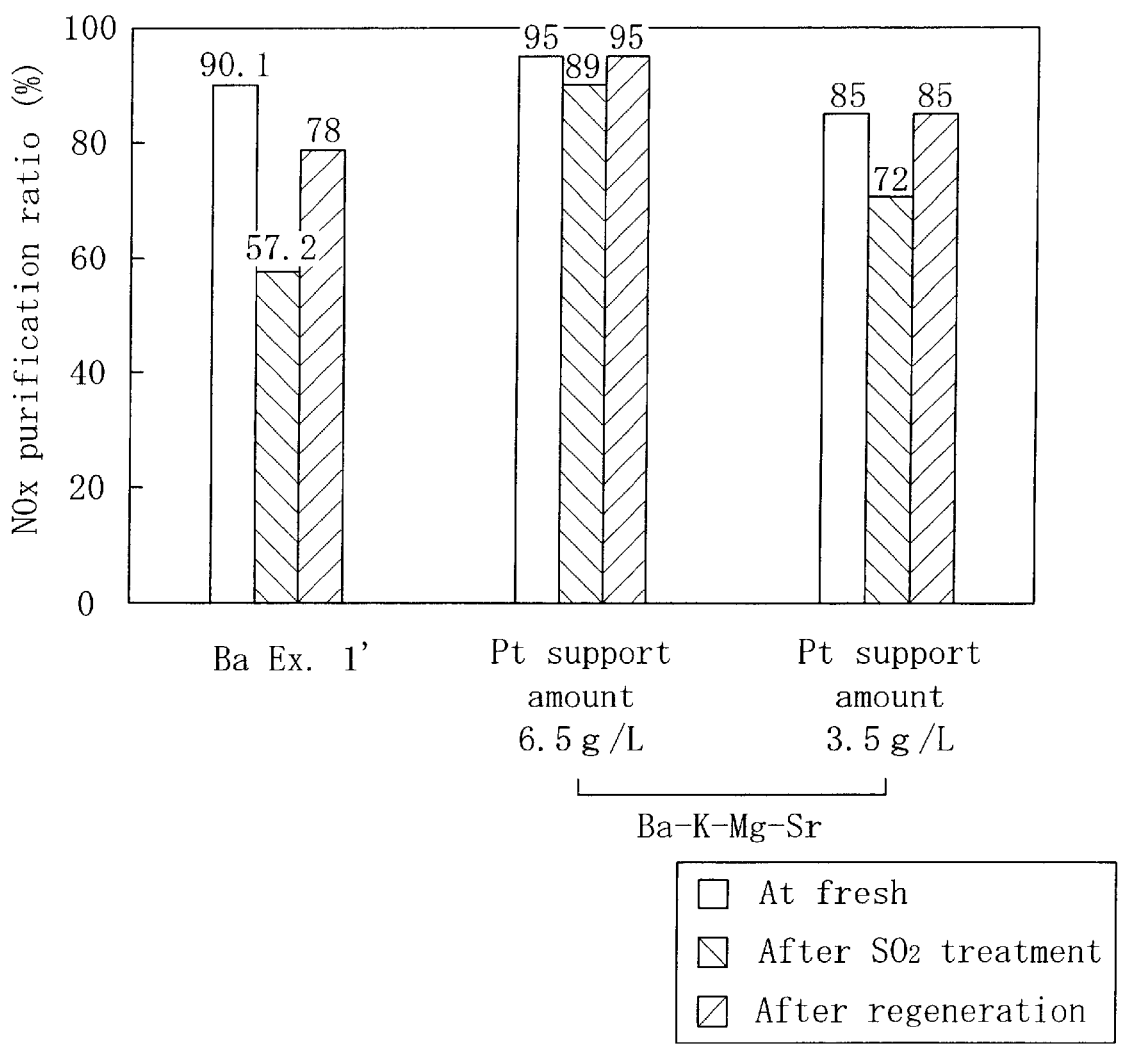
FIG. 31 is a graph showing influences of the support amount of Pt to resistance to the S poisoning and regeneration properties from the S poisoning of the catalyst.

With the catalyst having thereon supported 3.5 g/L of Pt and the catalyst having thereon supported 6.5 g/L of Pt, the NOx purification ratios at fresh, after the $SO_2$ treatment, and after the regeneration treatment were measured by the same method as the measuring method of the NOx purification ratio explained above. Herein, the measuring temperature of the NOx purification ratio (the gas temperature at the catalyst inlet) was 350° C., and the space velocity SV was 55000 h$^{-1}$. The results are shown in FIG. 31 with the result of Example 1 above.

The drawing shows that the purification ratio at fresh is high when the support amount of Pt is 6.5 g/L, and the NOx purification ratios after the $SO_2$ treatment and after the regeneration treatment are higher than those of the catalysts of Examples 1 through 11 above (see FIG. 14). In particular, it is characteristic that the NOx purification ratio after the regeneration treatment is as high as the NOx purification ratio at fresh.

On the other hand, with the catalyst having thereon supported 3.5 g/L of Pt, the NOx purification ratio after the regeneration treatment is as high as the NOx purification ratio at fresh. However, the NOx purification ratios at fresh, after the $SO_2$ treatment, and after the regeneration treatment are all lower than those of the catalyst having thereon supported 6.5 g/L of Pt. The reason for this is assumed that because the support amount of Pt is less, Pt residing in close proximity to Ba is reduced, and for this reason, even when NOx approaches Ba, the adsorption and reduction of NOx by the interaction of Ba and Pt are not performed smoothly.

With the catalyst having thereon supported 3.5 g/L of Pt and the catalyst having thereon supported 6.5 g/L of Pt, the NOx purification ratios at fresh and after the heat deterioration treatment were measured by the same method as the measuring method of the NOx purification ratio explained above. Herein, the measuring temperatures (gas temperatures at the catalyst inlet) of the NOx purification ratio were 350° C., and 450° C., and the space velocity was 55000h$^{-1}$. The results at the measuring temperature of 350° C. are shown in FIG. 32 with the results of Example 1 above, and the results at the measuring temperature of 450° C. are shown in FIG. 33 with the results of Example 1 above.

Figure 32:
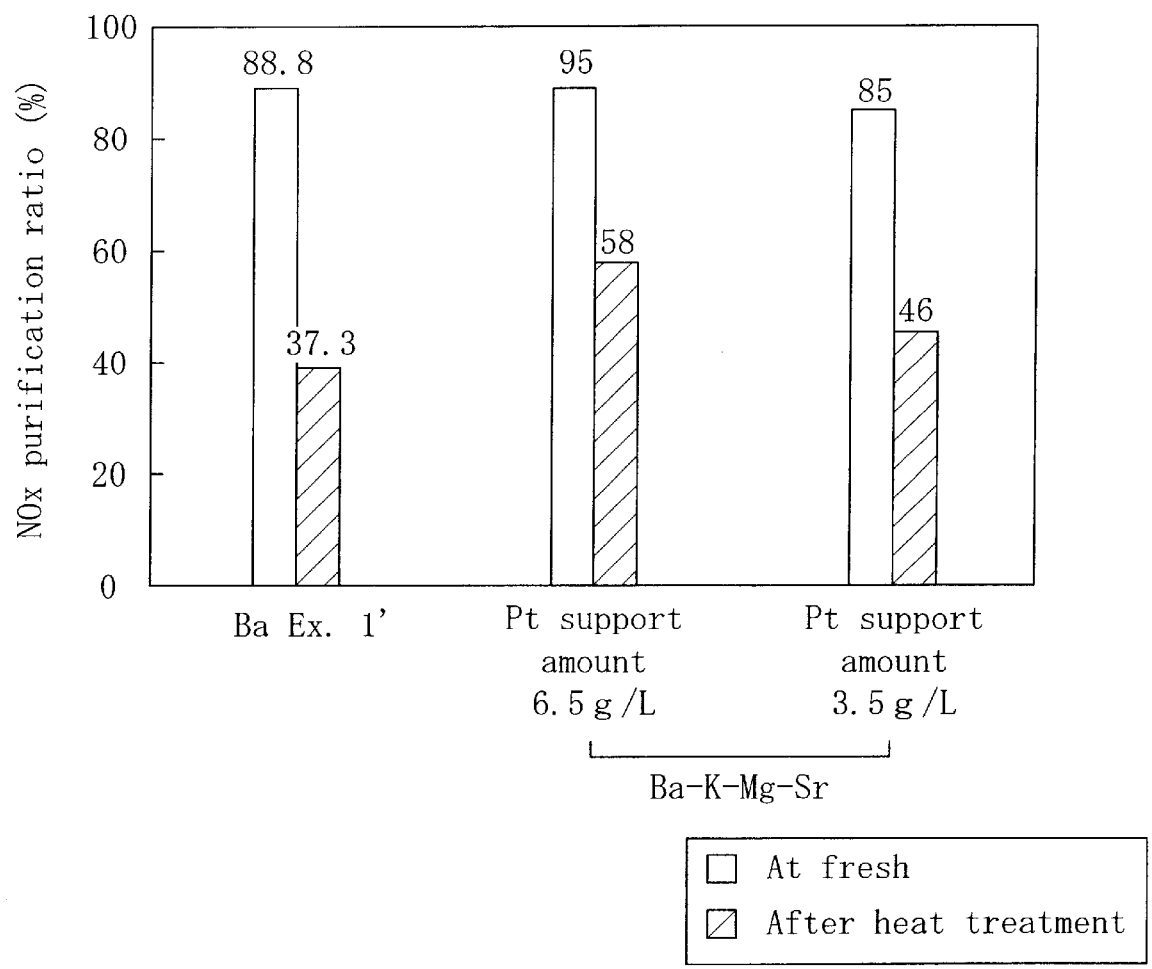
FIG. 32 is a graph showing influences of the support amount of Pt to the heat resistance of the catalyst (NOx purification ratios at a measuring temperature of 350° C.)
Figure 33:
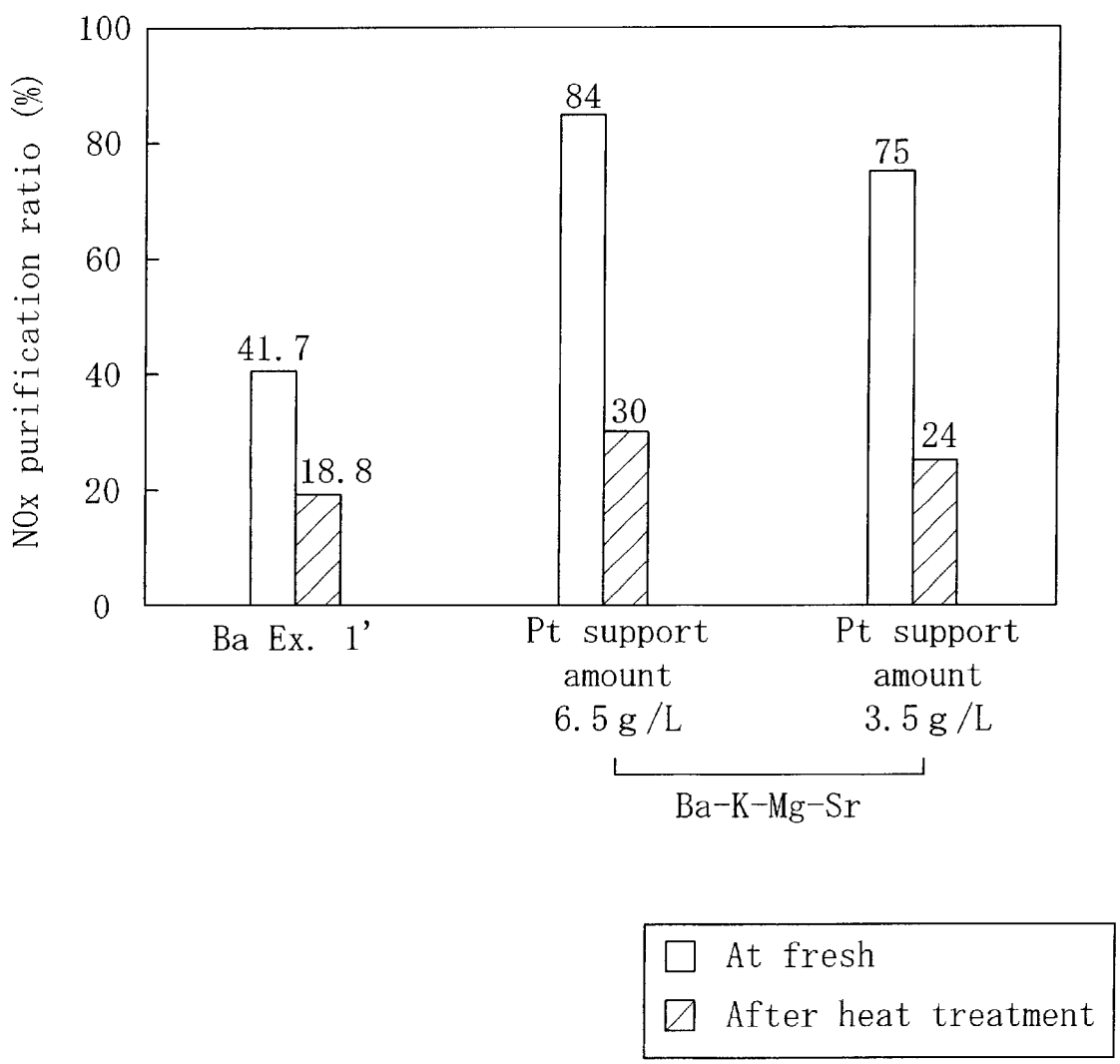
FIG. 33 is a graph showing influences of the support amount of Pt to the heat resistance of the catalyst (NOx purification ratios at a measuring temperature of 450° C.)

FIGS. 32 and 33 shows that the NOx purification ratio after the heat deterioration treatment is higher with the catalyst having thereon supported 6.5 g/L of Pt than with those of Examples 1 through 11 (see FIGS. 15 and 16). Also, as to the catalyst having thereon supported 3.5 g/L of Pt, given a consideration to the fact that the support amount of Pt is small compared with the catalysts of Examples 1 through 11 (approximately 6 g/L), it can be said that the heat resistance is improved.

(Impregnation Order of Precious Metal and NOx Absorber)

Influences of the impregnation order of a precious metal solution and a NOx absorber solution to the performance of the catalyst were examined.

More specifically, as impregnation mixed solutions, a first solution was prepared by weighting and mixing an aqueous solution of strontium acetate and an aqueous solution of magnesium acetate, so that the support amount of Sr was 10 g/L and the support amount of Mg was 10 g/L, and a second solution was prepared by weighting and mixing an aqueous solution of dinitrodiamine platinum nitrate, an aqueous solution of rhodium acetate, an aqueous solution of barium acetate, and an aqueous solution of potassium acetate, so that the support amount of Pt was 6.5 g/L, the support amount of Rh was 0.1 g/L, the support amount of Ba was 30 g/L, and the support amount of K was 6 g/L. Meanwhile, inner and outer coat layers were formed on a honeycomb substrate from γ-alumina, ternary complex oxide of Ce—Zr—Sr, and an alumina binder under the same conditions and by the same method as above.

Then, the first solution was impregnated into the inner and outer coat layers, and subjected to drying and calcining, and further, the second solution was impregnated into the inner and outer coat layers, and subjected to drying and calcining, whereby a catalyst was obtained. The catalyst thus obtained is referred to as Mg and Sr earlier impregnated catalyst.

Also, as impregnation mixed solutions, a first solution was prepared by weighting and mixing an aqueous solution of barium acetate and an aqueous solution of magnesium acetate, so that the support amount of Ba was 30 g/L and the support amount of Mg was 10 g/L, and a second solution was prepared by weighting and mixing an aqueous solution of dinitrodiamine platinum nitrate, an aqueous solution of rhodium acetate, an aqueous solution of strontium acetate, and an aqueous solution of potassium acetate, so that the support amount of Pt was 6.5 g/L, the support amount of Rh was 0.1 g/L, the support amount of Sr was 10 g/L, and the support amount of K was 6 g/L. Meanwhile, inner and outer coat layers were formed on a honeycomb substrate from γ-alumina, ternary complex oxide of Ce—Zr—Sr, and an alumina binder under the same conditions and by the same method as above.

Then, the first solution was impregnated into the inner and outer coat layers, and subjected to drying and calcining, and further, the second solution was impregnated into the inner and outer coat layers, and subjected to drying and calcining, whereby a catalyst was obtained. The catalyst thus obtained is referred to as Ba and Mg earlier impregnated catalyst.

Figure 35:
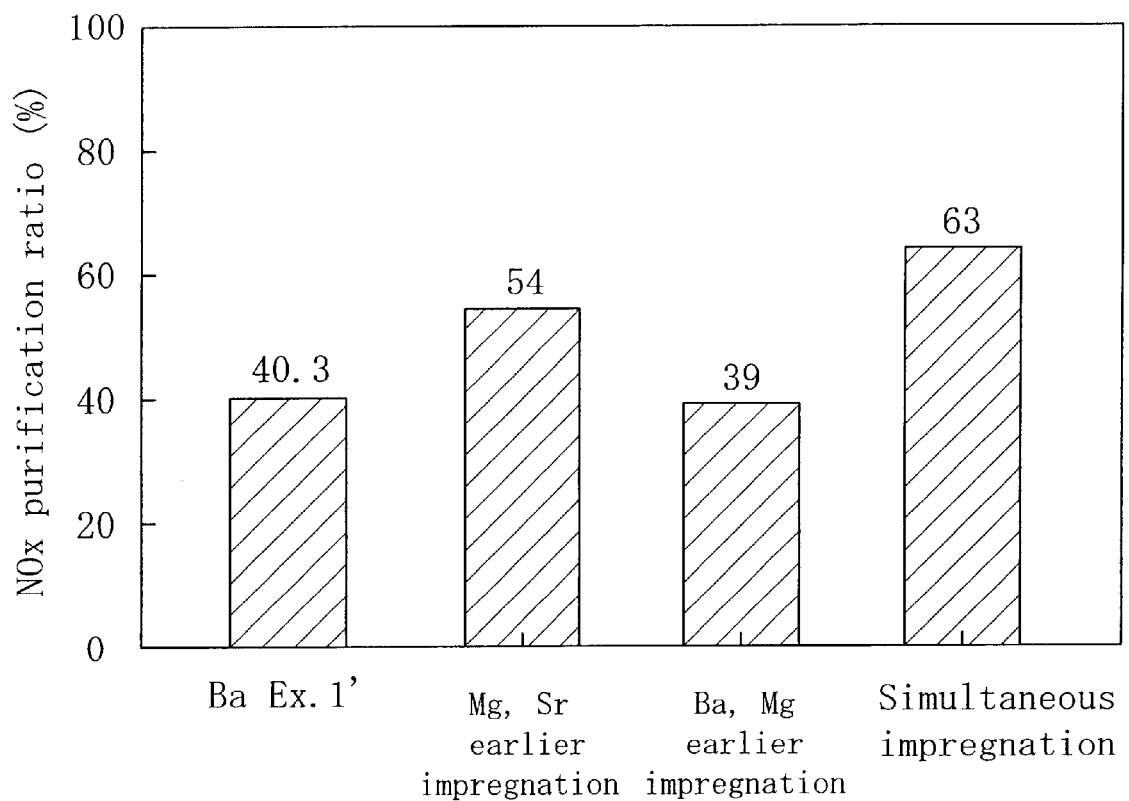
FIG. 35 is a graph showing influences of an impregnation order of the NOx absorber to the heat resistance of the catalyst.

With the two kinds of catalysts having different impregnation orders, the NOx purification ratios at fresh, after the $SO_2$ treatment, after the regeneration treatment, and after the heat deterioration treatment were measured by the same method as the measuring method of the NOx purification ratios explained above. Herein, the measuring temperature (catalyst inlet gas temperature) of the NOx purification ratio was 350° C. and the space velocity SV was 55000 $h^{-1}$. The measured results of the NOx purification ratios at fresh, after the $SO_2$ treatment, and after the regeneration treatment are shown in FIG. 34, and the measured results of the NOx purification ratio after the heat deterioration treatment are shown in FIG. 35, both with the measured results of Example 1 above and of a simultaneous impregnated catalyst.

The simultaneous impregnated catalyst (represented in FIGS. 31 through 33 as a catalyst with the Pt support amount of 6.5 g/L) is defined as a catalyst having thereon supported 6.5 g/L of Pt, which was prepared by impregnating the inner and outer coat layers, made of γ-alumina, ternary complex oxide of Ce—Zr—Sr, and an alumina binder, simultaneously with an aqueous solution of dinitrodiamine platinum nitrate, an aqueous solution of rhodium acetate, an aqueous solution of barium acetate, an aqueous solution of potassium acetate, an aqueous solution of strontium acetate, and an aqueous solution of magnesium.

According to FIG. 34, the Mg and Sr earlier impregnated catalyst and the Ba and Mg earlier impregnated catalyst have slightly lower NOx purification ratios at fresh and after the regeneration treatment than those of the simultaneous impregnation catalyst, but they have higher NOx purification ratios after the $SO_2$ treatment. Also, according to FIG. 35, the Mg and Sr earlier impregnated catalyst and the Ba and Mg earlier impregnated catalyst have lower NOx purification ratios after the heat deterioration treatment than that of the simultaneous impregnation catalyst, but the Mg and Sr earlier impregnated catalyst has a high NOx purification ratio after the heat deterioration treatment compared with the Ba and Mg earlier impregnated catalyst.

Hence, it can be said that when a large volume of solutions are impregnated into the inner and outer coat layers discussed above, the solutions can be divided into two for impregnation, and in this case, an aqueous Sr solution is included in a solution impregnated first and an aqueous K solution is included in a solution impregnated later.

(Ternary Complex Oxide of Ce—Zr—Sr)

As a catalyst to purify an exhaust gas from an engine, there has been known a ternary catalyst, which can purify HC, CO, and NOx in the exhaust gas simultaneously with an extremely effective manner in the vicinity of the theoretical air-fuel ratio. Also, there has been known a so-called lean NOx purifying catalyst, which allows the NOx absorber, such as Ba, to absorb NOx contained in the exhaust gas at a lean air-fuel ratio and moves absorbed NOx onto a precious metal at the theoretical air-fuel ratio or a rich air-fuel ratio, so that NOx reacts with a reducing gas including HC, CO, and $H_2$ contained in the exhaust gas and is purified by means of reduction to $N_2$ while purifying the reducing gas by means of oxidation.

Generally, these catalysts contain, as constituent components, an oxygen storage material that stores and releases oxygen by changing the oxidation number, and $CeO_2$ and $CeO_2$—$ZrO_2$ complex oxide are typically used as the oxygen storage material. These oxides in the ternary catalyst correct a deviation from the theoretical air-fuel ratio by storing or releasing oxygen, and those in the lean NOx purifying catalyst serve as an oxygen supply source to oxidize a great deal of NO contained in the exhaust gas to $NO_2$, which is readily absorbed into the NOx absorber.

Incidentally, when the catalyst is exposed to a high temperature atmosphere for a long time, the oxide forming the oxygen storage material is deteriorated, and oxygen is not stored or released properly, thereby facing a problem that the exhaust gas purifying performance of the catalyst is deteriorated.

Hence, there has been a need for a catalyst for purifying an exhaust gas with excellent resistance to heat deterioration, so that deterioration of the performance for purifying an exhaust gas is small even when the catalyst is exposed to a high temperature atmosphere for a long time.

Accordingly, the inventor of the present invention developed a catalyst using the above-discussed Ce—Zr—Sr ternary double compound, made by combining Sr with complex oxide of Ce and Zr, as an oxygen storage material.

More specifically, it is a catalyst for purifying an exhaust gas, including catalytic metal that purifies HC, CO, and NOx in the exhaust gas by oxidation-reduction, Ce, Zr, and Sr, wherein at least Ce and Zr form the complex oxide.

According to the above arrangement, because the ternary complex oxide is a complex oxide made of $CeO_2$ and $ZrO_2$ with Sr contained therein, the oxygen storage function of the complex oxide is not deteriorated considerably even when the catalyst is exposed to a high temperature atmosphere for a long time, thereby making it possible to obtain a catalyst with excellent resistance to heat deterioration. The reason for this is assumed as follows.

According to an analysis, it appears that the Ce—Zr mixed oxide is highly crystalline, and Sr is assumed to contribute to the high crystallinity. Hence, even when it is exposed to a high temperature, it hardly decomposes and the oxygen storage function is not deteriorated.

Analysis reveals that the primary particles of the ternary complex oxide have a small particle size, and this makes it difficult for heat sintering to proceed. Sr is assumed to contribute to the formation of fine particles.

Analysis reveals that the secondary particles of the ternary complex oxide have a large particle size, which gives a large mesopore and allows the exhaust gas to readily disperse inside. It is assumed that this plays advantageously for the storage and release of oxygen, and as a consequence, allows the 3-composite complex oxide to show high oxygen storage ability at a relatively high temperature. Also, Sr is assumed to activate oxygen and this plays advantageously for the storage and release of oxygen.

Hence, the catalyst of the present invention can be placed where the catalyst temperature stays at or rises temporary to 900° C. or higher, such as a downstream portion directly below the exhaust gas manifold of a multi-cylinder engine.

Also, in case where the catalyst of the present invention is applied as a ternary catalyst, for example, even when the catalyst is exposed to a high temperature atmosphere for a long time, the above-described ternary complex oxide effectively functions as the oxygen storage material that corrects a deviation from the theoretical air-fuel ratio by storing and releasing oxygen to remove HC by means of oxidation, thereby making it possible to achieve high HC purifying performance.

Also, in case where the catalyst of the present invention is applied as the lean NOx purifying catalyst, even after the catalyst is exposed to a high temperature atmosphere for a long time, the ternary complex oxide effectively functions as an oxygen supply source for NO oxidation. Hence, at a lean air-fuel ratio, NO is oxidized to $NO_2$, which is readily absorbed into the NOx absorber, thereby making it possible to achieve high lean NOx purifying performance by absorbing $NO_2$ into the NOx absorber.

Also, the NOx absorber has a problem of the S poisoning deterioration. However, because the ternary complex oxide includes Sr, deterioration of the lean NOx purifying performance caused by the S poisoning deterioration can be lessened, thereby conferring excellent resistance to the S poisoning deterioration to the NOx absorber. Further, the S poisoned catalyst can be regenerated by raising the temperature thereof, and the catalyst designed as discussed above can show extremely high regenerating performance, because the ternary complex oxide has an excellent heat resistance.

Also, the ternary complex oxide plays advantageously for the resistance to the S poisoning when a larger amount of Zr is included, and the heat resistance is improved when a larger amount of Ce is included. It should be noted, however, that when an excess amount of Sr is included, the heat resistance deteriorates.

Also, the ternary complex oxide releases only a small amount of oxygen when an air-fuel ratio of an engine is set to stoichimetric or rich ratio at a normal exhaust gas temperature of approximately 350° C. Hence, it is possible to shorten a time to keep an air-fuel ratio stoichimetric or rich to allow the NOx absorber to release NOx absorbed therein for reduction-purification, or to lower a degree of richness.

In other words, when a large amount of oxygen is released, even if the reduction components (HC, CO, $H_2$, etc.) in the exhaust gas that purify NOx are increased by making the ratio stoichimetric or rich, the reduction components react with released oxygen and consume a larger amount of oxygen. Hence, in order to purify NOx by means of reduction, a larger amount of reduction components are necessary. In short, either a time to keep a ratio stoichimetric or rich has to be extended, or a degree of the rich ratio has to be increased.

In comparison, the above ternary complex oxide releases a small amount of oxygen, and therefore, consumes a small amount of reduction components. Hence, it is possible to shorten a time to keep a ratio stoichimetric or rich or to lower a degree of the rich ratio for NOx reduction-purification. Accordingly, an amount of consumed fuel to attain a stoichimetric or rich ratio can be reduced.

Herein, Sr may be in the form of simplex Sr or SrO independently contained in the catalyst. Alternatively, Sr may form Ce—Zr—Sr complex oxide with Ce and Zr.

A manufacturing method of the Ce—Zr or Ce—Zr—Sr complex oxide is not specifically limited, and available methods include: a coprecipitation method, by which alkali is dropped to an aqueous solution prepared by dissolving a plurality of metal salts to be composed, so that a complex oxide precipitates; a solid phase reaction method, by which a complex oxide is produced by melting particles of a plurality of metal oxides to be composed at high temperatures; a supporting (drying to solidification) method, by which a complex oxide is produced by pouring oxide powder of one metal to be composed into an aqueous solution having an ion of the other metal to be composed with stirring followed by drying and calcining; a liquid drying method, by which a complex oxide is crystallized by boiling an aqueous solution prepared by dissolving a plurality of metal salts to be composed, so that moisture is removed; etc.

Next, the following description will describe, with reference to the drawings, an embodiment different from the embodiments discussed above.

Figure 36:
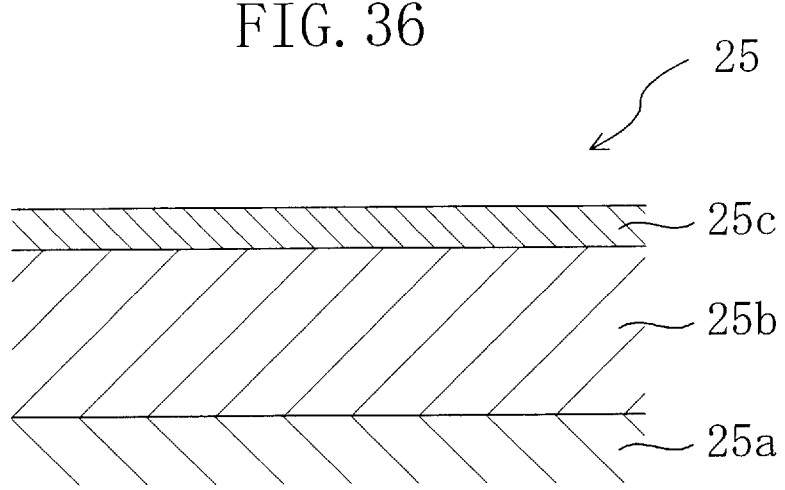
FIG. 36 is a cross section showing a layer structure of a catalyst according to one embodiment of the present invention.

FIG. 36 is a view showing a structure of a catalyst 25 for purifying an exhaust gas. The catalyst 25 includes, for example, a monolithic substrate 25a made of cordierite, which is a substrate material with an excellent heat resistance, and a lamination of an inner catalyst layer 25b formed on the side closer to the surface of the substrate 25a and an outer catalyst layer 25c formed on the inner catalyst layer 25b at the outer side remote from the surface of the substrate 25a.

The inner catalyst layer 25b includes a first precious metal component (for example, Pt), Ba, K, Sr, and Mg as the NOx absorber, a first matrix on which the first precious metal and NOx absorber are supported, and a binder for binding matrix powder to retain the same to the substrate. Herein, the first matrix is made of a mixture of alumina and $CeO_2$—$ZrO_2$—SrO complex oxide.

The outer catalyst layer 25c includes second precious metal components (for example, Pt and Rh), Ba, K, Sr, and Mg as the NOx absorber, a second matrix on which the precious metal and NOx absorber are supported, and a binder for binding second matrix powder to retain the same to the substrate. Herein, the second matrix is made of zeolite.

A basic manufacturing method of the catalyst 25 is as follows.

Firstly, the first matrix (a mixture of alumina and $CeO_2$—$ZrO_2$—SrO complex oxide), the binder, and water are mixed, whereby a slurry is prepared. The slurry is wash-coated on the monolithic substrate followed by drying and calcining, whereby the inner coat layer is formed.

Then, the catalyst powder is produced by supporting the second precious metal on the second matrix (zeolite) by the drying to solidification method or the like. Then, the catalyst powder, the binder, and water are mixed to prepare a slurry. The slurry is wash-coated on the monolithic substrate having the inner coat layer followed by drying and calcining, whereby the outer coat layer is formed on the inner coat layer.

Subsequently, a mixed solution of a solution of the first precious metal component, solutions of Ba components, K components, Sr components, and Mg components as the NOx absorber is prepared. Then, the mixed solution is impregnated into the inner coat layer and outer coat layer simultaneously followed by drying and calcining.

In this manner, the inner coat layer is made into an inner catalyst layer, and the outer coat layer is made into an outer catalyst layer.

Figure 37:
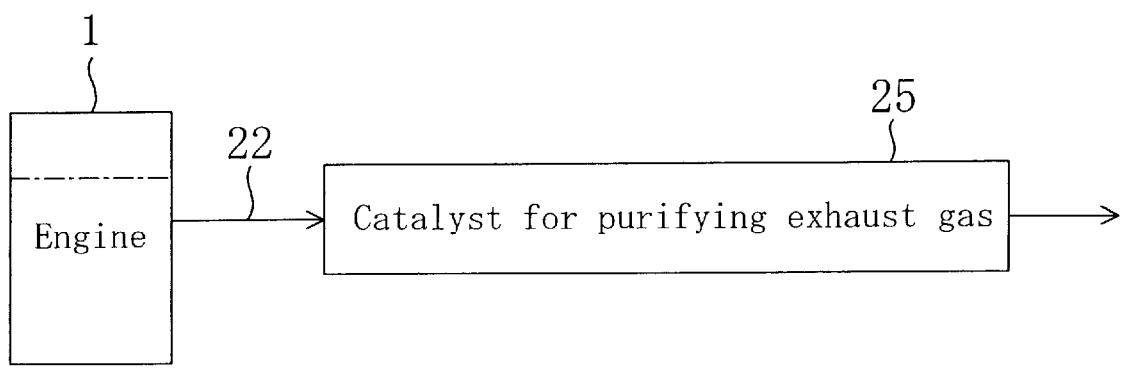
FIG. 37 is a block diagram of an engine exhaust gas purifying device for which the catalyst according to one embodiment of the present invention is used.

As shown in FIG. 37, for example, the catalyst 25 is disposed in an exhaust gas passage 22 for releasing an exhaust gas from a lean combustion engine 1 of an automobile. The provided portion corresponds to the downstream portion directly below the exhaust gas manifold. The catalyst 25 absorbs NOx contained in the exhaust gas into Ba, K, Sr, and Mg during the lean combustion operation, and during the theoretical air-fuel ratio combustion operation or rich combustion operation ($\lambda \leq 1$), it allows NOx released from Ba and the like to react with HC, CO and $H_2$ to purify the exhaust gas like the ternary catalyst. In other words, the catalyst C has the lean NOx purifying function, and the oxygen concentration in the exhaust gas during the lean combustion operation is 4 or 5 to 20%, and an air-fuel ratio A/F is 18 to 150. On the other hand, the oxygen concentration in the exhaust gas during the rich combustion operation is 0.5% or below.

Also, the catalyst 25 has the lean NOx purifying function, but when the lean combustion operation continues too long, an amount of absorbed NOx in the catalyst 25 reaches saturation, which causes deterioration of the NOx purifying performance. For this reason, it is controlled so that the lean combustion operation is performed for two to three minutes to allow NOx absorber to absorb NOx, and then the rich combustion operation is performed for one to five seconds to allow the NOx absorber to release absorbed NOx for purification repetitively in cycles.

Further, when the NOx absorber (Ba, K, Sr, and Mg) included in the inner catalyst layer 25b and the outer catalyst layer 25c is determined as being an excessive absorption condition of the sulfur component, the air-fuel ratio in the combustion chamber is changed to a rich condition, and ignition retard control to delay the ignition timing is performed for approximately two to ten minutes. Consequently, the temperature of the exhaust gas is raised and so is the temperature of the NOx absorber, and the sulfur component in the S poisoned NOx absorber are detached, whereby regeneration is performed.

The catalyst 25 of the above arrangement is the lean NOx purifying catalyst, but because the $CeO_2$—$ZrO_2$—SrO complex oxide serving as an oxygen storage material contains Sr, even when the catalyst 25 is exposed to a high temperature atmosphere for a long time, the oxygen storage function of the complex oxide is not deteriorated considerably. Hence, even after the catalyst 25 is exposed to a high temperature atmosphere for a long time, the complex oxide effectively functions as an oxygen supply source for NO oxidation. As a result, NO is oxidized at the lean air-fuel ratio to $NO_2$, which is readily absorbed into the NOx absorber, thereby making it possible to achieve high lean NOx purifying performance by absorbing $NO_2$ into the NOx absorber. In short, the catalyst 25 has excellent resistance to heat deterioration. Hence, as has been discussed above, the catalyst 25 can be disposed at a downstream portion directly below the exhaust gas manifold where the catalyst temperature stays at or rises temporary to 900° C. or higher.

Also, the NOx absorber has a problem so-called the S poisoning that it forms salts with sulfur oxides contained in the exhaust gas and loses the function as the NOx absorber. However, because the catalyst 25 includes Sr as components, deterioration of the lean NOx purifying performance caused by the S poisoning can be lessened. In short, the catalyst 25 has excellent resistance to the S poisoning.

Further, the S poisoned catalyst can be regenerated by raising the temperature thereof, and the catalyst 25 has extremely high regenerating performance.

Also, because a precious metal is supported on the inner catalyst layer 25b and the outer catalyst layer 25c as the catalytic metal, not only NOx and HC in the exhaust gas are activated on the surface of the precious metal, but also activated oxygen is supplied from the complex oxide as discussed above, so that NO in the exhaust gas undergoes an oxidation reaction and is converted to $NO_2$ and HC undergoes a partial oxidation reaction smoothly. Also, because they are in an energetically highly reactive condition, the NOx reducing performance and the HC oxidizing performance of the catalyst 25 are improved.

The catalyst 25 has a lamination structure, wherein the inner catalyst layer 25b and the outer catalyst layer 25c are layered sequentially on the monolithic substrate 1. At an lean air-fuel ratio, the outer catalyst layer 25c purifies NOx as HC stored in zeolite is released and reacts with NO in the exhaust gas, while the inner catalyst layer 25b apparently purifies NOx as $NO_2$ generated at the outer catalyst layer 25c through NO oxidation is absorbed into the NOx absorber. These effects together allow the catalyst 25 to exert extremely high lean NOx purifying performance. In other words, the above arrangement allows the outer catalyst layer 25c to show the function as a catalyst for purifying NOx by selective reduction, and allows the inner catalyst layer 25b to show the function as the lean NOx purifying catalyst. Herein, $NO_2$ absorbed in the NOx absorber reacts with partially oxidized HC activated by the precious metal on the outer catalyst layer 25c when the air-fuel ratio is switched to rich, and is purified by means of decomposition.

In the above embodiment, the catalyst 25 was a lean NOx catalyst, but it is not specifically limited to the foregoing, and the catalyst 25 may be a ternary catalyst including complex oxide made of $CeO_2$ and $ZrO_2$ as an oxygen storage material and Sr as catalyst components. In this case, even after the catalyst is exposed to a high temperature atmosphere for a long time, the complex oxide effectively functions as an oxygen supply source for HC oxidation to remove HC by means of oxidation, thereby making it possible to achieve high HC purifying performance.

In addition, in the above embodiment, the catalyst 25 is used to purify an exhaust gas from a gasoline engine, but the use of which is not limited to the foregoing. The catalyst 25 can be applied to purify an exhaust gas from a diesel engine with air-fuel ratio A/F=18 to 50. In this case, in order to apply the regeneration treatment to the NOx absorber in the catalyst 25, injection retard control may be performed to raise a temperature of the exhaust gas by delaying the fuel injection timing.

Test evaluations were conducted on resistance to heat deterioration and resistance to the poisoning deterioration of the catalysts of each of the following examples.

EXAMPLE A

A catalyst according to Example A was prepared by the following method.

Formation of the Inner Coat Layer

Herein, γ-alumina, $CeO_2$—$ZrO_2$—$Sm_2O_3$ (a mass composition ratio is $CeO_2$:$ZrO_2$:$Sm_2O_3$=23:73:4) as complex oxide, and an alumina binder were weighted and mixed, so that the support amount of γ-alumina (the support amount element is defined as a dry weight of the element when supported on a honeycomb substrate described below per 1 L of the substrate, and the same applies to the description below) was 150 g/L, the support amount of the complex oxide was 150 g/L, and the support amount of the alumina binder was 30 g/L. Then, ion exchange water was added thereto, whereby slurry was prepared. The slurry was wash-coated on a monolithic substrate made of cordierite by a method to dip the substrate in the slurry and take out the substrate to blow off extra slurry. Subsequently, the substrate was dried at a temperature of 150° C. for one hour and calcined at a temperature of 540° C. for two hours, whereby the inner coat layer was formed. These drying condition and calcining condition also apply to the drying and the calcining in the description below.

Formation of the Outer Coat Layer

An aqueous solution of dinitrodiamine platinum and an aqueous solution of rhodium nitrate were weighted and mixed, so that the support amount of Pt was 0.5 g/L and the support amount of Rh was 0.006 g/L. Then, the mixture was blended with MFI type zeolite ($SiO_2$/$Al_2O_3$=80) and subjected to spray to dryness by the spray dry method followed by drying and calcining, whereby catalyst powder was produced. A total amount of Pt and Rh in the catalyst powder was approximately 2.5% on the basis of mass percentage.

Then, the Pt—Rh/MFI catalyst powder and the alumina binder were weighted and mixed, so that the support amount of the catalyst powder was 20 g/L and the support amount of the binder was 4 g/L. Then, ion exchange water was added thereto, whereby slurry was prepared. The slurry was washcoated on the substrate on which the inner coat layer was formed followed by drying and calcining, whereby the outer coat layer was formed.

Impregnation Process

A mixed solution was prepared by weighting and mixing an aqueous solution of dinitrodiamine platinum nitrate, an aqueous solution of barium acetate, an aqueous solution of potassium acetate, an aqueous solution of strontium acetate, and an aqueous solution of magnesium acetate, so that the support amount of Pt was 3.0 g/L, the support amount of Ba was 30 g/L, the support amount of K was 6 g/L, the support amount of Sr is 10 g/L, and the support amount of Mg was 10 g/L.

Then, the mixed solution was impregnated into the inner and outer coat layers on the substrate followed by drying and calcining.

Herein, an amount of catalyst impurities was less than 1%, and the same applies to the catalysts of the following examples.

EXAMPLE B

A catalyst according to Example B was prepared under the same conditions and by the same method as Example A except that $CeO_2$—$ZrO_2$—$La_2O_3$ (a mass composition ratio is $CeO_2$:$ZrO_2$:$La_2O_3$=23:73:4) was used as complex oxide for the inner coat layer.

EXAMPLE C

A catalyst according to Example C was prepared under the same conditions and by the same method as Example A except that $CeO_2$—$ZrO_2$—$In_2O_3$ (a mass composition ratio is $CeO_2$:$ZrO_2$:$In_2O_3$=23:73:4) was used as complex oxide for the inner coat layer.

EXAMPLE D

A catalyst according to Example D was prepared under the same conditions and by the same method as Example A except that $CeO_2$—$ZrO_2$—SrO (a mass composition ratio is $CeO_2$:$ZrO_2$:SrO=23:73:4) was used as complex oxide for the inner coat layer.

Reference Example

A catalyst according to Reference Example was prepared under the same conditions and by the same method as Example A except that $CeO_2$—$ZrO_2$ (a mass composition ratio is $CeO_2$:$ZrO_2$=75:25) was used as complex oxide for the inner coat layer.

For further reference, a specific surface area and oxygen storage ability of the complex oxide forming each catalyst were measured after the catalysts were subjected to aging at 1000° C. The measured results are shown in Table 3 below.

TABLE 3

|  |  | Example 1 | Example 2 | Example 3 | Example 4 | Reference example |
|---|---|---|---|---|---|---|
| Specific surface area | $m^2$/g | 30 | 40 | 4 | 38 | 25 |
| Oxygen storage ability | μmol/g | 150 | 150 | 200 | 140 | 130 |

Figure 38:
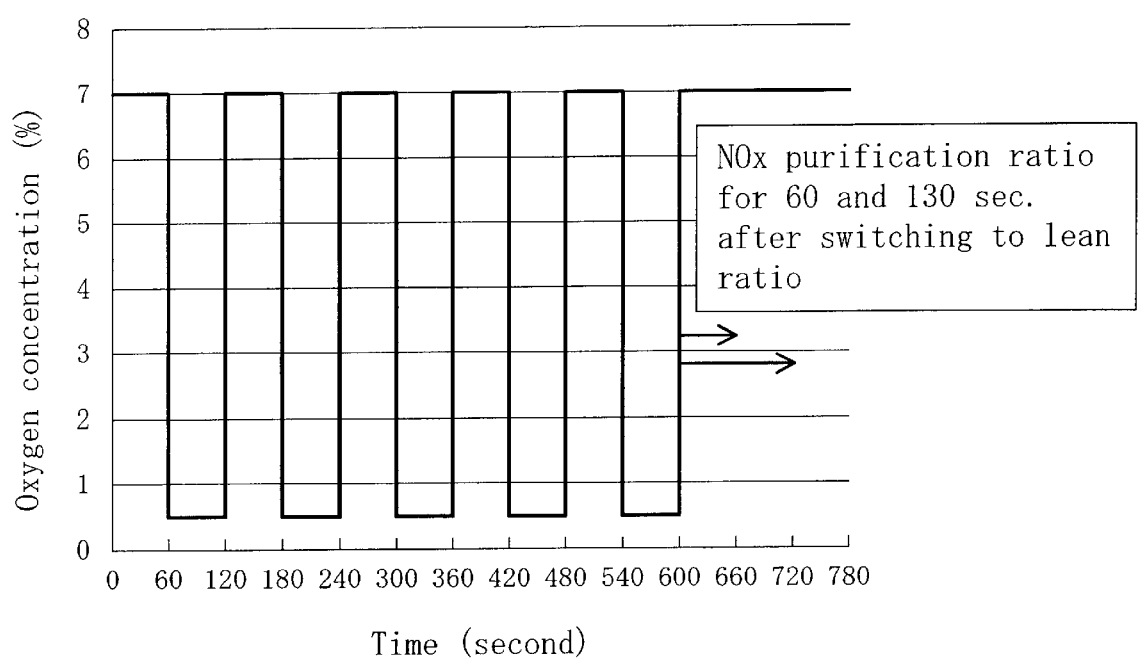
FIG. 38 is a graph showing a relation between a time elapsed since the start of a test and oxygen concentration in a simulated gas brought into contact with the catalyst in a NOx purification ratio measuring method.

Each of the catalysts of Examples A through D and Reference Example were subjected to heat treatment at 900° C. for 24 hours in an ambient atmosphere. Subsequently, the catalyst was attached to a fixed bed flow-through reaction evaluator. Then, as shown in FIG. 38, a simulated exhaust gas (gas composition A) with a lean air-fuel ratio was flown for 60 seconds, and the simulated exhaust gas was switched to a simulated exhaust gas (gas composition B) with a rich air-fuel ratio, which was flown for 60 seconds, and this cycle was repeated five times. Then, the gas composition was switched to the one with the lean air-fuel ratio (gas composition A), and the NOx purification ratio (lean NOx purification ratio) was measured for 60 seconds and 130 seconds from this switching point (600 seconds later from the test started). The temperature of the catalyst and the temperature of the simulated exhaust gases were both 350° C., the gas compositions A and B were as set forth in Table 4 below, and the space velocity SV was 25000 $h^{-1}$.

TABLE 4

|  | Gas composition A Lean | Gas composition B Rich |
|---|---|---|
| $HC(C_3H_6)$ | 4000 ppm | 4000 ppm |
| NO | 260 ppm | 260 ppm |
| CO | 0.16% | 0.16% |
| $CO_2$ | 9.75% | 9.75% |
| $H_2$ | 650 ppm | 650 ppm |
| $O_2$ | 7% | 0.5% |
| $N_2$ | The remaining | The remaining |

Figure 39:
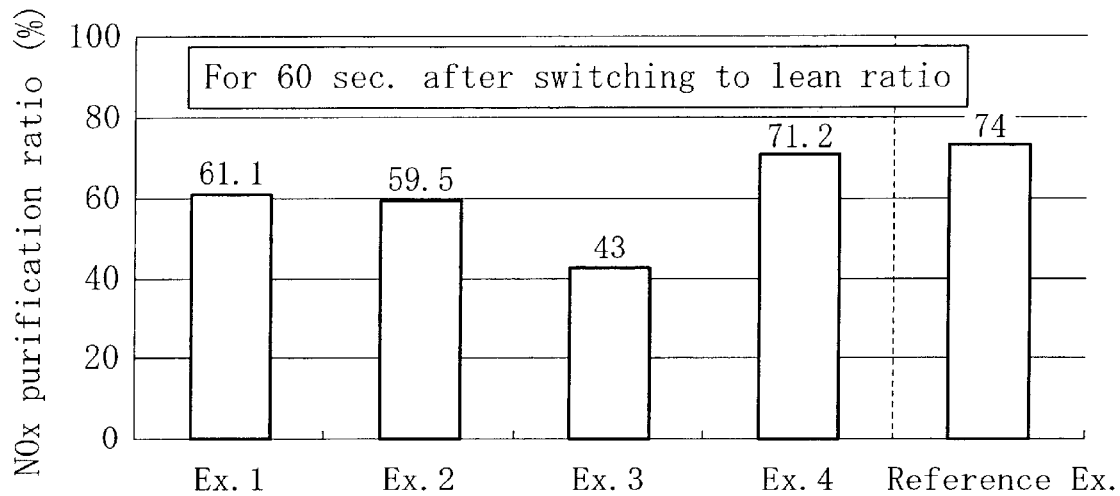
FIG. 39 is a graph showing NOx purification ratios regarding the resistance to heat deterioration for 60 seconds after switching to a lean ratio.
Figure 40:
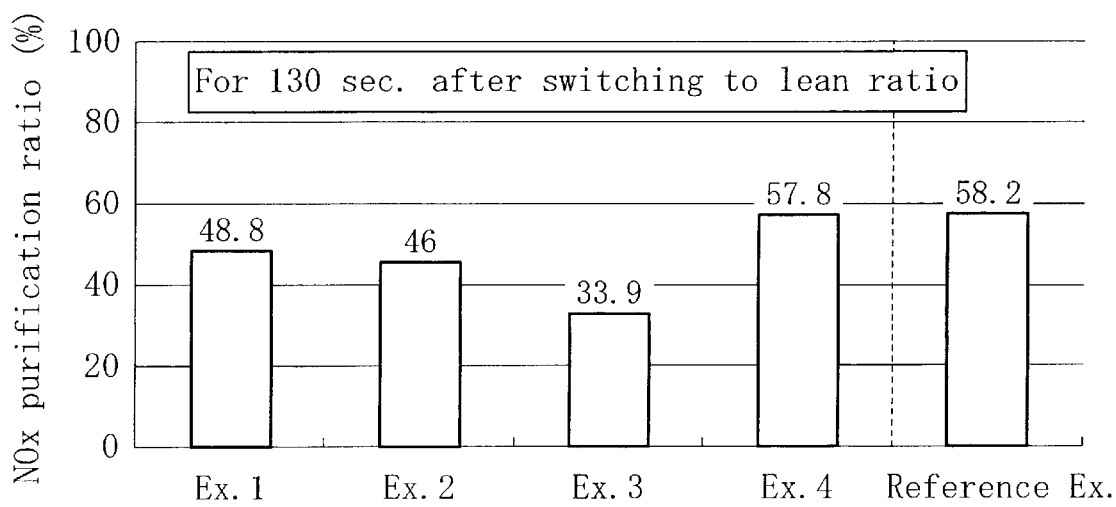
FIG. 40 is a graph showing NOx purification ratios regarding the resistance to heat deterioration for 130 seconds after switching to a lean ratio.

The measured results of the NOx purification ratio for 60 seconds and 130 seconds from the switching point are shown in FIGS. 39 and 40, respectively.

As shown in FIGS. 39 and 40, it is understood that Example D including the $CeO_2$—$ZrO_2$—SrO complex oxide has high NOx purification ratios in both the cases of 60 seconds and 130 seconds compared with Examples A through C, and thereby has excellent resistance to heat deterioration. According to Table 3, Example D shows a satisfactory NOx purification ratio even though the specific surface area and the oxygen storage ability of the complex oxides are substantially the same in Examples B and D, and the presence of Sr is assumed to be the reason. Also, according to Table 3, the complex oxide of Example C has large oxygen storage ability but a low NOx purification ratio, and the reason for this is assumed that an active area as the oxygen storage material is small.

The NOx purification ratio of Example D is slightly lower than that of Reference Example. However, the mass composition ratio in Reference Example was Ce:Zr=75:25 while the mass composition ratio in Example D was Ce:Zr:Sr= 23:73:4, and they cannot be compared directly. However, attention should be paid to the point that Example D shows a NOx purification ratio comparable to that of Reference Example, because Ce is the element that has the oxygen storing and releasing ability and Example D including less Ce components is expected to have a lower NOx purification ratio.

Evaluation 2: Resistance to the S Poisoning Deterioration and Regenerating Performance The NOx purification ratios of each of the catalysts of Examples A through D and Reference Example at fresh and after the $SO_2$ treatment were measured under the same conditions and by the same method as Evaluation 1. Also, as to Example D and Reference Example, the NOx purification ratios after the regeneration treatment following the $SO_2$ treatment were measured under the same conditions and by the same method as Evaluation 1. The measured results of the NOx purification ratios for 60 seconds and 130 seconds from the switching point are shown in FIGS. 41 and 42, respectively.

Figure 41:
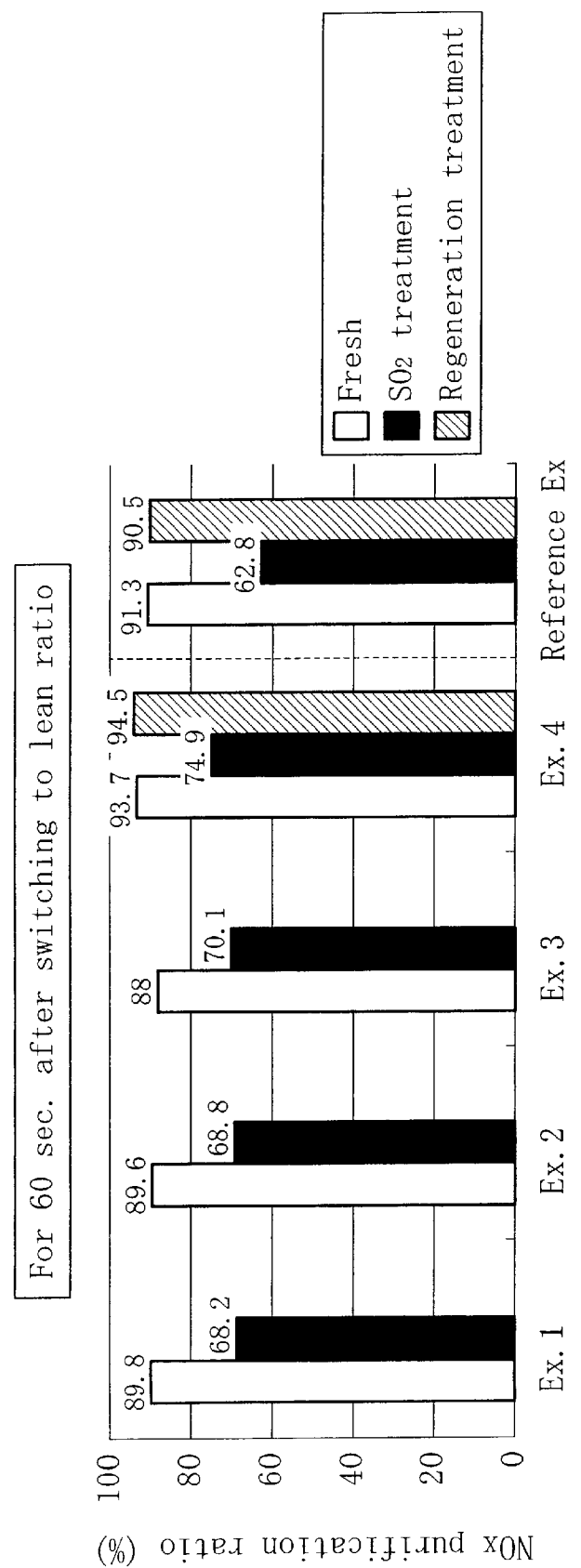
FIG. 41 is a graph showing NOx purification ratios regarding the resistance to the S poisoning deterioration for 60 seconds after switching to a lean ratio.
Figure 42:
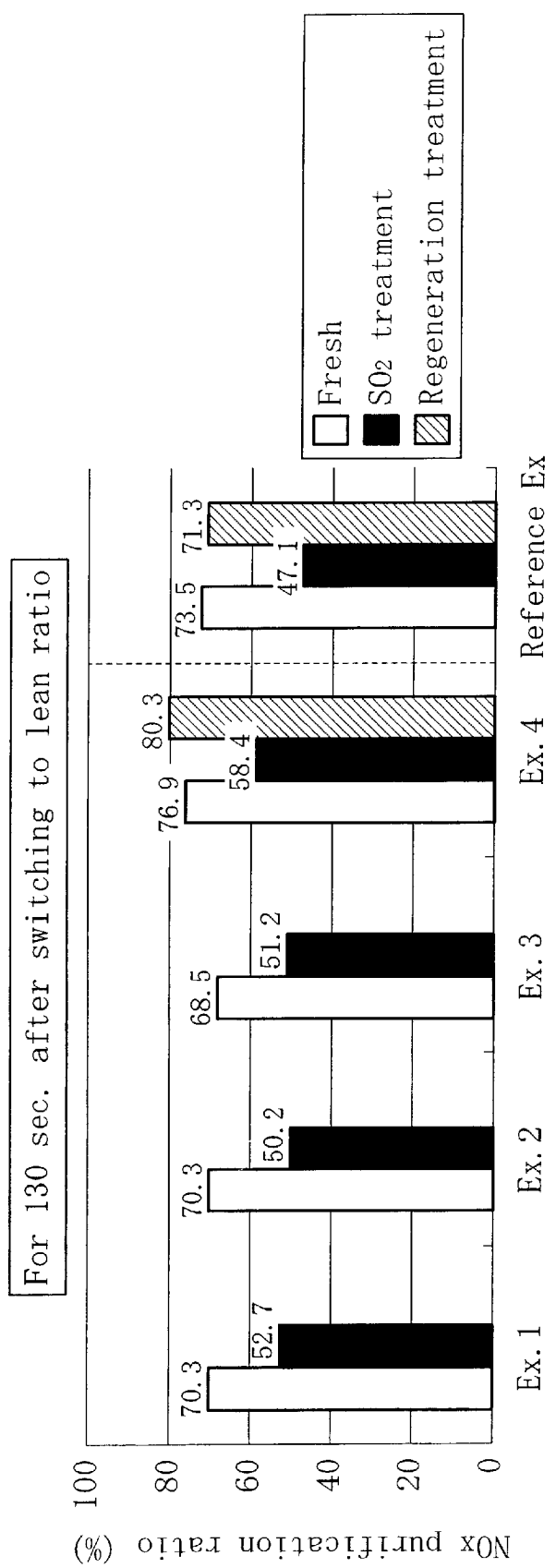
FIG. 42 is a graph showing NOx purification ratios regarding the resistance to the S poisoning deterioration for 130 seconds after switching to a lean ratio.

As are shown in FIGS. 41 and 42, it is understood that all of Examples A through D have higher lean NOx purification ratios than Reference Example in both cases of 60 seconds and 130 seconds, and thereby have excellent resistance to the S poisoning deterioration. The reason for this is not obvious, but it is assumed that the presence of Sm, La, In or Sr makes the NOx absorber finer and thereby enlarges the surface area thereof, which makes the NOx absorber less susceptible to the S poisoning. Hence, by allowing an exhaust gas containing sulfur component to come in contact with the lean NOx purifying catalyst containing Sm, La, In or Sr, it is possible to suppress the S poisoning deterioration of the NOx absorber.

Also, the regeneration of the NOx purifying performance can be affirmed with Example D and Reference Example to which the regeneration treatment was applied. However, it is understood that Example D shows extremely high regeneration ability. Hence, it is assumed that when the lean NOx purifying catalyst containing Sm, La, In, or Sr is determined as being S poisoned, the catalyst shows extremely high regeneration ability from the S poisoning by raising the temperature of the catalyst.

Others

In the above embodiment, the sulfur detaching means was composed of the air-fuel ratio control and the divided injection control. However, a heater for heating the catalyst may be provided, so that when the sulfur excessive absorption condition is determined, the heater is activated to heat the catalyst while the air-fuel ratio is changed to be in the vicinity of $\lambda=1$.

Also, like in the case of the present embodiment where the catalyst has a double-layer structure composed of the inner catalyst layer and the outer catalyst layer, the inner catalyst layer may be made of fine particles of $CeO_2$ instead of the $CeO_2$—$ZrO_2$ complex oxide or the like. In this case, the particle size of the fine particles of $CeO_2$ is preferably 100 nm or smaller.

In addition, the use of the present invention is not limited to an exhaust gas from an automobile engine (lean burn engine or diesel engine), and the present invention can be applied to a stationary engine for industrial use, and in such a case, desired effects can be achieved by arranging in the same manner as the above embodiment. Herein, the engine for industrial use means the one used for air conditioning of buildings or the like by subjecting heat of an exhaust gas to heat exchange. In a case where the heat exchanger is placed upstream from the catalyst, a trouble that will possibly occur when raising a temperature can be prevented by arranging in such a manner so as to lower heat exchange efficiency by reducing an amount of heat exchange water when the temperature of the catalyst is raised like in the above embodiment.

INDUSTRIAL APPLICABILITY

The present invention can be used for reduction of NOx in an exhaust gas from an automobile or the like.

What is claimed is:

1. A catalyst for purifying an exhaust gas, disposed in an exhaust gas passage of an engine, for lowering NOx concentration in an exhaust gas containing NOx, sulfur, and oxygen, the catalyst including:

a substrate; and a catalyst layer formed on said substrate, wherein said catalyst layer comprises a support material, a NOx absorber supported by said support material and absorbs NOx when an oxygen concentration in the exhaust gas is high and releases NOx when the oxygen concentration drops, and a precious metal supported by said support material for reducing NOx, wherein said NOx absorber includes Ba, K, Sr, and Mg, wherein the support amount of K per 1 L of said substrate is 6 g, and wherein the support amount of Ba per 1 L of said substrate is 5 to 15 g.

2. A method of manufacturing a catalyst for purifying an exhaust gas, disposed in an exhaust gas passage of an engine, for lowering a NOx concentration in an exhaust gas containing NOx, SOx, and oxygen, comprising the steps of:

forming an alumina layer by coating a substrate with alumina; and impregnating said alumina layer with a Ba solution, a K solution, an Sr solution, a Mg solution, and a precious metal solution, wherein in the step of impregnating said alumina layer the Ba solution, the K solution, the Sr solution, the Mg solution and the precious metal solution are divided into a first group and a second group, the Sr solution and the Mg solution are included in the first group and the K solution is included in the second group, and the second group is impregnated into the alumina layer after the first group.

3. The method of manufacturing an exhaust gas purifying catalyst according to claim 2, wherein:

the Ba solution is an aqueous solution of Ba acetate, the K solution is an aqueous solution of K acetate, the Sr solution is an aqueous solution of Sr acetate, and the Mg solution is an aqueous solution of Mg acetate.

4. The method of manufacturing an exhaust gas purifying catalyst according to claim 2, wherein:

said alumina layer is made by coating said substrate with alumina twice, after which the Ba solution, the K solution, the Sr solution, the Mg solution, and the solution of the precious metal are impregnated into said alumina layer composed of two layers.

5. An exhaust gas purifying catalyst provided in an exhaust gas passage of an engine, and used for decreasing the NOx concentration in an exhaust gas including NOx, sulfur and oxygen, comprising:

a substrate; and a catalyst layer formed on said substrate, wherein said catalyst layer comprises a support material, a NOx absorber supported by said support material and absorbs NOx when an oxygen concentration in the exhaust gas is high and releases NOx when the oxygen concentration drops, and a precious metal supported by said support material for reducing NOx, wherein said NOx absorber includes Ba, K, Sr, and Mg, wherein the support amount of K per 1 L of said substrate is 2 to 15 g, and wherein the support amount of Ba per 1 L of said substrate is 5 to 15 g.

6. The catalyst for purfying an exhaust gas according to claim 5, wherein:

the support amount of Sr per 1 L of said substrate is 8 to 20 g; and the support amount of Mg per 1 L of said substrate is 8 to 12 g.

7. The catalyst for purifying an exhaust gas according to claim 5, wherein:

a mass ratio of Ba, Sr, and Mg in said catalyst layer is Ba:Sr:Mg=30:(8 to 20):(8 to 12).

8. The catalyst for purifying an exhaust gas according to claim 5, wherein:

a mass ratio of Ba, K, Sr, and Mg in said catalyst layer is Ba:K:Sr:Mg=30:(2 to 12):(8 to 20):(8 to 12).

9. The catalyst for purifying an exhaust gas according to claim 5, wherein:

at least a part of Ba and a part of Sr form one compound with both Ba and Sr being constituent elements.

10. The catalyst for purifying an exhaust gas according to claim 9, wherein:

K does not chemically react with either Ba, Sr or Mg, and K is dispersed around a Ba—Sr compound and a Ba—Mg compound.

11. The catalyst for purifying an exhaust gas according to claim 5 wherein:

the support amount of K per 1 L of said substrate is 6 to 15 g.

12. The catalyst for purifying an exhaust gas according to claim 11, wherein:

a mass ratio of Ba and K in said catalyst layer is Ba:K=(5 to 15):1.

* * * * *